(12) United States Patent
Uchiyama et al.

(10) Patent No.: US 12,219,526 B2
(45) Date of Patent: Feb. 4, 2025

(54) TERMINAL DEVICE, BASE STATION, METHOD, AND RECORDING MEDIUM FOR SIDELINK COMMUNICATION

(71) Applicant: Sony Group Corporation, Tokyo (JP)

(72) Inventors: Hiromasa Uchiyama, Tokyo (JP); Kazuyuki Shimezawa, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 313 days.

(21) Appl. No.: 17/414,956

(22) PCT Filed: Oct. 28, 2019

(86) PCT No.: PCT/JP2019/042093
§ 371 (c)(1),
(2) Date: Jun. 17, 2021

(87) PCT Pub. No.: WO2020/137130
PCT Pub. Date: Jul. 2, 2020

(65) Prior Publication Data
US 2022/0061026 A1     Feb. 24, 2022

(30) Foreign Application Priority Data
Dec. 26, 2018   (JP) .................. 2018-243472

(51) Int. Cl.
*H04W 72/02* (2009.01)
*H04W 72/0446* (2023.01)
*H04W 72/0453* (2023.01)
*H04W 92/18* (2009.01)

(52) U.S. Cl.
CPC ....... *H04W 72/02* (2013.01); *H04W 72/0446* (2013.01); *H04W 72/0453* (2013.01); *H04W 92/18* (2013.01)

(58) Field of Classification Search
CPC ............. H04W 72/02; H04W 72/0446; H04W 72/0453; H04W 92/18; H04W 72/21; H04W 4/46; H04W 76/14
See application file for complete search history.

(56) References Cited

U.S. PATENT DOCUMENTS

| 2016/0037572 | A1 | 2/2016 | Yeh et al. |
| 2017/0332207 | A1 | 11/2017 | Sheng |
| 2018/0049259 | A1* | 2/2018 | Aminaka .............. H04W 76/14 |

(Continued)

FOREIGN PATENT DOCUMENTS

| CN | 108370565 A | 8/2018 |
| CN | 109076530 A | 12/2018 |

(Continued)

OTHER PUBLICATIONS

Guo (Specification for U.S. Appl. No. 62/756,877, filed Nov. 7, 2018) (Year: 2018).*
International Search Report and Written Opinion mailed on Dec. 10, 2019, received for PCT Application PCT/JP2019/042093, Filed on Oct. 28, 2019, 9 pages including English Translation.

(Continued)

*Primary Examiner* — Afshawn M Towfighi
(74) *Attorney, Agent, or Firm* — XSENSUS LLP

(57) ABSTRACT

A terminal device including a control unit that transmits transmission report information after transmitting a first packet on a sidelink. The transmission report information includes information indicating time and a frequency of a resource used to transmit the first packet.

19 Claims, 29 Drawing Sheets

(56) References Cited

U.S. PATENT DOCUMENTS

| | | |
|---|---|---|
| 2018/0270796 A1 | 9/2018 | Chae |
| 2019/0141559 A1* | 5/2019 | Tang .................... H04B 7/0456 |
| 2019/0239039 A1* | 8/2019 | Hahn ..................... H04W 72/52 |
| 2020/0029318 A1* | 1/2020 | Guo ........................ H04W 4/40 |
| 2020/0029340 A1* | 1/2020 | He ......................... H04W 72/25 |
| 2020/0068546 A1* | 2/2020 | Wu ........................ H04W 16/14 |
| 2020/0205209 A1* | 6/2020 | Pan ........................ H04W 4/40 |
| 2021/0168763 A1* | 6/2021 | Cheng .................. H04W 72/20 |

FOREIGN PATENT DOCUMENTS

| | | |
|---|---|---|
| IN | 201817041830 A | 12/2018 |
| JP | 2017-506037 A | 2/2017 |
| JP | 2018-504089 A | 2/2018 |
| JP | 2018-528657 A | 9/2018 |
| WO | 2017/083388 A1 | 5/2017 |
| WO | 2017/199447 A1 | 11/2017 |
| WO | 2018/061521 A1 | 4/2018 |
| WO | WO-2018062857 A1 | 4/2018 |

OTHER PUBLICATIONS

Huawei et al., "Sidelink Resource Allocation Mode 2", 3GPP TSG RAN WG1 Meeting #95, R1-1812209, Nov. 12-16, 2018, 15 pages.

Institute for Information Industry (III):"Integrated resource scheduling for in-coverage D2D communication to support Mode 1 and Mode 2", 3GPP TSG RAN WG1 Meeting #76bis, R1-141499, Apr. 4, 2014.

Intel Corporation: "Enhancements of NR and LTE Uu Link to Control NR Sidelink", 3GPP TSG RAN WG1 Meeting #94bis, R1-1810778, Oct. 12, 2018.

Nokia et al: "On Uu-based sidelink resource allocation/configuration", 3GPP TSG RAN WG1 Meeting #95, R1-1813524, Nov. 16, 2018.

Institute for Information Industry (III), "Resource allocation scheme for in-coverage D2D communication to support Mode 1 and Mode 2", 3GPP TSG RAN WG1 Meeting #77 R1-142293, Section 3, May 19-23, 2014.

ZTE, Sanechips, "Discussion on Uu based resource allocation/configuration for NR V2X", 3GPP TSG RAN WG1 Meeting #95 R1-1813179, Nov. 12-16, 2018, Spokane, USA.

* cited by examiner

WEARABLE RELAY

DRONE BASE STATION

FIG. 14

TERMINAL DEVICE, BASE STATION, METHOD, AND RECORDING MEDIUM FOR SIDELINK COMMUNICATION

CROSS-REFERENCE TO RELATED APPLICATIONS

The present application is based on PCT filing PCT/JP2019/042093, filed Oct. 28, 2019, which claims priority to JP 2018-243472, filed Dec. 26, 2018, the entire contents of each are incorporated herein by reference.

TECHNICAL FIELD

The present disclosure relates to a terminal device, a base station, a method, and a recording medium.

BACKGROUND ART

Wireless access schemes and wireless networks for cellular mobile communication (that are also referred to as "Long Term Evolution (LTE)", "LTE-Advanced (LTE-A)", "LTE-Advanced Pro (LTE-A Pro)", "5G (fifth generation)", "New Radio (NR)", "New Radio Access Technology (NRAT)", "Evolved Universal Terrestrial Radio Access (EUTRA)", or "Further EUTRA (FEUTRA)" below) have been under consideration in the Third Generation Partnership Project (3rd Generation Partnership Project: 3GPP). It is to be noted that, in the following description, LTE includes LTE-A, LTE-A Pro, and EUTRA and NR includes NRAT and FEUTRA. In LTE and NR, a base station device (base station) is also referred to as eNodeB (evolved NodeB) in LTE and referred to as gNodeB in NR and a terminal device (a mobile station, a mobile station device, or a terminal) is also referred to as UE (User Equipment). LTE and NR are cellular communication systems in which a plurality of areas covered by base station devices is disposed as cells. A single base station device may manage a plurality of cells.

NR is RAT (Radio Access Technology) that is different from LTE as a next-generation wireless access scheme of LTE. NR is an access technology that is able to support a variety of use cases including eMBB (Enhanced mobile broadband), mMTC (Massive machine type communications), and URLLC (Ultra reliable and low latency communications). NR is under consideration for technical frameworks that support use scenarios, requirements, disposition scenarios, and the like in those use cases.

A plurality of transmission methods is under consideration in NR. For example, those transmission methods include grant-based transmission (transmission with a grant) and grant-free transmission (transmission with no grant). The presence or absence of a grant corresponds to the presence or absence of a predetermined procedure for collision prevention. In a case where a grant is present, transmission is performed after the predetermined procedure for collision prevention is executed. In a case where a grant is absent, transmission is performed without executing the predetermined procedure for collision prevention. Here, the predetermined procedure for collision prevention includes, for example, allocating a resource by a base station and/or performing predetermined sensing for collision prevention. It is possible to omit the predetermined procedure for collision prevention in grant-free transmission, allowing transmission to be performed with lower latency than in grant-based transmission. As for grant-free transmission, for example, PTL 1 below discloses a technique regarding grant-free transmission on an uplink.

Meanwhile, techniques regarding a sidelink have also been studied actively in recent years. The sidelink is a communication link for direct communication between terminals. Above all, expectations have been running high for in-vehicle communication (V2X communication) in recent years to achieve automatic driving in the future. The V2X communication is an abbreviation of Vehicle to X communication. The V2X communication refers to a system in which a car and "something" communicate with each other. Here, examples of "something" include a vehicle (Vehicle), a facility (Infrastructure), a network (Network), a pedestrian (Pedestrian), and the like (V2V, V2I, V2N, and V2P). In addition, as wireless communication for cars, 802.11p-based DSRC (Dedicated Short Range Communication) has mainly developed so far. However, in recent years, "LTE-based V2X" has been standardized. "LTE-based V2X" is LTE-based in-vehicle communication. The LTE-based V2X communication supports exchanges or the like of basic safety messages or the like.

CITATION LIST

Patent Literature

PTL 1: Japanese Unexamined Patent Application Publication No. 2018-504089

SUMMARY OF THE INVENTION

Problems to be Solved by the Invention

In addition to the grant-free transmission on the uplink studied in PTL 1 above, grant-free transmission on the sidelink is also conceivable. The grant-free transmission on the sidelink may be used, for example, to transmit information having high emergency with low latency such as information indicating sudden braking of a vehicle under automatic driving or a warning of a factory automation. The grant-free transmission, however, omits the predetermined procedure for collision prevention. A packet subjected to the grant-free transmission may thus have a collision with other packets that are transmitted and received to and from another terminal. In a case where it is taken into consideration that communication on the sidelink is not sometimes subjected to centralized control by a base station or the like, the grant-based transmission on the sidelink may undergo a similar collision.

Accordingly, the present disclosure provides a mechanism for allowing for the recovery of another packet having a collision with a packet transmitted on the sidelink.

Means for Solving the Problems

According to the present disclosure, there is provided a terminal device including a control unit that transmits transmission report information after transmitting a first packet on a sidelink. The transmission report information includes information indicating time and a frequency of a resource used to transmit the first packet.

In addition, according to the present disclosure, there is provided a terminal device including a control unit that controls retransmission of a second packet on the basis of transmission report information after transmitting the second packet on a sidelink. The transmission report information includes information indicating time and a frequency of a resource used to transmit a first packet by another terminal device on a sidelink.

In addition, according to the present disclosure, there is provided a base station including a communication control section that controls retransmission of a second packet by a second terminal device on the basis of transmission report information including information indicating time and a frequency of a resource used to transmit a first packet by a first terminal device on a sidelink. The second terminal device has transmitted the second packet on a sidelink.

In addition, according to the present disclosure, there is provided a method that is executed by a processor. The method includes transmitting transmission report information after transmitting a first packet on a sidelink. The transmission report information includes information indicating time and a frequency of a resource used to transmit the first packet.

In addition, according to the present disclosure, there is provided a method that is executed by a processor. The method includes controlling retransmission of a second packet on the basis of transmission report information after transmitting the second packet on a sidelink. The transmission report information includes information indicating time and a frequency of a resource used to transmit a first packet by another terminal device on a sidelink.

In addition, according to the present disclosure, there is provided a method that is executed by a processor. The method includes controlling retransmission of a second packet by a second terminal device on the basis of transmission report information including information indicating time and a frequency of a resource used to transmit a first packet by a first terminal device on a sidelink. The second terminal device has transmitted the second packet on a sidelink.

In addition, according to the present disclosure, there is provided a recording medium having a program recorded thereon. The program causes a computer to function as a control unit that transmits transmission report information after transmitting a first packet on a sidelink. The transmission report information includes information indicating time and a frequency of a resource used to transmit the first packet.

In addition, according to the present disclosure, there is provided a recording medium having a program recorded thereon. The program causes a computer to function as a control unit that controls retransmission of a second packet on the basis of transmission report information after transmitting the second packet on a sidelink. The transmission report information includes information indicating time and a frequency of a resource used to transmit a first packet by another terminal device on a sidelink.

In addition, according to the present disclosure, there is provided a recording medium having a program recorded thereon. The program causes a computer to function as a communication control section that controls retransmission of a second packet by a second terminal device on the basis of transmission report information including information indicating time and a frequency of a resource used to transmit a first packet by a first terminal device on a sidelink. The second terminal device has transmitted the second packet on a sidelink.

BRIEF DESCRIPTION OF DRAWING

FIG. 14 is a diagram for describing a sidelink resource allocation scheme.

MODES FOR CARRYING OUT THE INVENTION

The following describes a preferred embodiment of the present disclosure in detail with reference to the accompanying drawings. It is to be noted that, in this description and the drawings, components that have substantially the same functional configuration are indicated by the same signs and redundant description thereof is thus omitted.

In addition, in this specification and the drawings, there are some cases in which elements having substantially the same functional configuration are distinguished by adding different alphabets after the same sign. For example, a plurality of elements having substantially the same functional configuration is distinguished as terminal devices 200A, 200B, and 200C as necessary. However, in a case where it is not necessary to particularly distinguish a plurality of respective elements having substantially the same functional configuration, only the same sign is attached. For example, in a case where it is not necessary to particularly distinguish the terminal devices 200A, 200B, and 200C, the terminal devices 200A, 200B, and 200C are referred to simply as terminal devices 200.

It is to be noted that description is given in the following order.

1. Introduction
1.1. V2X Communication
1.2. Extended Example of Sidelink Communication
1.3. Sidelink Resource Allocation Scheme
2. Overview of Proposed Technology
2.1. System Configuration Example
2.2. Technical Problem
2.3. Overview of Proposed Technology
3. Configuration Examples
3.1. Configuration Example of Base Station
3.2. Configuration Example of Terminal Device
4. Technical Features
4.1. Process in Mode 3 Resource Allocation Environment
4.1.1. Overview
4.1.2. Grant-based Transmission
4.1.3. Grant-free Transmission and Recovery Process
4.1.4. Operation of Each Device
4.1.5. Modification Example
4.2. Process in Mode 4 Resource Allocation Environment
4.2.1. Sensingless Transmission and Recovery Process
4.2.2. Operation of Each Device
5. Practical Application Examples
5.1. Practical Application Example regarding Base Station
5.2. Practical Application Example regarding Terminal Device
6. Conclusion

1. INTRODUCTION

<1.1. V2X Communication>

Figure 1:
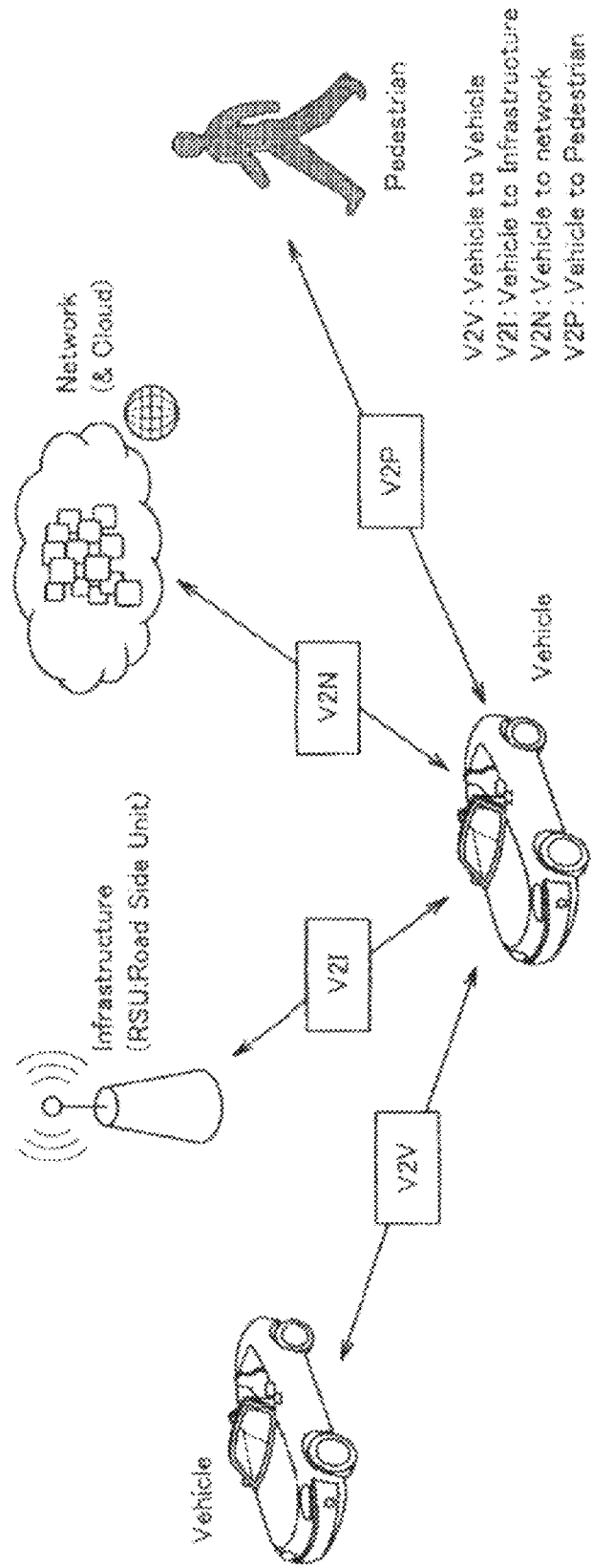
FIG. 1 is a diagram illustrating an overview of V2X communication.

The following describes an overview of V2X communication. The V2X communication is an abbreviation of Vehicle to X communication. The V2X communication refers to a system in which a car and "something" communicate with each other. For example, FIG. 1 is a diagram illustrating an overview of V2X communication. Here, examples of "something" include a vehicle (Vehicle), a facility (Infrastructure), a network (Network), a pedestrian (Pedestrian), and the like (V2V, V2I, V2N, and V2P), for example, as illustrated in FIG. 1.

(Overall View of V2X Communication)

Figure 2:
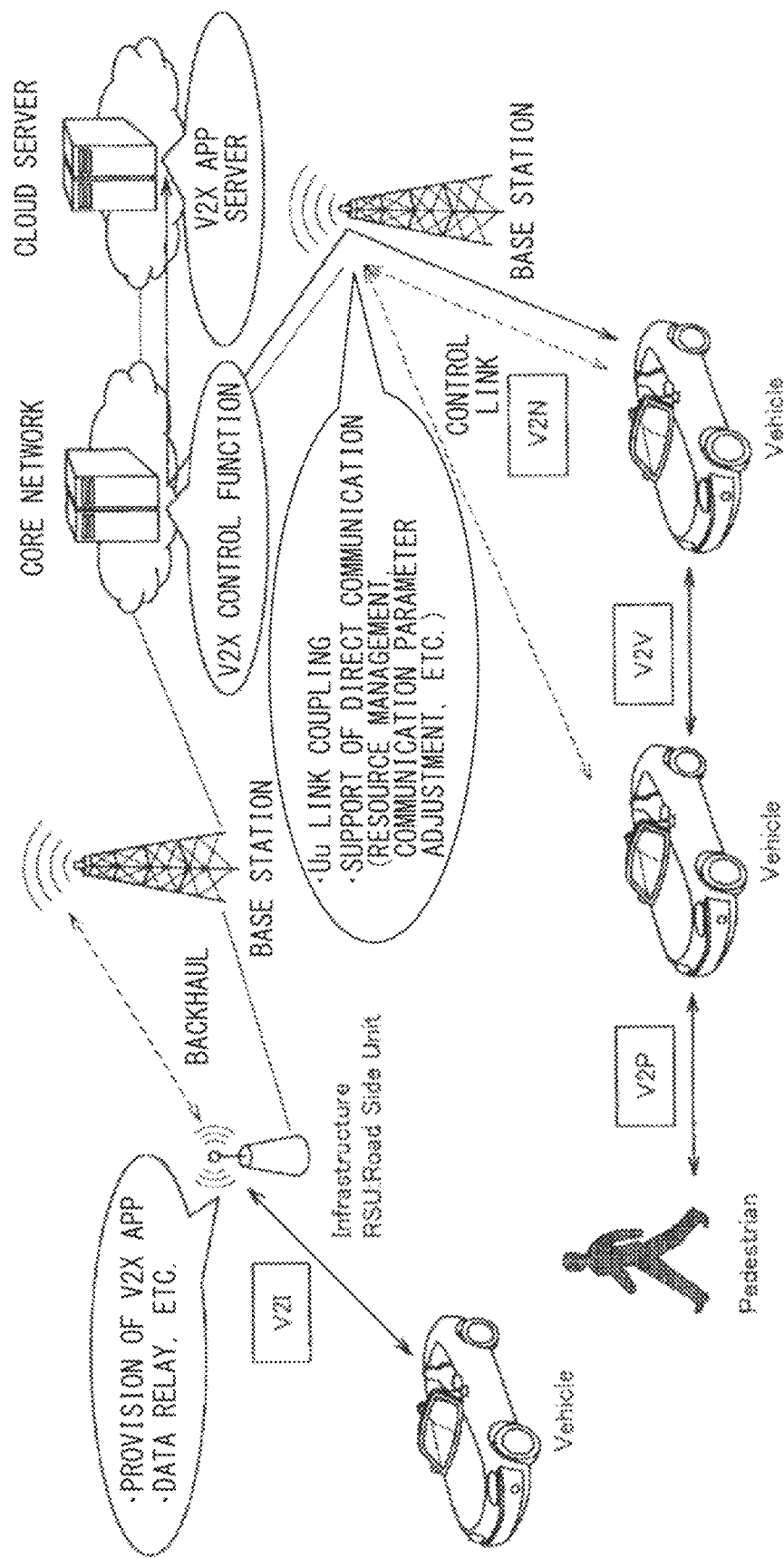
FIG. 2 is an explanatory diagram for describing an example of an overall view of the V2X communication.

In addition, FIG. 2 is an explanatory diagram for describing an example of an overall view of the V2X communication. In the example illustrated in FIG. 2, an application server (APP server) of V2X is owned as a cloud server and the application server executes control over the V2X communication on the core network side. The base station executes communication control over direct communication such as V2V communication or V2P communication while performing communication with a terminal device on a Uu link. In addition, RSU (Road Side Unit) is disposed as a road side infrastructure (Infrastructure) in addition to the base station. The RSU may come in two types: base station type RSU; and UE type RSU. The RSU provides a V2X application (V2X APP) and provides a support such as relaying data.

(Use Case of V2X Communication)

Figure 3:
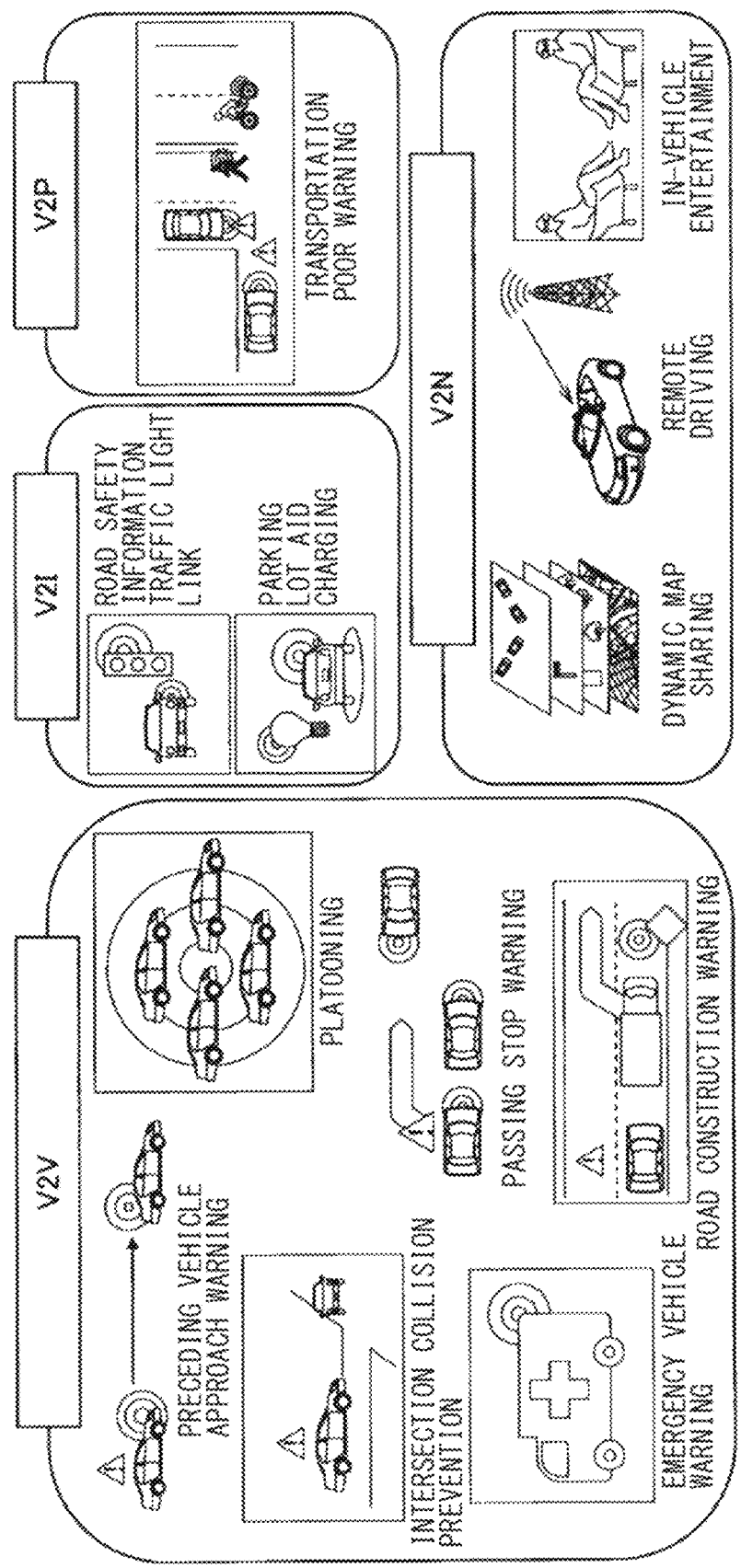
FIG. 3 is a diagram illustrating an example of a use case of the V2X communication.

As wireless communication for automobiles, 802.11p-based DSRC (Dedicated Short Range Communication) has mainly developed so far. However, in recent years, "LTE-based V2X (LTE-based V2X communication)" has been standardized. "LTE-based V2X (LTE-based V2X communication)" is LTE-based in-vehicle communication. The LTE-based V2X communication supports exchanges or the like of basic safety messages or the like. Meanwhile, in an attempt to achieve further improvement in V2X communication, NR V2X communication using 5G technology (NR: New Radio) has been studied in recent years. For example, FIG. 3 is a diagram illustrating an example of a use case of the V2X communication.

The NR V2X communication supports new use cases that request high reliability, low latency, high-speed communication, and high capacity. Those have been difficult to support with the LTE-based V2X. One specific example is, among the examples illustrated in FIG. 3, the provision of a dynamic map, remote driving, or the like, for example. Other examples include sensor data sharing where sensor data is exchanged between vehicles and between a road and a vehicle and a platooning use case intended for platooning. Such use cases and requirements for the NR V2X communication are defined in 3GPP TR22. 886. For reference purposes, the following describes an overview of an example of the use cases.

(1) Vehicles Platooning

This is a platooning use case where a plurality of vehicles makes up a platoon and travels in the same direction. Information for controlling the platooning is exchanged between a vehicle leading the platooning and other vehicles. The exchanges of these pieces of information make it possible to, for example, reduce vehicle-to-vehicle distance in the platooning.

(2) Extended Sensors

This is a use case that allows sensor-related information (Raw data before data processing or data after processing) to be exchanged between vehicles. The sensor information is collected through a local sensor, a live video image (e.g., a live video image with a nearby vehicle, RSU, and a pedestrian), a V2X application server, and the like. The exchange of such information allows a vehicle to obtain information that is not obtainable from its own sensor information. This allows the vehicle to notice/recognize a wider range of environments. It is to be noted that a high data rate is requested from communication because a large number of pieces of information have to be exchanged in this use case.

(3) Advanced Driving

This is a use case that allows for semi-automatic driving and fully automatic driving. In this use case, RSU shares noticed/recognized information obtained from its own sensor or the like with nearby vehicles, thereby allowing each of the vehicles to adjust the track and operation in synchronization with and in cooperation with those of the other vehicles. In addition, it is also possible for each of the vehicles to share an intention or an aim of the driving with the nearby vehicles.

(4) Remote Driving

This is a use case that causes a remote controller or a V2X application to perform remote control. A remote operation is used in a case where another person drives a vehicle in place of a person who has difficulty in driving or used to operate a vehicle in a dangerous region, for example. It is also possible to apply, for example, cloud computing-based control to public transportation where a route and a road to travel are determined to some extent. In this use case, high reliability and low transmission latency are requested from communication.

(Physical Layer Enhancement)

To achieve the requirements described above, a physical layer has to be further enhanced from that of LTE V2X. Links to be targeted include a Uu link and a PC5 link (sidelink). The Uu link is a link between an infrastructure such as a base station or RSU (Road Side Unit) and a terminal device. In addition, the PC5 link (sidelink) is a link between terminal devices. Main points of the enhancement are listed below.

Examples of the enhancement include the following.
Channel format
Sidelink feedback communication
Sidelink resource allocation scheme
Vehicle position information estimation technology
Relay communication between terminals
Support for unicast communication and multicast communication
Multicarrier communication and carrier aggregation
MIMO/beamforming
High frequency support (example: 6 GHz or higher)
. . . , etc.

Examples of the channel format include Flexible numerology, short TTI (Transmission Time Interval), multi-antenna support, Waveform, and the like. In addition, examples of the sidelink feedback communication include HARQ, CSI (Channel Status Information), and the like.

(V2X Operation Scenario)

The following describes an example of a V2X communication operation scenario. V2N communication includes only DL/UL communication between a base station and a terminal device and is thus simple. In contrast, in V2V communication, a variety of communication paths are possible. The following describes each scenario with mainly an example of V2V communication in focus, but similar communication operations are applicable to V2P and V2I. It is to be noted that the communication destination is a Pedestrian or RSU in V2P and V2I.

Figure 4:
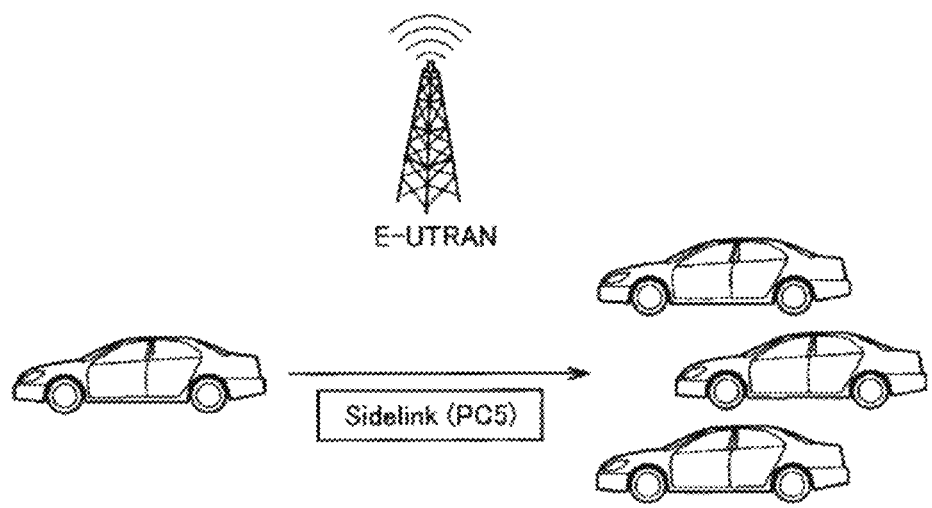
FIG. 4 is a diagram for describing an example of a V2X operation scenario.
Figure 5:
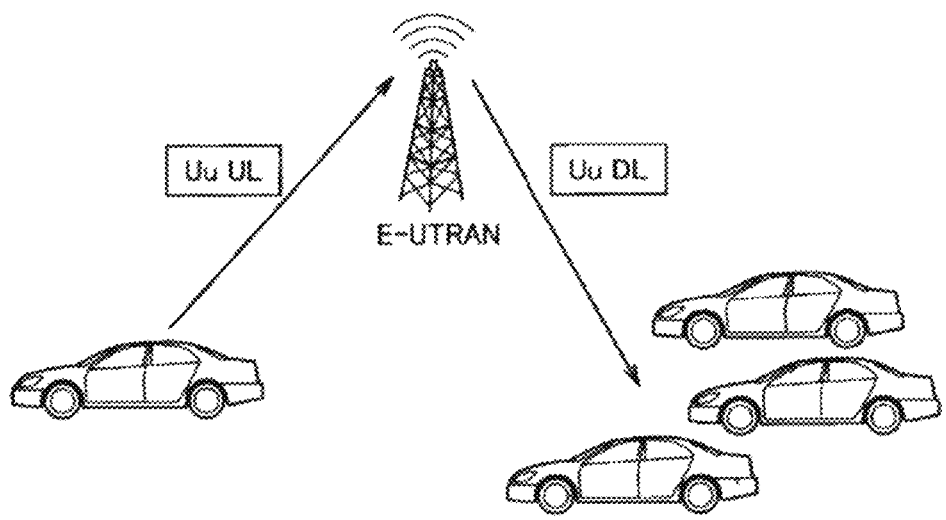
FIG. 5 is a diagram for describing an example of the V2X operation scenario.
Figure 6:
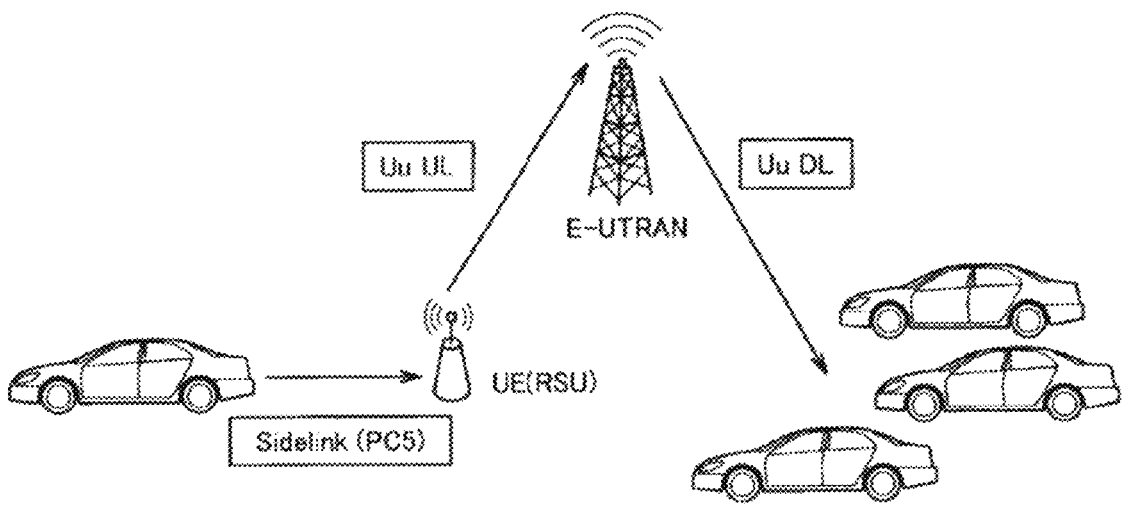
FIG. 6 is a diagram for describing an example of the V2X operation scenario.
Figure 7:
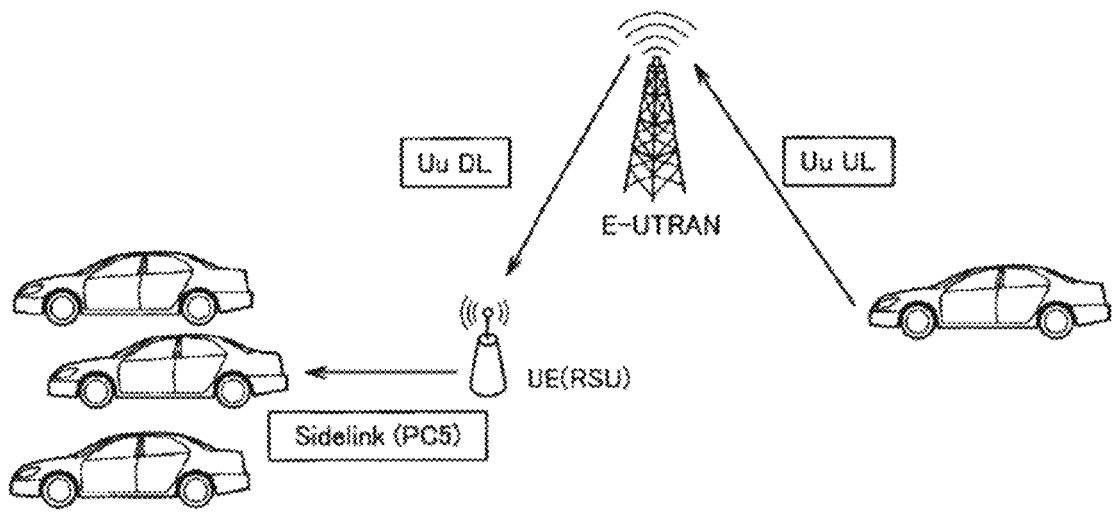
FIG. 7 is a diagram for describing an example of the V2X operation scenario.
Figure 8:
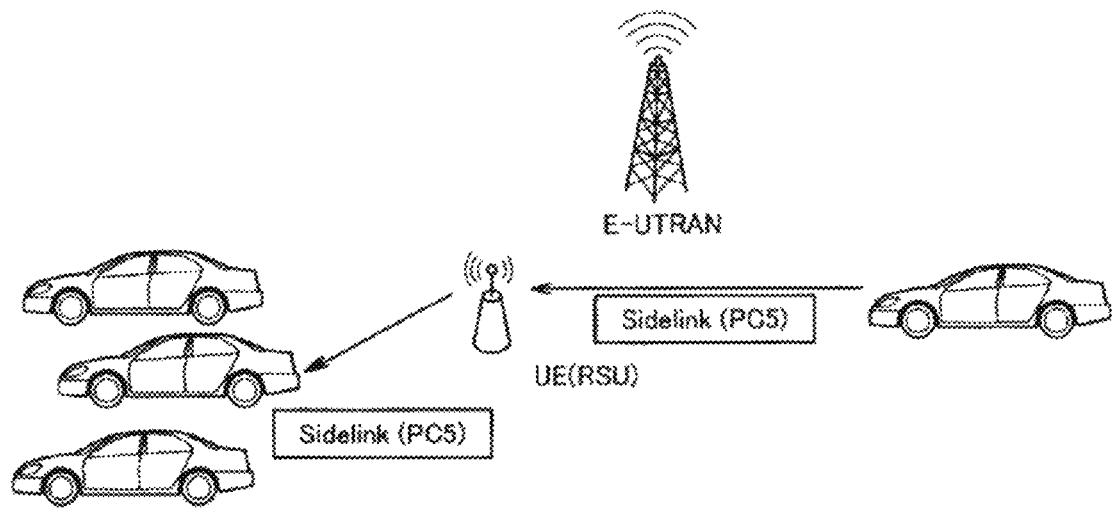
FIG. 8 is a diagram for describing an example of the V2X operation scenario.
Figure 9:
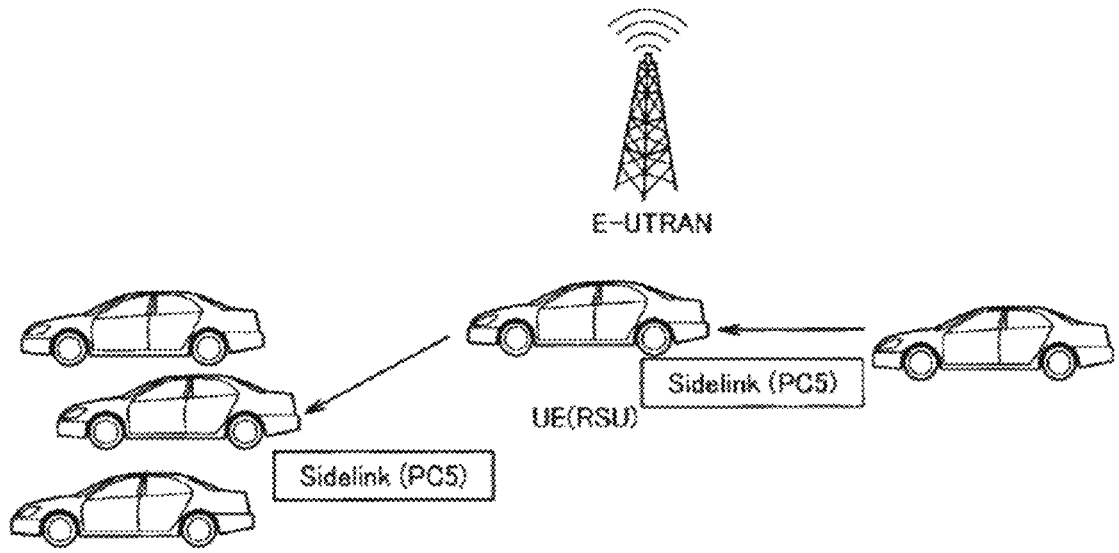
FIG. 9 is a diagram for describing an example of the V2X operation scenario.

For example, each of FIGS. 4 to 9 is a diagram for describing an example of a V2X operation scenario. Specifically, FIG. 4 illustrates a scenario in which vehicles perform direct communication with no base station (E-UTRAN) interposed in between. FIG. 5 illustrates a scenario in which vehicles perform communication via a base station. Each of FIGS. 6 and 7 illustrates a scenario in which vehicles perform communication via a terminal device (UE or RSU here) and a base station. Each of FIGS. 8 and 9 illustrates a scenario in which vehicles perform communication via a terminal device (UE or RSU or another vehicle here).

It is to be noted that the "sidelink" corresponds to a communication link between terminal devices in each of FIGS. 4 to 9 and is also referred to as PC5. Specific examples of the sidelink include communication links for V2V, V2P, and V2I. The "Uu interface" corresponds to a wireless interface between a terminal device and a base station. A specific example of the Uu interface is a communication link for V2N. The "PC5 interface" corresponds to a wireless interface between terminal devices.

<1.2. Extended Example of Sidelink Communication>

A variety of extended examples are conceivable for sidelink communication. For example, the V2X communication described above is one of the extended examples of sidelink communication. Additionally, as extended examples of sidelink communication, D2D (Device to Device) communication, MTC (Machine-type communication), a moving cell, relay communication, and the like are conceivable. The following describes extended examples of sidelink communication with reference to FIGS. 10 to 13.

Figure 10:
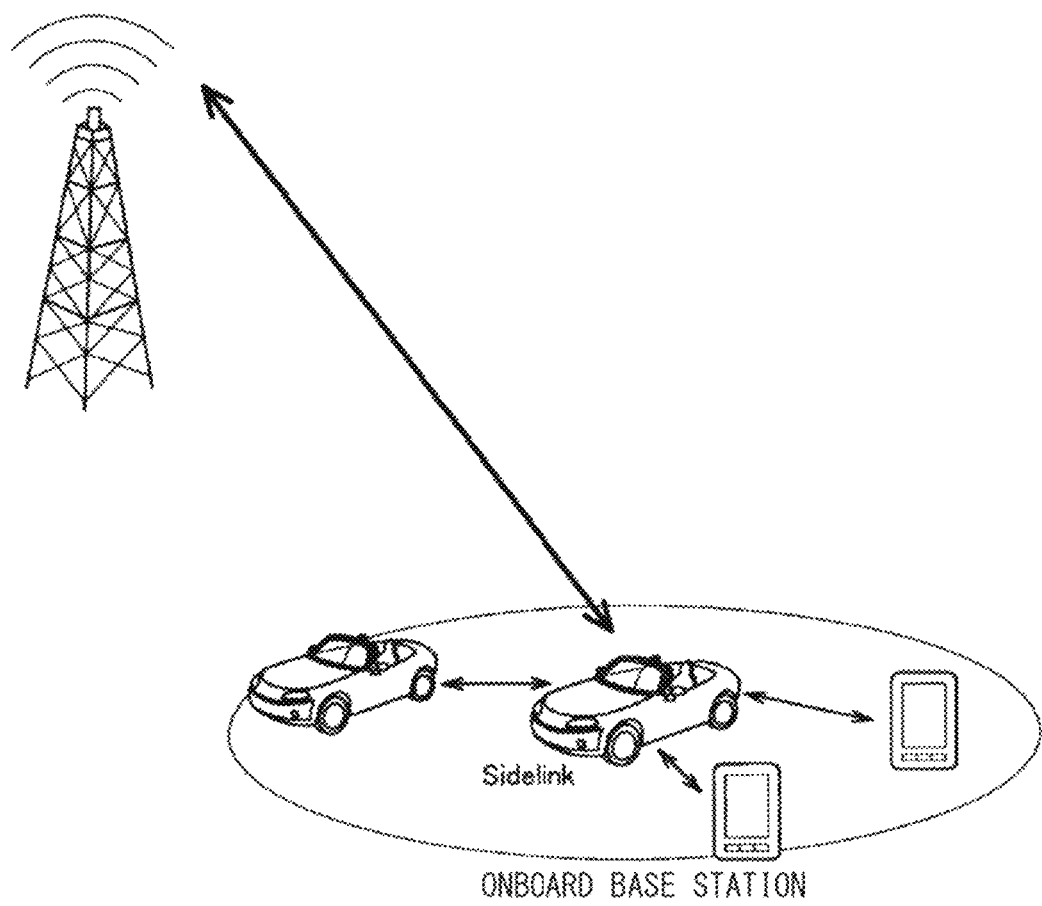
FIG. 10 is a diagram for describing an extended example of sidelink communication.

FIG. 10 illustrates an example in which sidelink communication is used by an onboard base station mounted on a vehicle. As illustrated in FIG. 10, the onboard base station performs communication with a nearby terminal device (e.g., UE in the same vehicle) or vehicle-to-vehicle communication with another vehicle by using sidelink communication. The onboard base station may be UE, RSU, or the like.

Figure 11:
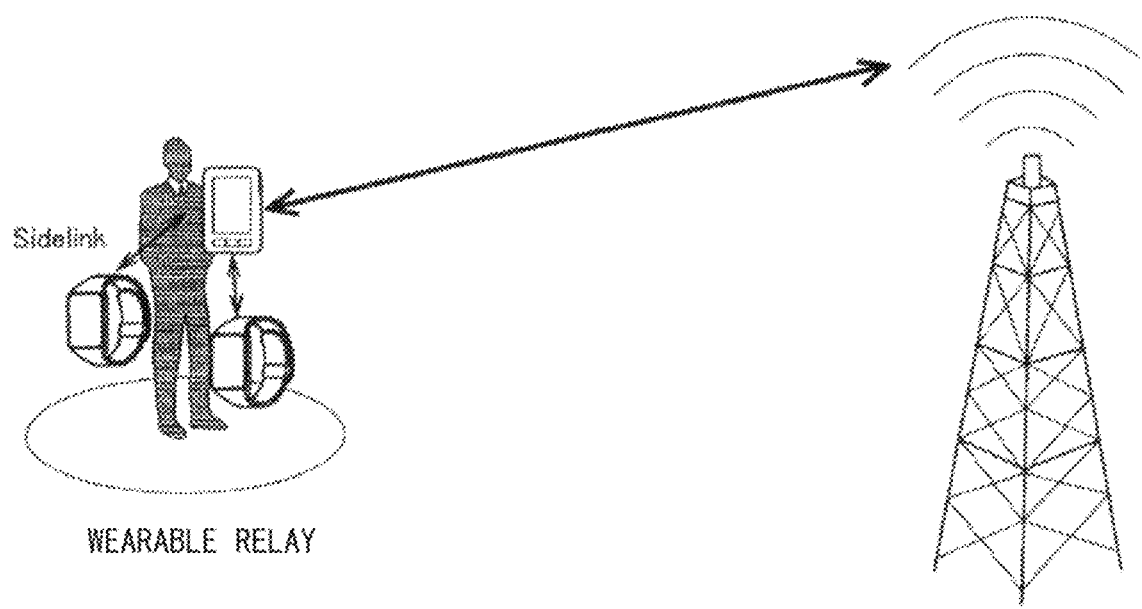
FIG. 11 is a diagram for describing an extended example of the sidelink communication.

FIG. 11 illustrates an example in which sidelink communication is used for relay communication for a wearable terminal provided by UE. As illustrated in FIG. 11, the UE performs sidelink communication with the wearable terminal and relays communication between the wearable terminal and the base station.

Figure 12:
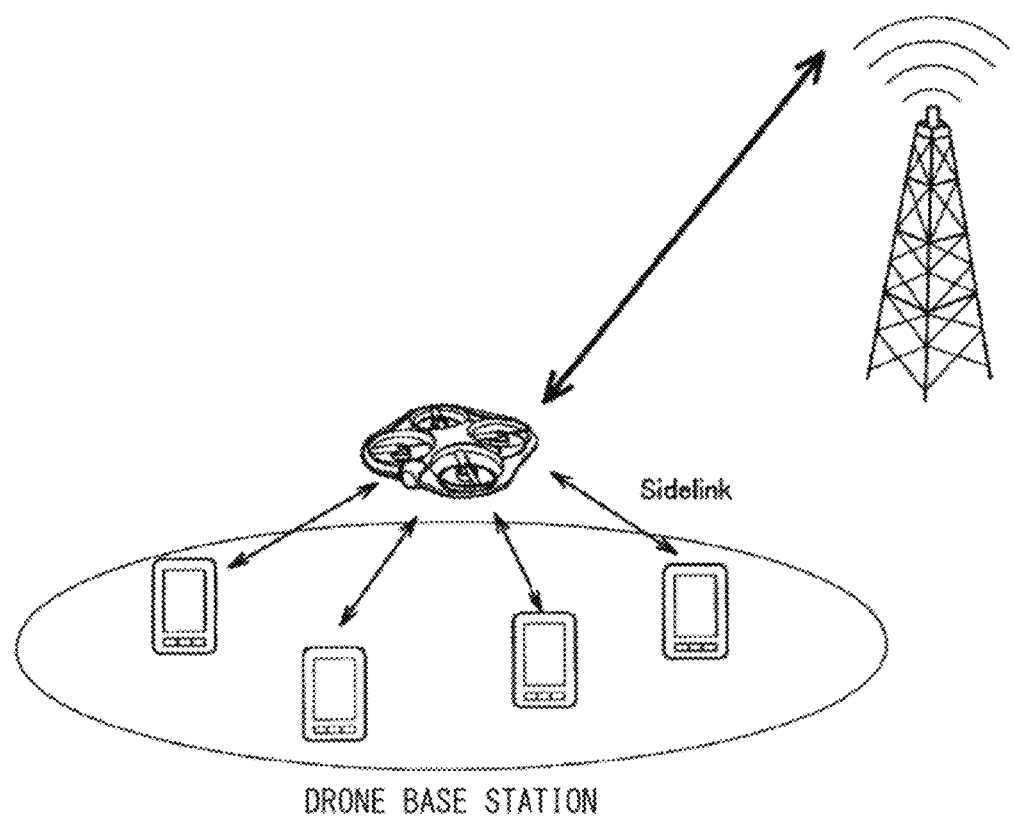
FIG. 12 is a diagram for describing an extended example of the sidelink communication.

FIG. 12 illustrates an example in which sidelink communication is used by a drone base station mounted on a drone. As illustrated in FIG. 12, the drone base station performs sidelink communication with nearby UE and relays communication with the UE and the base station.

Figure 13:
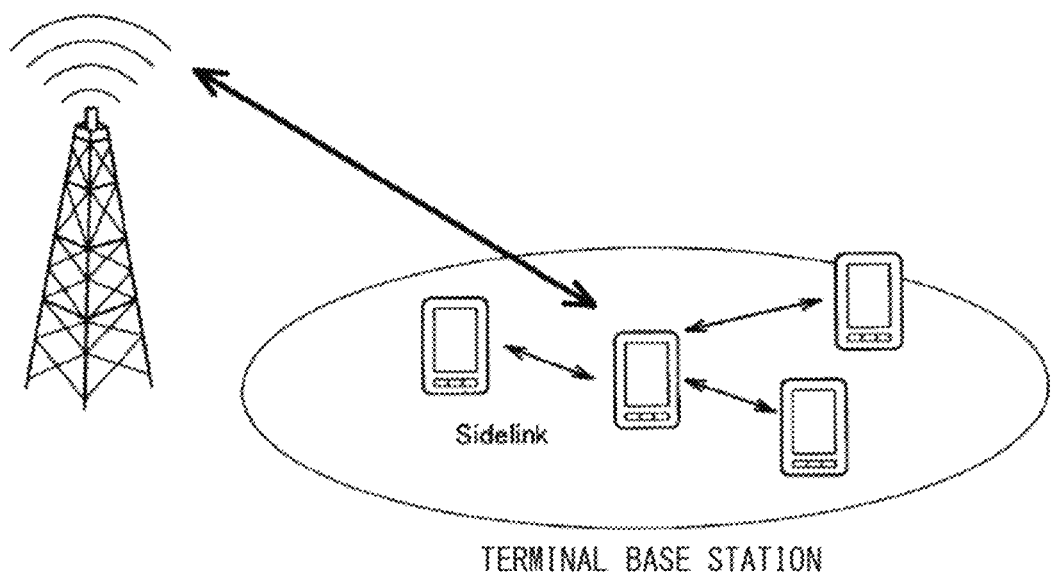
FIG. 13 is a diagram for describing an extended example of the sidelink communication.

FIG. 13 illustrates an example in which sidelink communication is used by a terminal base station mounted on UE. As illustrated in FIG. 13, the terminal base station performs sidelink communication with nearby UE and relays communication with the UE and the base station.

Additionally, extended examples of sidelink communication include a factory automation. In that case, sidelink communication may be used for communication between robots in the factory. For example, in a use case where emergency shutdown signals are broadcast to a group of robots to emergently shut down the production line, sidelink communication is used. In addition, extended examples of sidelink communication include communication between drones.

<1.3. Sidelink Resource Allocation Scheme>

Next, an overview of a scheme of resource allocation to the sidelink is described. Schemes of resource allocation to the sidelink include a "Mode 3 resource allocation" scheme in which a base station allocates a resource to the sidelink and a "Mode 4 resource allocation" scheme in which a terminal device performs sensing by itself and selects a resource for the sidelink. These are described with reference to FIG. 14.

FIG. 14 is a diagram for describing a sidelink resource allocation scheme. The left portion of FIG. 14 illustrates an example of the Mode 3 resource allocation. In the Mode 3 resource allocation, a resource pool is allocated in advance. In a case where a transmission packet occurs in a terminal, a base station allocates a resource to be used to transmit the packet in the resource pool. Whenever a transmission packet occurs, a base station allocates a resource in the Mode 3 resource allocation. This causes a high signaling overhead while preventing packets from having a collision. The right portion of FIG. 14 illustrates an example of the Mode 4 resource allocation. In the Mode 4 resource allocation, a resource pool is allocated in advance. In a case where a transmission packet occurs, a terminal autonomously selects a resource that is used to transmit the packet in the resource pool. In the Mode 4 resource allocation, packets may have a collision while causing fewer signaling overheads.

Resource Pool Allocation

For the Mode 3 resource allocation or the Mode 4 resource allocation, a resource pool is allocated in advance. The resource pool is allocated, for example, by a base station. In addition, as another example, the resource pool may be allocated by Pre-configuration. In the Mode 4 resource allocation, a terminal device performs sensing for a resource for sidelink communication from the allocated resource pool and selects an appropriate resource by itself to perform communication.

Figure 15:
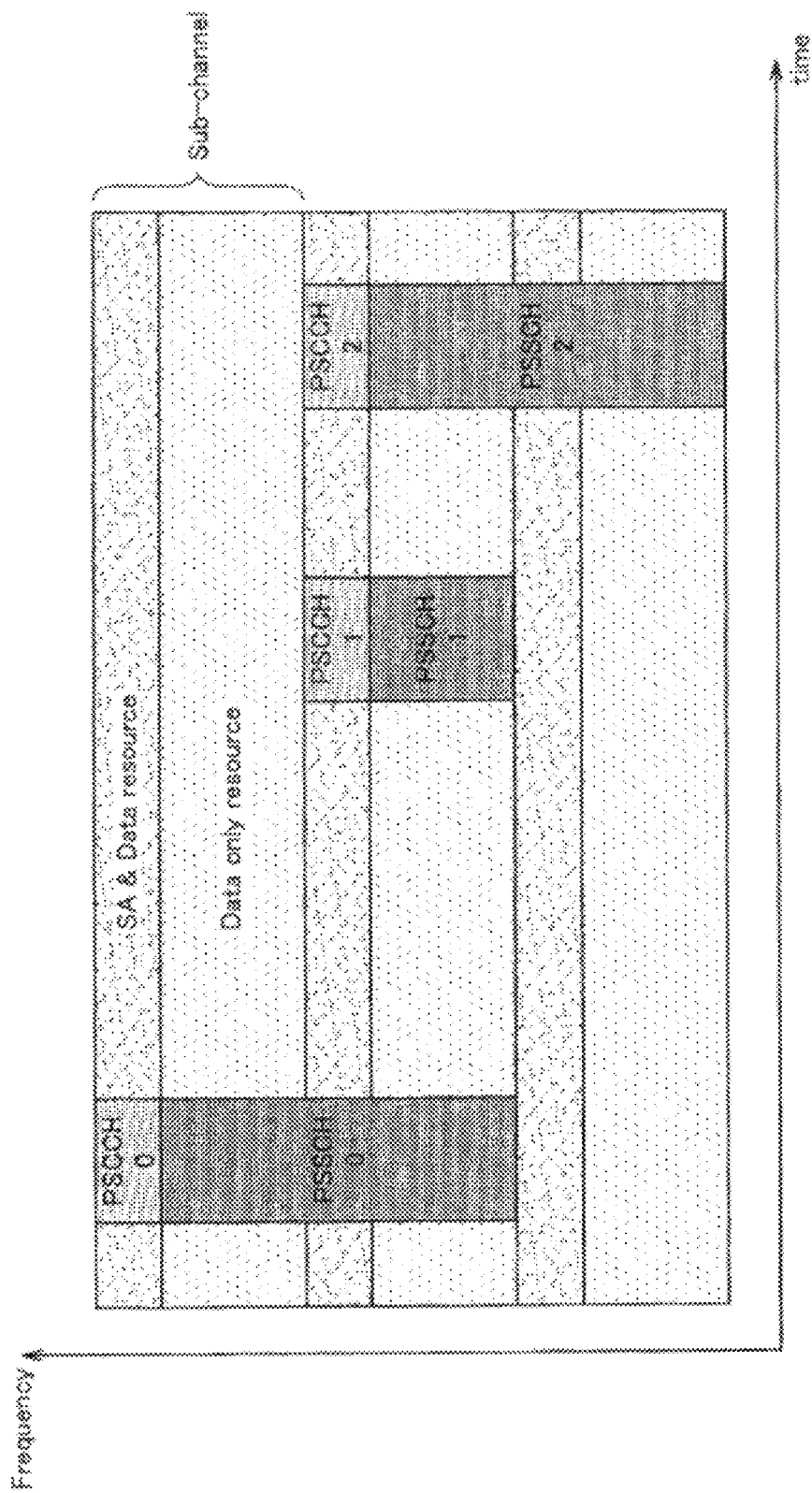
FIG. 15 is a diagram illustrating an example of a configuration of a resource allocated to the sidelink communication.

For example, FIG. 15 is a diagram illustrating an example of a configuration of a resource (resource pool) allocated for sidelink communication and illustrates an example of a case where frequency division multiplexing (FDM: Frequency Division Multiplexing) is applied. As illustrated in FIG. 15, the resource pool is divided into an SA (Scheduling Assignment) region and a Data region and PSCCH (Physical Sidelink Control Channel) and PSSCH (Physical Sidelink Shared Channel) are transmitted by the respective regions. It is to be noted that the following description focuses on a case where FDM is applied as illustrated in FIG. 15, but the application destination of the technology according to the present disclosure is not necessarily limited thereto. As a specific example, in a case where time division multiplexing (TDM: Time Division Multiplexing) is applied, it is also possible to apply the technology according to the present disclosure described below. It is to be noted that the SA region and the Data region are orthogonal to each other on the time axis in a case where TDM is applied.

Mode 4 Resource Allocation

Figure 16:
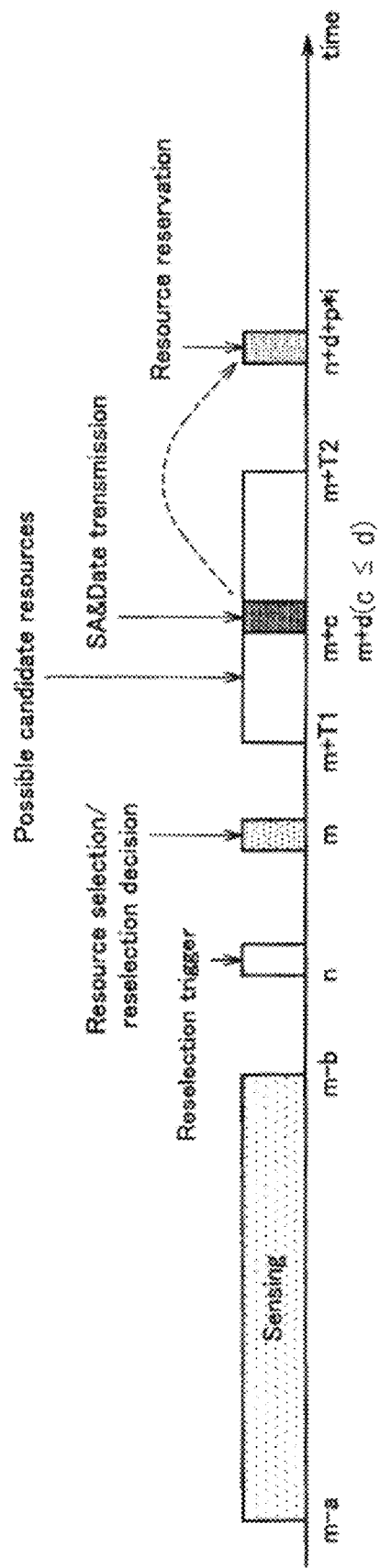
FIG. 16 is an explanatory diagram for describing an example of an operation timeline in a case where a terminal device transmits a packet on the basis of Mode 4 resource allocation.

An overview of the Mode 4 resource allocation is described with reference to FIG. 16. FIG. 16 is an explanatory diagram for describing an example of an operation timeline in a case where a terminal device transmits a packet on the basis of Mode 4 resource allocation. As illustrated in FIG. 16, a terminal device that transmits a packet first performs sensing to discover a resource to be used to transmit the packet from the resource pool. Next, the terminal device selects a resource from the resource pool on the basis of a result of the sensing. The terminal device then transmits a packet by using the selected resource. In addition, the terminal device then reserves a resource to be used for subsequent packet transmission as necessary.

Figure 17:
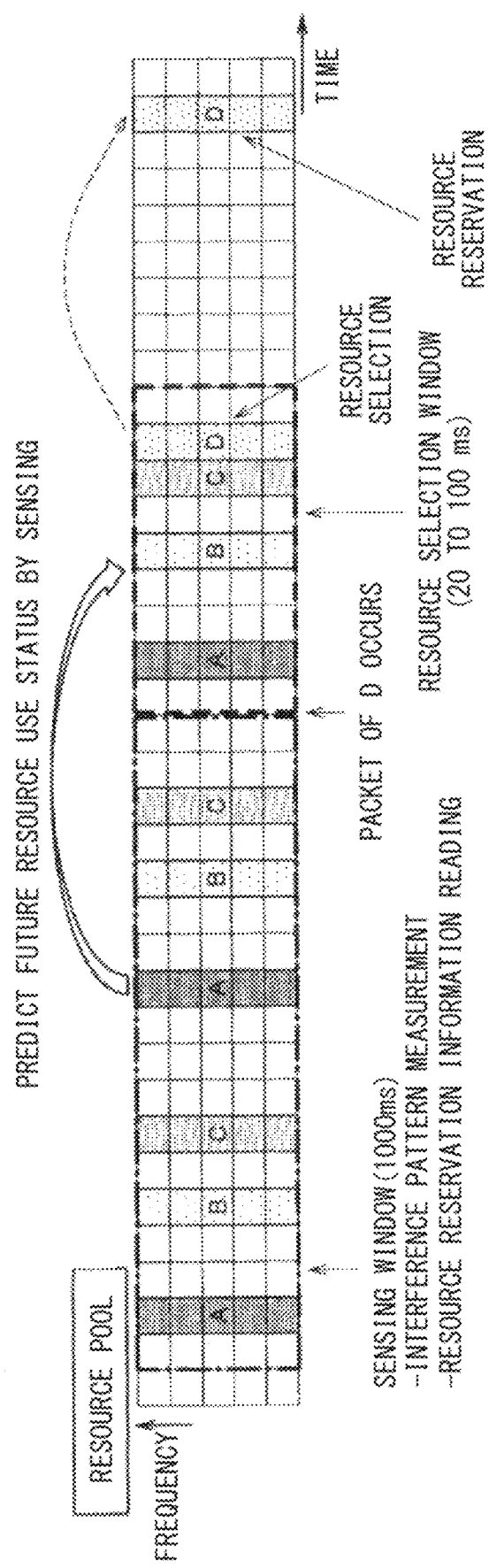
FIG. 17 is an explanatory diagram for describing an example of a sensing operation for selecting a resource from a resource pool.

Here, with reference to FIG. 17, an example of the sensing operation described above is described. FIG. 17 is an explanatory diagram for describing an example of a sensing operation for selecting a resource from a resource pool.

Specifically, the terminal device selects a resource in a resource selection window and makes a future resource reservation on the basis of a measurement result of an interference pattern in a sensing window and a reservation status of resources in the sensing window. As a specific example, in the example illustrated in FIG. 17, in a case where a packet D to be transmitted occurs, the terminal device predicts the use status of a resource in the future, for example, resources to be used to transmit other packets A to C in the future on the basis of a result of sensing. The use of a result of the prediction allows the terminal device to select or reserve a resource that is usable to transmit the packet D, that is, a resource that is predicted not to be used to transmit the other packets.

2. OVERVIEW OF PROPOSED TECHNOLOGY

2.1. System Configuration Example

Figure 18:
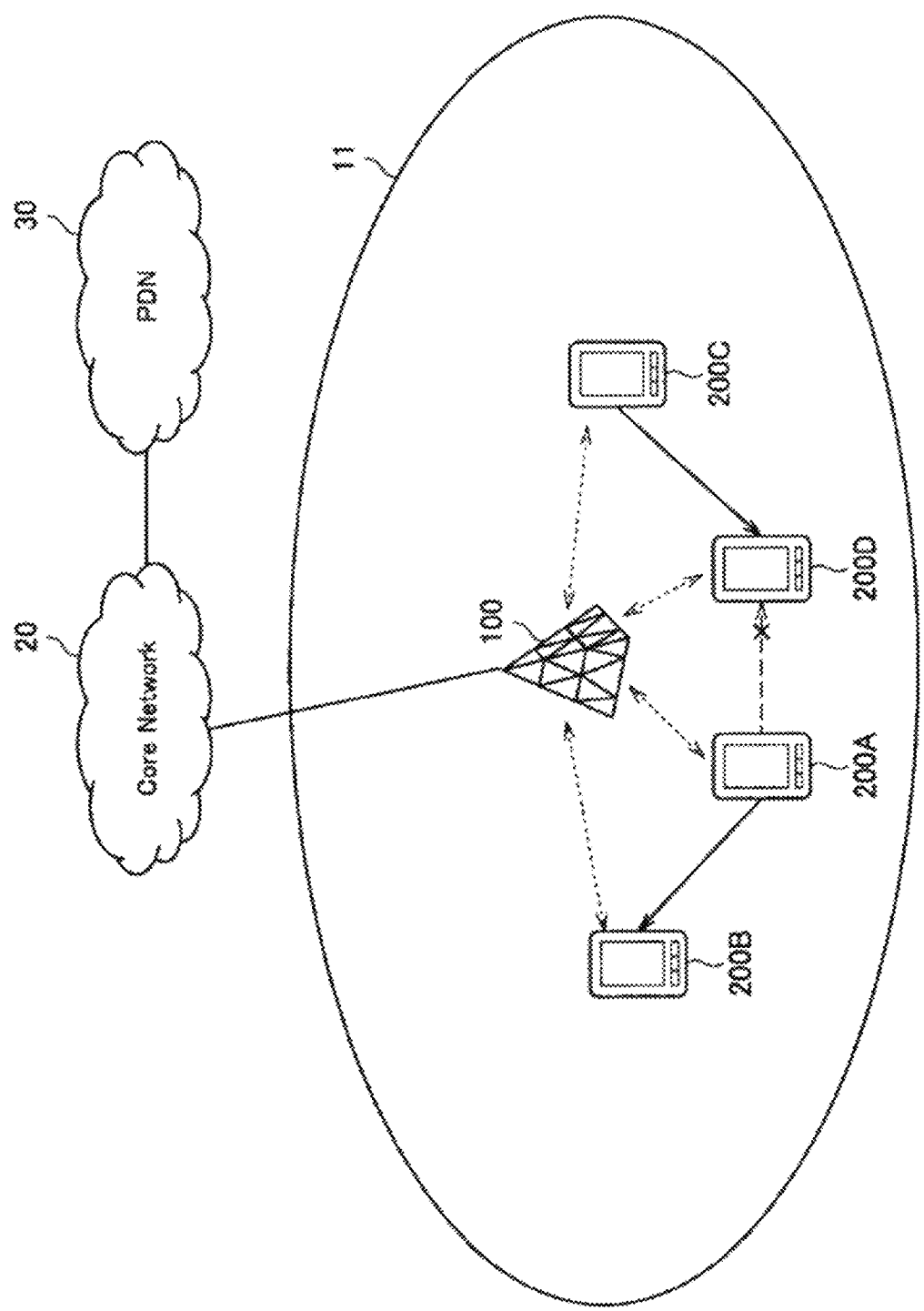
FIG. 18 is a diagram illustrating an example of a schematic configuration of a system according to an embodiment of the present disclosure.

Next, with reference to FIG. 18, an example of a schematic configuration of a system is described to which the proposed technology is applied. FIG. 18 is a diagram illustrating an example of a schematic configuration of a system 1 according to an embodiment of the present disclosure. As illustrated in FIG. 18, the system 1 includes a base station 100, the terminal devices 200 (200A to 200D), a core network (Core Network) 20, and PDN (Packet Data Network) 30.

The base station 100 is a communication device that operates a cell 11 and provides a wireless service to the one or more terminal devices 200 positioned inside the cell 11. The cell 11 may be operated, for example, in conformity with any wireless communication scheme such as LTE or NR. The base station 100 is coupled to the core network 20. The core network 20 is coupled to the PDN 30.

The core network 20 may include, for example, MME (Mobility Management Entity), S-GW (Serving gateway), P-GW (PDN gateway), PCRF (Policy and Charging Rule Function), and HSS (Home Subscriber Server). Alternatively, the core network 20 may include an entity of NR having a function similar to the functions of them. The MME is a control node that handles a signal of a control plane. The MME manages the movement state of a terminal device. The S-GW is a control node that handles a signal of a user plane. The S-GW is a gateway device that switches a transfer path of user data. The P-GW is a control node that handles a signal of a user plane. The P-GW is a gateway device that serves as a coupling point between the core network 20 and the PDN 30. The PCRF is a control node that performs control regarding the policy and charging for the QoS (Quality of Service) or the like of a bearer. The HSS is a control node that handles subscriber data and performs service control.

The terminal device 200 is a communication device that performs wireless communication with another device. For example, the terminal device 200 performs wireless communication with the base station 100 on the basis of control by the base station 100. In that case, the terminal device 200 transmits an uplink signal to the base station 100 and receives a downlink signal from the base station 100 on the Uu link. In addition, for example, the terminal device 200 performs wireless communication with the other terminal device 200 on the basis of control by the base station 100 or autonomously. In that case, the terminal device 200 transmits a sidelink signal to the other terminal device 200 and receives a sidelink signal from the other terminal device 200 on the PC5 link. For example, the terminal device 200A transmits a sidelink signal to the terminal device 200B and the terminal device 200C transmits a sidelink signal to the terminal device 200D. The terminal device 200 may be a so-called user terminal (User Equipment: UE).

2.2. Technical Problem

In the existing sidelink communication, transmission is performed after a predetermined procedure for collision prevention such as resource allocation from a base station in the Mode 3 resource allocation or sensing in the Mode 4 resource allocation is performed. This causes latency from the occurrence of a packet to the transmission of the packet. It is to be noted that a collision between packets means that a plurality of packets is transmitted and received by using resources (time resources and frequency resources) that overlap with each other at least in part.

A use case such as URLLC where emergency packets are transmitted with low latency and high reliability is requested to have a mechanism that allows packets to be transmitted with high reliability without causing such latency. Especially sidelink communication is different from the normal grant-free transmission on the Uu link in which a base station performs all control. It is a plurality of terminal devices that are transmitters in sidelink communication. This requests more complicated handling of the occurrence of a collision between packets.

2.3. Overview of Proposed Technology

Accordingly, the present disclosure provides a mechanism for allowing for the recovery of another packet having a collision with a packet transmitted on the sidelink. Above all, the present disclosure provides a mechanism for allowing for the recovery of another packet having a collision with a packet subjected to grant-free transmission on the sidelink. The recovery here is, for example, retransmission.

In a case where the terminal device 200 performs grant-free transmission on a packet, the terminal device 200 reports information regarding the grant-free transmission to another device (e.g., the base station 100 or the other terminal device 200). The base station 100 or the other terminal device 200 that receives the report determines the presence or absence of the occurrence of a collision and performs a process for retransmitting a packet that is determined as having a collision. This retransmits the other packet having a collision with the packet subjected to the grant-free transmission. In this way, while grant-free transmission achieves low-latency packets, the recovery of another packet is achieved that has a collision with the packet subjected to the grant-free transmission.

The following assumes that the terminal device 200A (corresponding to a first terminal device) performs grant-free transmission on a packet to the terminal device 200B in the example illustrated in FIG. 18. It is then assumed that a packet transmitted by the terminal device 200C (corresponding to a second terminal device) to the terminal device 200D has a collision with the packet subjected to the grant-free transmission by the terminal device 200A. The following also refers to the terminal device 200A as transmission terminal 200A, refers to the terminal device 200B as reception terminal 200B, refers to the terminal device 200C as nearby transmission terminal 200C, and refers to the terminal device 200D as nearby reception terminal 200D. Meanwhile, in a case there is no need to particularly distinguish these terminal devices, they are also simply referred to as terminal devices 200 generically. In addition, it is to be noted that the following also refers sometimes to a packet which is transmitted by the transmission terminal 200A as first packet and refers to a packet to be transmitted by the nearby transmission terminal 200C as second packet.

In addition, the following focuses on sidelink communication (V2V/I/P) in NR V2X communication. In the NR V2X communication, an URLLC packet is sometimes transmitted that is an emergency message. Accordingly, the following describes an URLLC packet transmission method with low latency and high reliability (at least low latency) on the sidelink. It is to be noted that the URLLC packet is a packet which is transmitted in a use case of URLLC.

3. CONFIGURATION EXAMPLES

The following describes a configuration example of each device related to the proposed technology.

<3.1. Configuration Example of Base Station>

Figure 19:
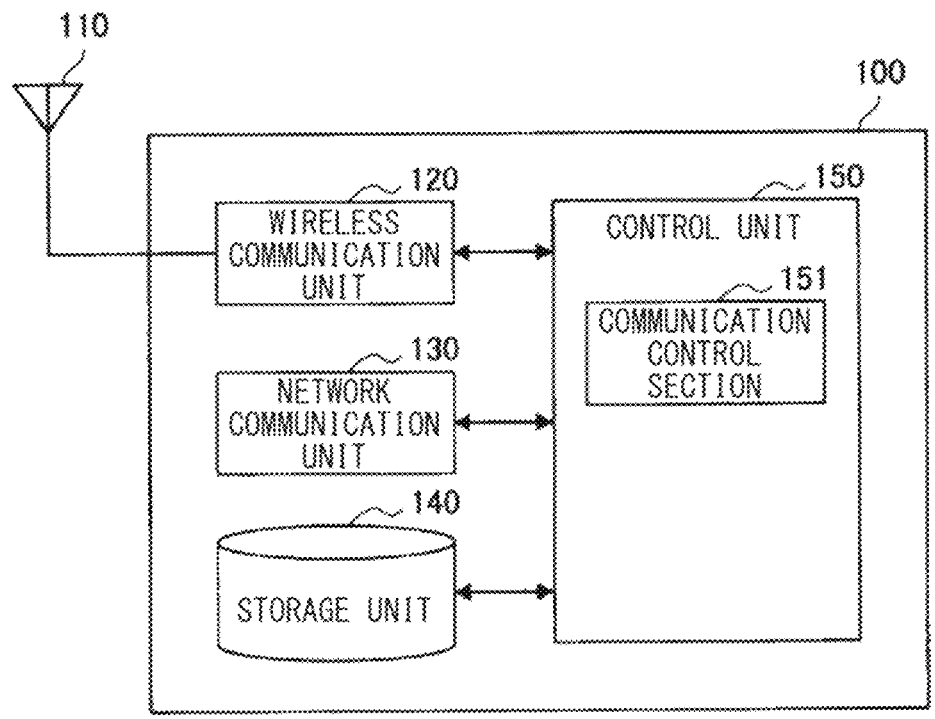
FIG. 19 is a block diagram illustrating an example of a logical configuration of a base station according to the embodiment.

FIG. 19 is a block diagram illustrating an example of a logical configuration of a base station 100 according to the present embodiment. The base station 100 according to the present embodiment includes an antenna unit 110, a wireless communication unit 120, a network communication unit 130, a storage unit 140, and a control unit 150 as illustrated in FIG. 19.

The antenna unit 110 emits a signal into space as radio waves. The signal is outputted by the wireless communication unit 120. In addition, the antenna unit 110 converts radio waves in space into a signal and outputs the signal to the wireless communication unit 120.

The wireless communication unit 120 transmits and receives signals. For example, the wireless communication unit 120 receives an uplink signal from a terminal device and transmits a downlink signal to the terminal device.

The network communication unit 130 transmits and receives information. For example, the network communication unit 130 transmits information to another node and receives information from the other node. For example, the other node described above includes another base station and a core network node.

The storage unit 140 temporarily or permanently stores programs and various kinds of data for operations of the base station 100.

The control unit 150 provides a variety of functions for the base station 100. For example, the control unit 150 includes a communication control section 151. The communication control section 151 has a function of controlling sidelink communication by the terminal device 200 under control such as allocating a resource pool to the terminal device 200, allocating a resource to the terminal device 200 in which a transmission packet occurs, or issuing an instruction to retransmit a packet having a collision. The control unit 150 may further include another component in addition to the communication control section 151. In other words, the control unit 150 may also perform an operation other than that of the communication control section 151.

<3.2. Configuration Example of Terminal Device>

Figure 20:
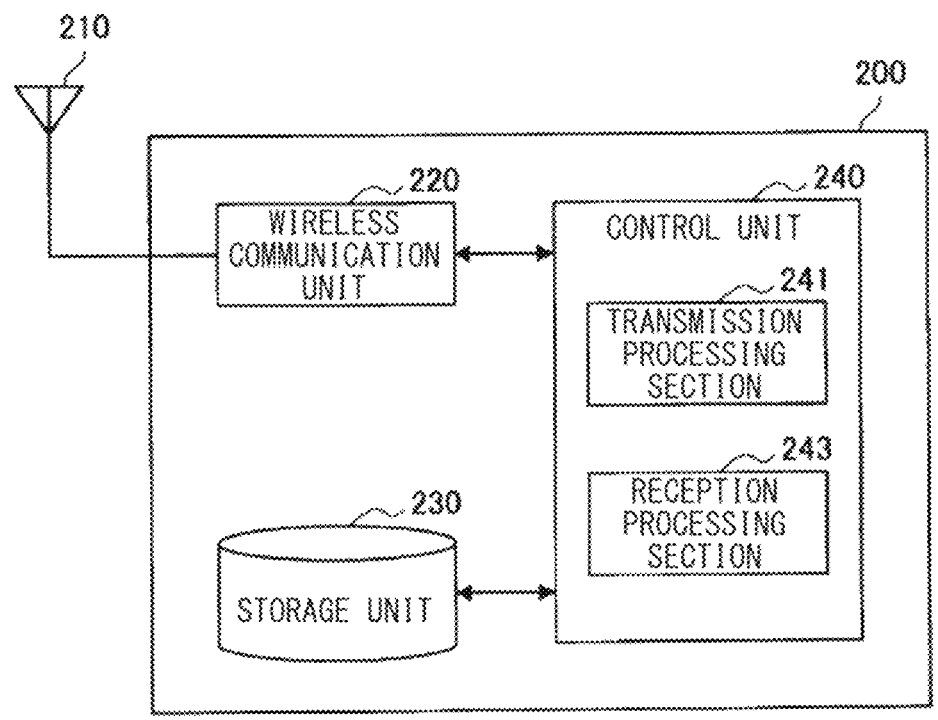
FIG. 20 is a block diagram illustrating an example of a logical configuration of a terminal device according to the embodiment.

FIG. 20 is a block diagram illustrating an example of a logical configuration of a terminal device 200 according to the present embodiment. The terminal device 200 according to the present embodiment includes an antenna unit 210, a wireless communication unit 220, a storage unit 230, and a control unit 240 as illustrated in FIG. 20.

The antenna unit 210 emits a signal into space as radio waves. The signal is outputted by the wireless communication unit 220. In addition, the antenna unit 210 converts radio waves in space into a signal and outputs the signal to the wireless communication unit 220.

The wireless communication unit 220 transmits and receives signals. For example, the wireless communication unit 220 receives a downlink signal from a base station and transmits an uplink signal to the base station. In addition, the wireless communication unit 220 transmits and receives sidelink signals (such as V2P signals/V2V signals/V2I signals) to and from the other terminal device 200.

The storage unit 230 temporarily or permanently stores programs and various kinds of data for operations of the terminal device 200.

The control unit 240 provides a variety of functions for the terminal device 200. For example, the control unit 240 includes a transmission processing section 241 and a reception processing section 243. The transmission processing section 241 has functions of performing grant-based transmission, grant-free transmission, retransmission, and the like on packets inputted from a higher layer. The reception processing section 243 has functions of receiving and decoding a packet to output the packet to a higher layer. The control unit 240 may further include another component in addition to these components. In other words, the control unit 150 may also perform an operation other than that of each of these components.

4. TECHNICAL FEATURES

<4.1. Process in Mode 3 Resource Allocation Environment>

The following describes the recovery of a packet having a collision with a packet transmitted (i.e., subjected to grant-free transmission) with a predetermined procedure for collision prevention omitted in a Mode 3 resource allocation environment. The predetermined procedure for collision prevention in this example is allocating a resource (i.e., grant).

<4.1.1. Overview>

The transmission terminal 200A performs grant-free transmission (also referred to as Configured Grant transmission) on the first packet and reports information regarding the grant-free transmission to the base station 100. The base station 100 grasps the resource used by the nearby transmission terminal 200C to transmit a second packet because of the Mode 3 resource allocation. This allows the base station 100 to determine the presence or absence of the occurrence of a collision. The base station 100 instructs the nearby transmission terminal 200C to retransmit a second packet in which it is determined that a collision occurs.

The transmission terminal 200A may report information regarding grant-free transmission to the other nearby terminal device 200 (e.g., nearby transmission terminal 200C). In that case, the nearby transmission terminal 200C determines the presence or absence of the occurrence of a collision between packets and retransmits a packet for which the occurrence of a collision is determined.

<4.1.2. Grant-Based Transmission>

Figure 21:
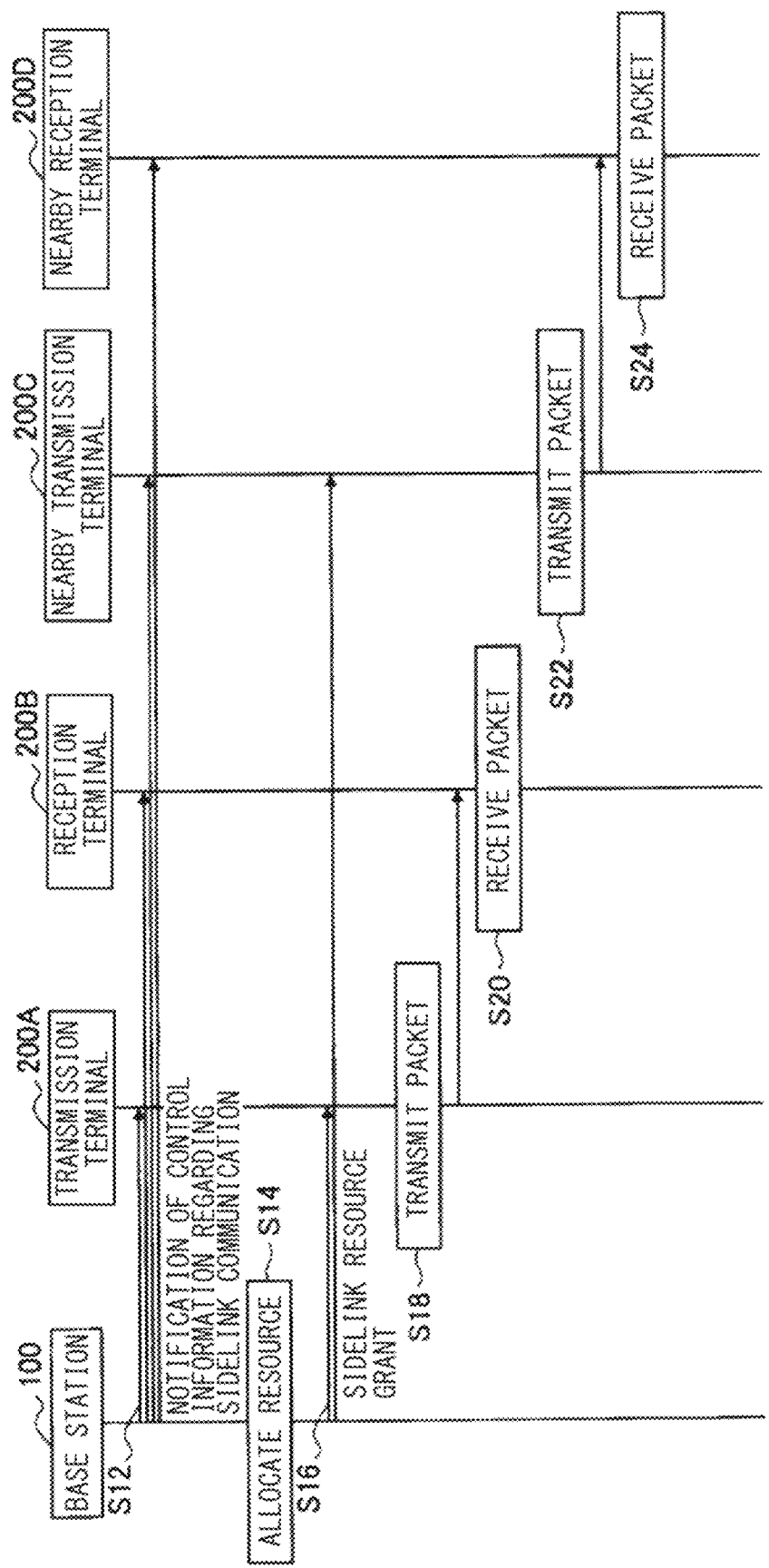
FIG. 21 is a sequence diagram illustrating an example of a flow of processes for grant-based transmission.

The following describes a flow of a normal grant-based transmission process with reference to FIG. 21 for comparison. FIG. 21 is a sequence diagram illustrating an example of a flow of processes for grant-based transmission. This sequence involves the base station 100, the transmission terminal 200A, the reception terminal 200B, the nearby transmission terminal 200C, and the nearby reception terminal 200D.

As illustrated in FIG. 21, the base station 100 first notifies each of the terminal devices 200 (200A to 200D) under control of control information regarding sidelink communication (step S12). The control information includes, for example, various kinds of setting information such as information regarding the allocation of a resource pool, setting information regarding transmission power, and setting information regarding MCS (Modulation and Coding Scheme). The base station 100 then allocates a resource to the terminal device 200 in which a transmission packet occurs (step S14) and transmits a sidelink resource grant including a result of the allocation of a resource (step S16). Next, the transmission terminal 200A transmits a first packet by using the allocated resource (step S18) and the reception terminal 200B receives the first packet (step S20). Meanwhile, the nearby transmission terminal 200C transmits a second packet by using the allocated resource (step S22) and the nearby reception terminal 200D receives the second packet (step S24).

<4.1.3. Grant-Free Transmission and Recovery Process>

Figure 22:
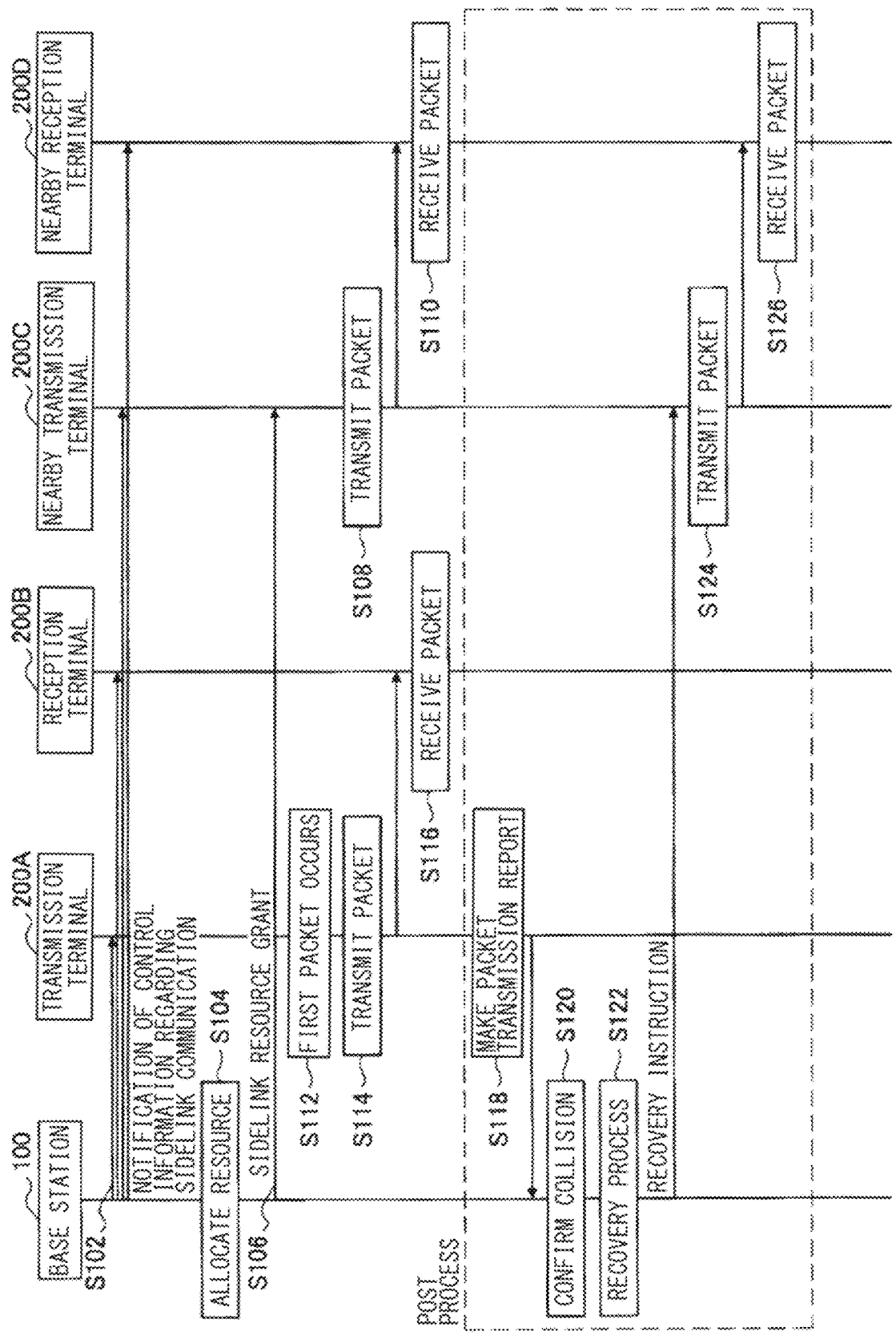
FIG. 22 is a sequence diagram illustrating an example of a flow of grant-free transmission and a recovery process executed by the system according to the embodiment.

Next, with reference to FIG. 22, a flow of grant-free transmission and a recovery processes according to the proposed technology is described. FIG. 22 is a sequence diagram illustrating an example of a flow of grant-free transmission and a recovery process executed by the system 1 according to the present embodiment. This sequence involves the base station 100, the transmission terminal 200A, the reception terminal 200B, the nearby transmission terminal 200C, and the nearby reception terminal 200D.

As illustrated in FIG. 22, the base station 100 first notifies each of the terminal devices 200 (200A to 200D) under control of control information regarding sidelink communication (step S102). The base station 100 then allocates a resource to the terminal device 200 in which a second packet to be transmitted occurs (step S104) and transmits a sidelink resource grant including a result of the allocation of a resource (step S106). Next, the nearby transmission terminal 200C transmits a second packet by using the allocated resource (step S108) and the nearby reception terminal 200D receives the second packet (step S110).

Meanwhile, in a case where a first packet (URLLC packet here) to be transmitted occurs (step S112), the transmission terminal 200A performs grant-free transmission on the first packet (step S114) and the reception terminal 200B receives the first packet (step S116).

The first packet is transmitted with the predetermined procedure (i.e., resource grant) for collision prevention omitted, achieving low latency. Meanwhile, the transmission terminal 200A performs grant-free transmission and a first packet and a second packet may thus have a collision. For the recovery of failure in receiving the second packet caused by this collision, the transmission terminal 200A executes a post process.

Specifically, the transmission terminal 200A makes a packet transmission report to report to the base station 100 that grant-free transmission is performed on a first packet (step S118). If described in detail, the transmission terminal 200A transmits transmission report information to the base station 100. The transmission report information includes information indicating the time and the frequency of the resource used for the grant-free transmission of a first packet. After that, the base station 100 compares a result of its own resource allocation to a second packet and the resource used to transmit the first packet on the basis of the received transmission report information and confirms the presence or absence of the occurrence of a collision (step S120). In a case where a collision occurs, the nearby reception terminal 200D may possibly fail in receiving the second packet. This causes the base station 100 to execute the recovery process (step S122). The recovery process by the base station 100 includes, for example, instructing the nearby transmission terminal 200C to perform a retransmission procedure. In that case, the base station 100 reallocates a sidelink resource and transmits a sidelink resource grant including a result of the reallocation and a recovery instruction of the second packet to the nearby transmission terminal 200C. Upon receiving the recovery instruction, the nearby transmission terminal 200C retransmits the second packet by using the allocated resource again (step S124) and the nearby reception terminal 200D receives the retransmitted second packet (step S126). In this way, it is possible to cause the nearby reception terminal 200D to succeed in receiving the second packet in step S126 in a case where the nearby reception terminal 200D fails in receiving the second packet in step S110.

It is to be noted that the transmission report information is transmitted to the base station 100 in the example illustrated in FIG. 22, but the present technology is not limited to the example. For example, the transmission report information may also be directly transmitted to the nearby transmission terminal 200C. In that case, the nearby transmission terminal 200C confirms the presence or absence of the occurrence of a collision. In a case where it is determined that a collision occurs, the nearby transmission terminal 200C performs a recovery process. The recovery process by the nearby transmission terminal 200C includes, for example, transmitting a resource request to the base station 100 and retransmitting a second packet by using the allocated resource. It is to be noted that the resource request is a request for resource allocation.

<4.1.4. Operation of Each Device>

The above has described the overview of the process in the Mode 3 resource allocation environment. The following describes the operation of each node in detail.

(1) Operation of Transmission Terminal 200A

Determination in Case Where First Packet Occurs

The transmission terminal 200A (e.g., transmission processing section 241) may make the following determination in a case where a first packet that is an URLLC packet occurs.

The transmission terminal 200A may determine whether or not there is an allocation resource that allows a first packet to be transmitted. In a case where it is determined that there is an allocation resource, the transmission terminal 200A transmits a first packet by using the allocation resource. In contrast, in a case where it is determined there is no allocation resource, the transmission terminal 200A transmits a resource request to the base station 100. It is to be noted that a resource which allows an URLLC packet to be transmitted may be allocated in advance through RRC (Radio Resource Control) signaling from the base station 100.

In a case where the transmission terminal 200A transmits a resource request to the base station 100, the transmission terminal 200A may determine whether or not a latency requirement is satisfied. In other words, in a case where the transmission terminal 200A transmits a first packet by using a resource that is assumed to be allocated by the base station 100 in a case where the transmission terminal 200A transmits a resource request, the transmission terminal 200A determines whether or not the latency requirement is satisfied. In a case where it is determined that the latency requirement is satisfied, the transmission terminal 200A transmits a resource request. In contrast, in a case where it is determined that the latency requirement is not satisfied, the transmission terminal 200A performs grant-free transmission.

Grant-free Transmission

As described above, the grant-free transmission is a method of transmitting a packet without executing the predetermined procedure for packet collision prevention. In other words, the grant-free transmission is a transmission method that is unable to satisfy a predetermined criterion for packet collision prevention (i.e., a collision between packets may occur).

The predetermined procedure here includes receiving the allocation of a resource for the transmission of a packet. In other words, in grant-free transmission, a packet is transmitted without receiving the allocation of a resource by the base station 100.

It is to be noted that sensing or LBT (Listen Before Talk) may be executed before grant-free transmission. The sensing here is sensing for a predetermined time (such as one second) as defined in 3GPP LTE V2X. In addition, LBT refers to sensing for a shorter period. LBT is sensing on the order of several ms before transmission, for example, as used in Wi-Fi (registered trademark). The base station 100 sets whether or not it is possible to execute sensing.

A resource pool for grant-free transmission may be allocated in advance through RRC signaling from the base station 100. Out of coverage, a resource pool for grant-free transmission may be subjected to Pre-configuration in the terminal device 200. The resource pool for grant-free transmission may be the same as a normal resource pool (i.e., for grant-based transmission) or may be limited in the time direction and/or the frequency direction.

RRC signaling regarding a resource pool for grant-free transmission includes information indicating the position of the resource pool in the time direction and information indicating the position in the frequency direction, information indicating the number of times transmission is repeated for repeated transmission, and the like. It is to be noted that the information indicating the position of a resource pool in the time direction may include information regarding a predetermined time cycle in the time direction in units of symbols, units of slots, or units of sub-frames. In addition, the information indicating the position of a resource pool in the frequency direction may include information regarding a resource block or a resource element.

In grant-free transmission, the transmission terminal 200A may randomly select a transmission resource by itself. In addition, the transmission terminal 200A may also select a transmission resource in accordance with a predetermined selection criterion. The predetermined selection criterion may be set, for example, by the base station 100.

Transmission of Transmission Report Information

After performing grant-free transmission on a first packet on the sidelink, the transmission terminal 200A (e.g., transmission processing section 241) transmits transmission report information including information regarding the grant-free transmission of the first packet. The transmission of the transmission report information allows the receiver side of the transmission report information to confirm the presence or absence of the occurrence of a collision between the first packet and a second packet. In a case where a collision occurs, the retransmission of the second packet is achieved. Especially in a case where the transmission terminal 200A transmits a first packet without executing the predetermined procedure (i.e., resource allocation) for packet collision prevention, the transmission terminal 200A transmits the transmission report information. The transmission report information is transmitted only in a case where packets may have a collision. This makes it possible to suppress signaling overheads.

The transmission terminal 200A transmits the transmission report information on the Uu link and/or the sidelink. In other words, the transmission terminal 200A may transmit the transmission report information to the base station 100 or transmit the transmission report information to the other terminal device 200 (i.e., nearby transmission terminal 200C). To transmit the transmission report information, the control channel of a physical layer is used. In a case where the transmission report information is transmitted to the base station 100, an uplink control channel (PUCCH) defined or set in advance is used. In a case where the transmission report information is transmitted to the other terminal device 200, a sidelink control channel defined or set in advance is used.

The transmission terminal 200A may transmit the transmission report information by using a resource having a predetermined relationship in the time direction with a resource that is used to transmit a first packet. For example, on the basis of a resource that is used to transmit a first packet, a resource that is used to transmit the transmission report information is decided. A slot that is used to transmit the transmission report information may be the same slot as or the slot subsequent to a slot that is used to transmit a first packet. Here, the slot that is used to transmit the transmission report information may be decided in accordance with a symbol that is used to transmit a first packet. For example, in a case where a first packet is transmitted before a predetermined symbol in a certain slot, the slot that is used to transmit the transmission report information is decided as the same slot as the slot that is used to transmit the first packet. In contrast, in a case where a first packet is transmitted after the predetermined symbol in the certain slot, the slot that is used to transmit the transmission report information is decided as the slot subsequent to the slot that is used to transmit the first packet. The base station 100 or the nearby transmission terminal 200C is able to easily receive the transmission report information by using the predetermined relationship described above. If described in detail, the base station 100 or the nearby transmission terminal 200C constantly monitors a resource having the above-described predetermined relationship in the time direction with a resource that is used to transmit a second packet. In a case where a collision actually occurs and the transmission report information is transmitted, this allows the base station 100 or the nearby transmission terminal 200C to receive the transmission report information.

Contents of Transmission Report Information

The transmission report information includes information indicating the time and the frequency of a resource used by the transmission terminal 200A for the grant-free transmission of a first packet. For example, the transmission report information may include a resource block number, a symbol number, a slot number, and/or a system frame number. In addition, for example, the transmission report information may include the start number of a transmission resource and the end number of a transmission resource. It is to be noted that a resource for a report may be defined or set in advance and the transmission report information may include information indicating the resource for a report including a resource actually used for grant-free transmission to reduce the amount of information. It is desirable that the resource for a report be defined or set to be larger in size than a resource that may be used for grant-free transmission. The transmission report information includes time frequency information, thereby allowing the receiver side of the transmission report information to determine the presence or absence of the occurrence of a collision.

The transmission report information may further include at least any of the following pieces of information.

Information indicating a resource pool used to transmit a first packet

Information indicating frequency band used to transmit a first packet

Figure 23:
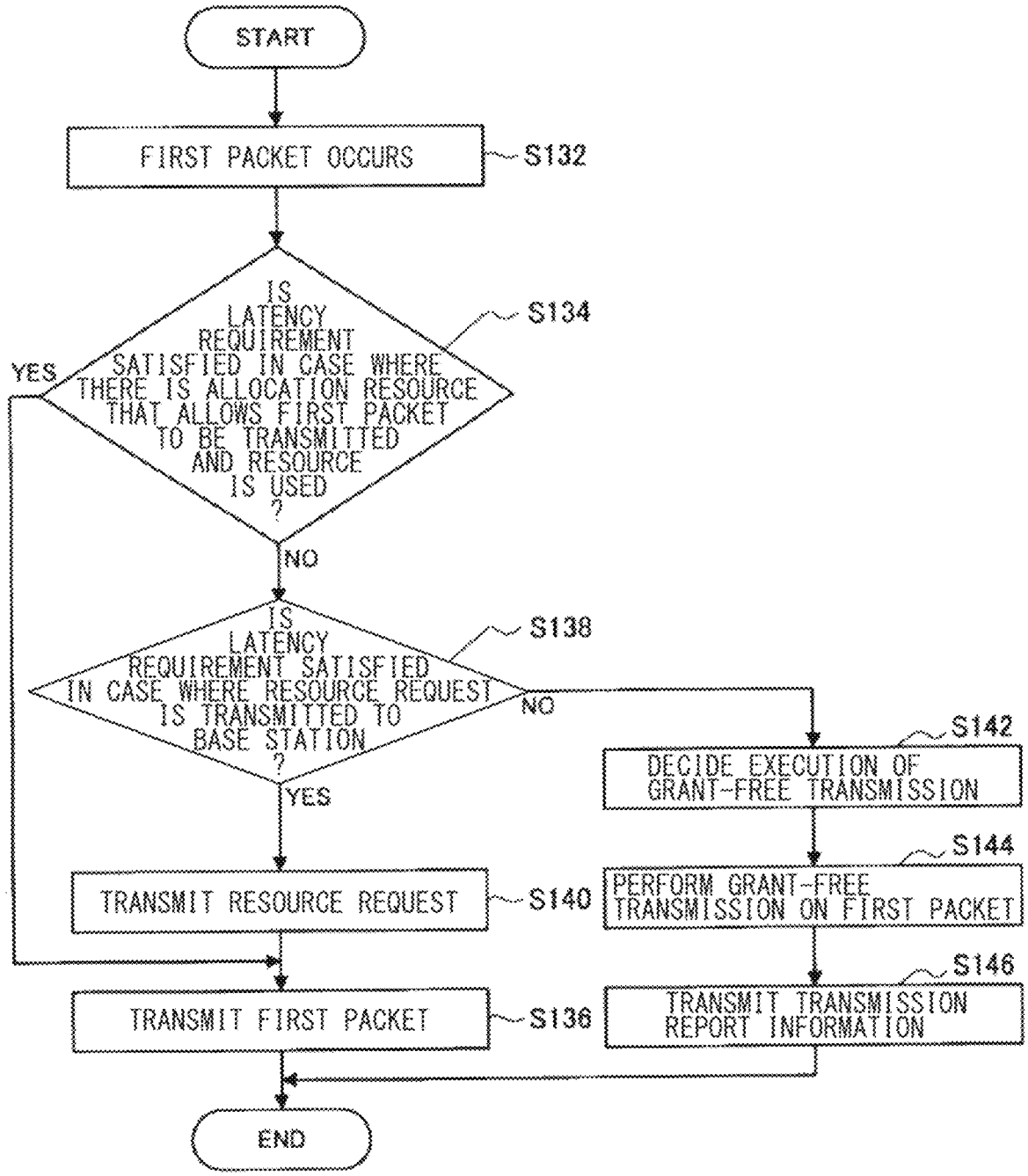
FIG. 23 is a flowchart illustrating an example of a flow of a transmission process of a first packet and a post process that are executed by a transmission terminal according to the embodiment.

Information indicating the number of times the transmission of a first packet is repeated Information indicating transmission power used to transmit a first packet Information indicating the priority of a first packet Position information regarding the transmission terminal 200A in the transmission of a first packet MCS information in the transmission of a first packet Transmission mode information in the transmission of a first packet QCL (Quasi-Colocation) information in the transmission of a first packet Flow of Processes The following describes an example of a flow of processes by the transmission terminal 200A with reference to FIG. 23. FIG. 23 is a flowchart illustrating an example of a flow of a transmission process of a first packet and a post process that are executed by the transmission terminal 200A according to the present embodiment.

As illustrated in FIG. 23, a first packet (e.g., URLLC packet) to be transmitted first occurs in the transmission terminal 200A (step S132). The transmission terminal 200A then determines whether a latency requirement is satisfied in a case where there is an allocation resource that allows the first packet to be transmitted and the resource is used (step S134). In a case where step S134 is YES, the transmission terminal 200A transmits the first packet by using the allocation resource (step S136). In a case where step S134 is NO, the transmission terminal 200A determines whether the latency requirement is satisfied in a case where a resource request is transmitted to the base station 100 (step S138). In a case where step S138 is YES, the transmission terminal 200A transmits a resource request to the base station 100 (step S140) and transmits the first packet by using a resource allocated by the base station 100 (step S136). In contrast, in a case where step S138 is NO, the transmission terminal 200A makes a decision to execute grant-free transmission (step S142) and performs grant-free transmission on the first packet (step S144). The transmission terminal 200A then transmits transmission report information including information regarding the grant-free transmission of the first packet (step S146).

(2) Operation of Reception Terminal 200B

The reception terminal 200B (e.g., reception processing section 243) receives and decodes a first packet transmitted from the transmission terminal 200A.

(3) Operation of Base Station 100

Resource Allocation

In a case where a transmission packet occurs in the terminal device 200 under control, the base station 100 (e.g., communication control section 151) allocates a resource for transmitting the packet. The base station 100 may allocate a resource for transmitting an URLLC packet in advance to the transmission terminal 200A. In this case, the base station 100 transmits a result of the allocation performed in advance to the transmission terminal 200A by using RRC signaling.

Recovery Process

On the basis of transmission report information including information regarding the grant-free transmission of a first packet by the transmission terminal 200A on the sidelink, the base station 100 (e.g., communication control section 151) controls the retransmission of a second packet by the nearby transmission terminal 200C that has transmitted the second packet on the sidelink. If described in detail, the base station 100 first determines the presence or absence of the occurrence of a collision between the first packet and the second packet on the basis of the transmission report information. Specifically, the base station 100 confirms whether or not a resource having a predetermined relationship with a resource used to transmit the first packet and indicated by the transmission report information is allocated to the other terminal device 200. The resource having a predetermined relationship here is, for example, a resource that is the same resource as or a resource overlapping at least in part with the resource used to transmit the first packet. The base station 100 determines that a collision occurs in a case where a resource having a predetermined relationship with the resource used to transmit the first packet is allocated to the terminal device 200. Otherwise, the base station 100 determines that no collision occurs. In a case where it is determined the first packet and the second packet have a collision, the base station 100 then transmits a recovery instruction to the nearby transmission terminal 200C, thereby issuing an instruction to retransmit the second packet. In contrast, in a case where it is determined that the first packet and the second packet have no collision, the base station 100 issues no instruction for retransmission. This makes it possible to suppress signaling overheads because an instruction for retransmission is issued only in a case where a collision between packets occurs.

In a case where it is determined that the first packet and the second packet have a collision, the base station 100 may control retransmission further on the basis of whether or not a latency requirement for the second packet is satisfied in a case where the second packet is retransmitted. For example, in a case where the latency requirement for a second packet is satisfied even in a case where the second packet is retransmitted, the base station 100 issues an instruction for retransmission. In a case where the latency requirement is not satisfied, the base station 100 issues no instruction for retransmission. In this case, the retransmission of the second packet by the nearby transmission terminal 200C is not executed. This makes it possible to suppress signaling overheads because an instruction for retransmission is issued only in a case where a collision between packets occurs and a latency requirement is satisfied even in a case where retransmission is performed.

Contents of Recovery Instruction

The recovery instruction is information for an instruction to retransmit a second packet. This allows the recovery instruction to trigger the retransmission of a second packet by the nearby transmission terminal 200C.

The recovery instruction may include information indicating a resource allocated for the retransmission of a second packet. In this case, the base station 100 allocates a resource for the transmission of a second packet again and the recovery instruction includes a result of the second allocation of a resource.

The recovery instruction may include a transmission parameter for the retransmission of a second packet. The transmission parameter for retransmission may include, for example, transmission power, MCS, the number of times transmission is repeated, and the like.

Flow of Processes

Figure 24:
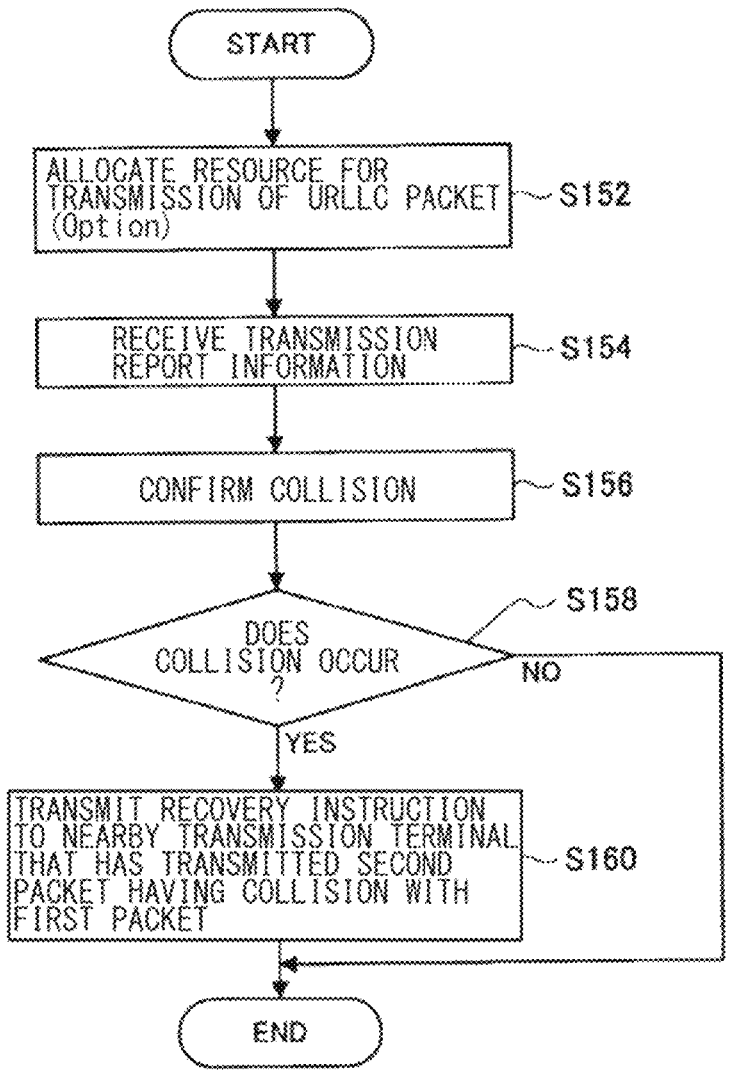
FIG. 24 is a flowchart illustrating an example of a flow of the recovery process executed by the base station according to the embodiment.

The following describes an example of a flow of processes by the base station 100 with reference to FIG. 24. FIG. 24 is a flowchart illustrating an example of a flow of a recovery process executed by the base station 100 according to the present embodiment.

As illustrated in FIG. 24, the base station 100 first allocates a resource for the transmission of an URLLC packet (step S152). This step is, however, an option and does not also have to be executed. The base station 100 then receives transmission report information from the transmission terminal 200A that has performed grant-free transmission on a first packet (step S154). Next, the base station 100 confirms whether or not a resource having a predetermined relationship with a resource used to transmit the first packet and indicated by the transmission report information is allocated to the other terminal device 200, thereby confirming the presence or absence of the occurrence of a collision (step S156). In a case where it is determined that a collision occurs (step S158/YES), the base station 100 then transmits a recovery instruction to the nearby transmission terminal 200C that has transmitted a second packet having a collision with the first packet (step S160). In contrast, in a case where it is determined that no collision occurs (step S158/NO), the base station 100 executes nothing.

(4) Operation of Nearby Transmission Terminal 200C

The nearby transmission terminal 200C (e.g., transmission processing section 241) transmits a second packet on the sidelink on the basis of control by the base station 100. If described in detail, the nearby transmission terminal 200C transmits a second packet by using a resource allocated by the base station 100. In a case where a recovery instruction is received from the base station 100, the nearby transmission terminal 200C, however, retransmits the second packet on the basis of the recovery instruction. If described in detail, the nearby transmission terminal 200C transmits a second packet by using a resource for retransmission indicated by the recovery instruction.

(5) Operation of Nearby Reception Terminal 200D

The nearby reception terminal 200D (e.g., reception processing section 243) receives and decodes a second packet transmitted from the nearby transmission terminal 200C.

4.1.5. Modification Example

The above has mainly described the example in which the transmission report information is transmitted to the base station 100 by using an uplink control channel, but the present technology is not limited to the example. For example, the transmission report information may be transmitted on the sidelink.

Notification on Sidelink

The transmission terminal 200A may include, in SCI (Sidelink Control Information) regarding a first packet to be subjected to grant-free transmission, information indicating that it is a packet to be subjected to grant-free transmission. The receiver side is able to recognize that the first packet has been subjected to grant-free transmission by decoding PSCCH (Physical Sidelink Control Channel). Further, the SCI may include information indicating the time and the frequency of a resource that is used for the grant-free transmission of the first packet. This allows the receiver side to recognize a resource that is used for the grant-free transmission of the first packet and use the resource to confirm a collision. It is to be noted that repeated transmission or the like is assumed to be performed as grant-free transmission. Accordingly, a method is desirable that makes it possible to grasp time frequency resources for the entire repeated transmission even in a case where one packet within the entire repeated transmission is received. A method may be therefore adopted in which a data region includes information indicating the time frequency resources of each repeated transmission in addition to a method in which a control region includes the information described above.

Implicit Packet Transmission Report

The transmission terminal 200A may issue an implicit notification of the transmission report information. An implicit notification of the transmission direction information is described with reference to FIGS. 25 to 27.

Figure 25:
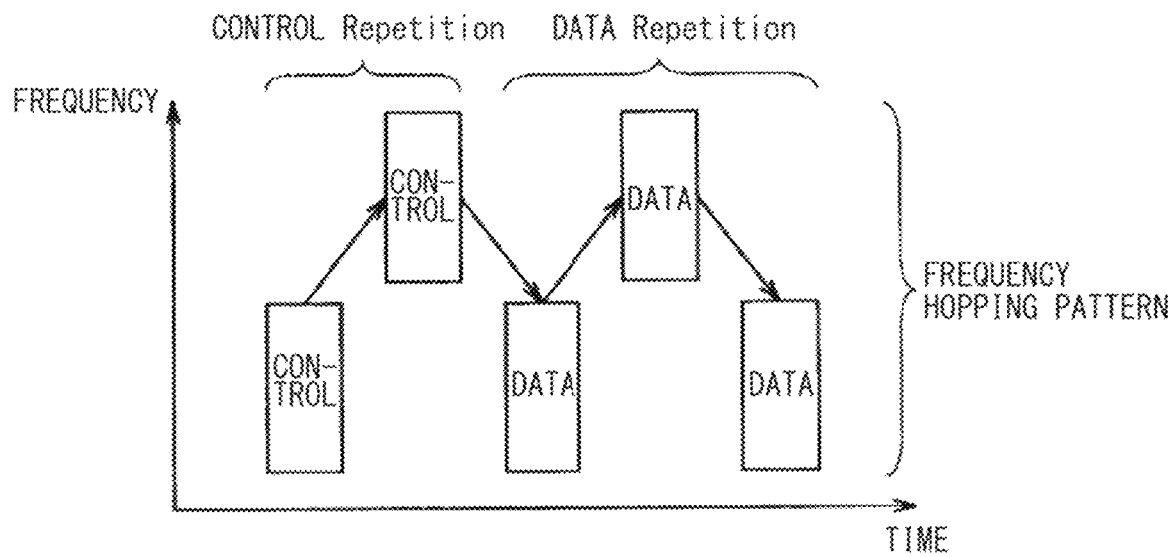
FIG. 25 is a diagram for describing an example of an implicit notification method of transmission report information according to the embodiment.
Figure 26:
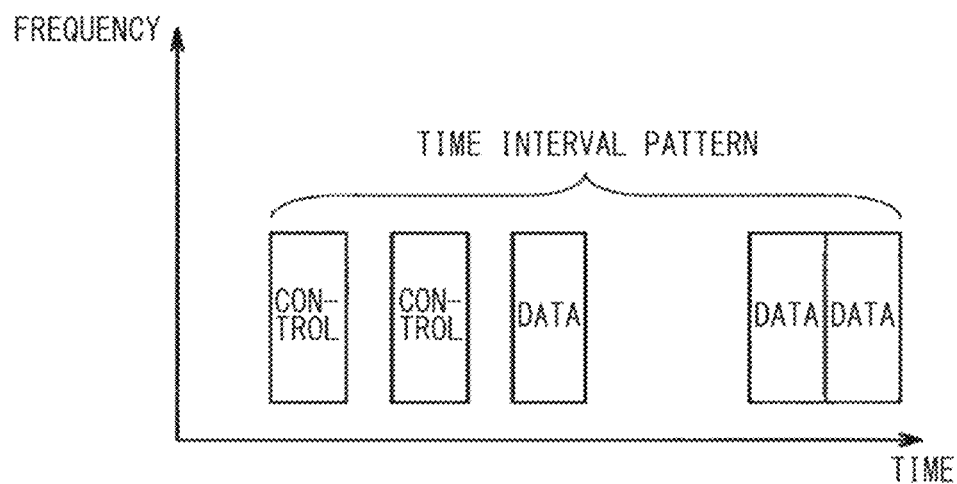
FIG. 26 is a diagram for describing an example of the implicit notification method of the transmission report information according to the embodiment.

Each of FIGS. 25 and 26 is a diagram for describing an example of an implicit notification method of the transmission report information according to the present embodiment. In the example illustrated in FIG. 25, the control channels and the data channels included in first packets are each subjected to repeated transmission. The frequency hopping pattern indicated by the frequency offset of the respective channels corresponds to the transmission report information. In other words, in the example illustrated in FIG. 25, the frequency hopping pattern corresponding to the transmission report information is used for the repeated transmission of first packets. In the example illustrated in FIG. 26, the control channels and the data channels included in first packets are each subjected to repeated transmission. The time interval pattern indicated by the time offset of the respective channels corresponds to the transmission report information. In other words, in the example illustrated in FIG. 26, the time interval pattern corresponding to the transmission report information is used for the repeated transmission of first packets.

In this way, the transmission terminal 200A may issue a notification of the transmission report information by using the repeated transmission pattern (frequency hopping pattern and/or time interval pattern) while performing grant-free and repeated transmission on first packets. The repeated transmission pattern may be subjected to Pre-configure or set through RRC signaling from the base station 100.

Figure 27:
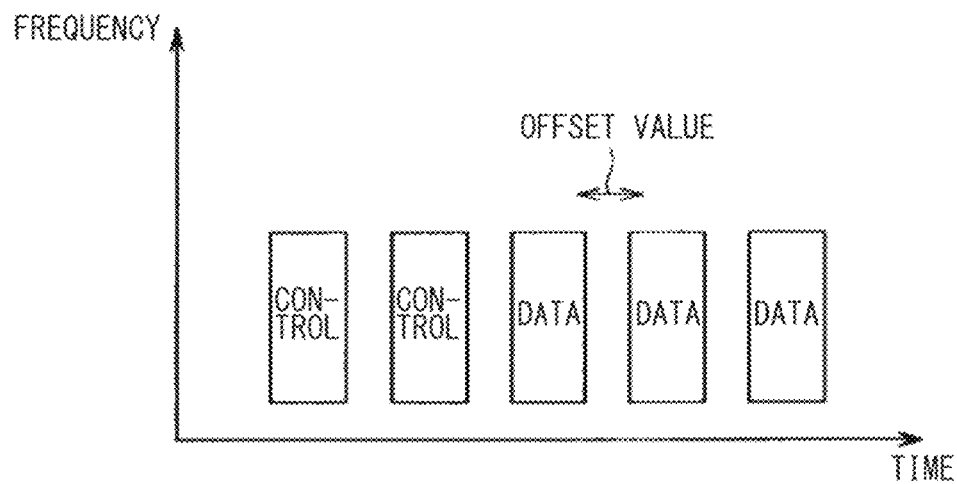
FIG. 27 is a diagram for describing an example of the implicit notification method of the transmission report information according to the embodiment.

FIG. 27 is a diagram for describing an example of the implicit notification method of the transmission report information according to the present embodiment. In the example illustrated in FIG. 27, the control channels and the data channels included in first packets are each subjected to repeated transmission. The time offset value between adjacent channels corresponds to the transmission report information. In other words, in the example illustrated in FIG. 27, the time offset value corresponding to the transmission report information is used to transmit a first packet. Similarly, the frequency offset value corresponding to the transmission report information may be used to transmit a first packet. It is to be noted that first packets do not also have to be subjected to repeated transmission in the example illustrated in FIG. 27.

Additionally, a notification of the transmission report information may be issued by using transmission power. For example, the transmission terminal 200A may perform grant-free transmission with transmission power greater than that of grant-based transmission. In that case, in a case where the nearby transmission terminal 200C detects reception power greater than a predetermined threshold, the nearby transmission terminal 200C recognizes that grant-free transmission is performed. The predetermined threshold may be subjected to Pre-configure or set through RRC signaling from the base station 100.

Recovery Process Based on Implicit Notification

Figure 28:
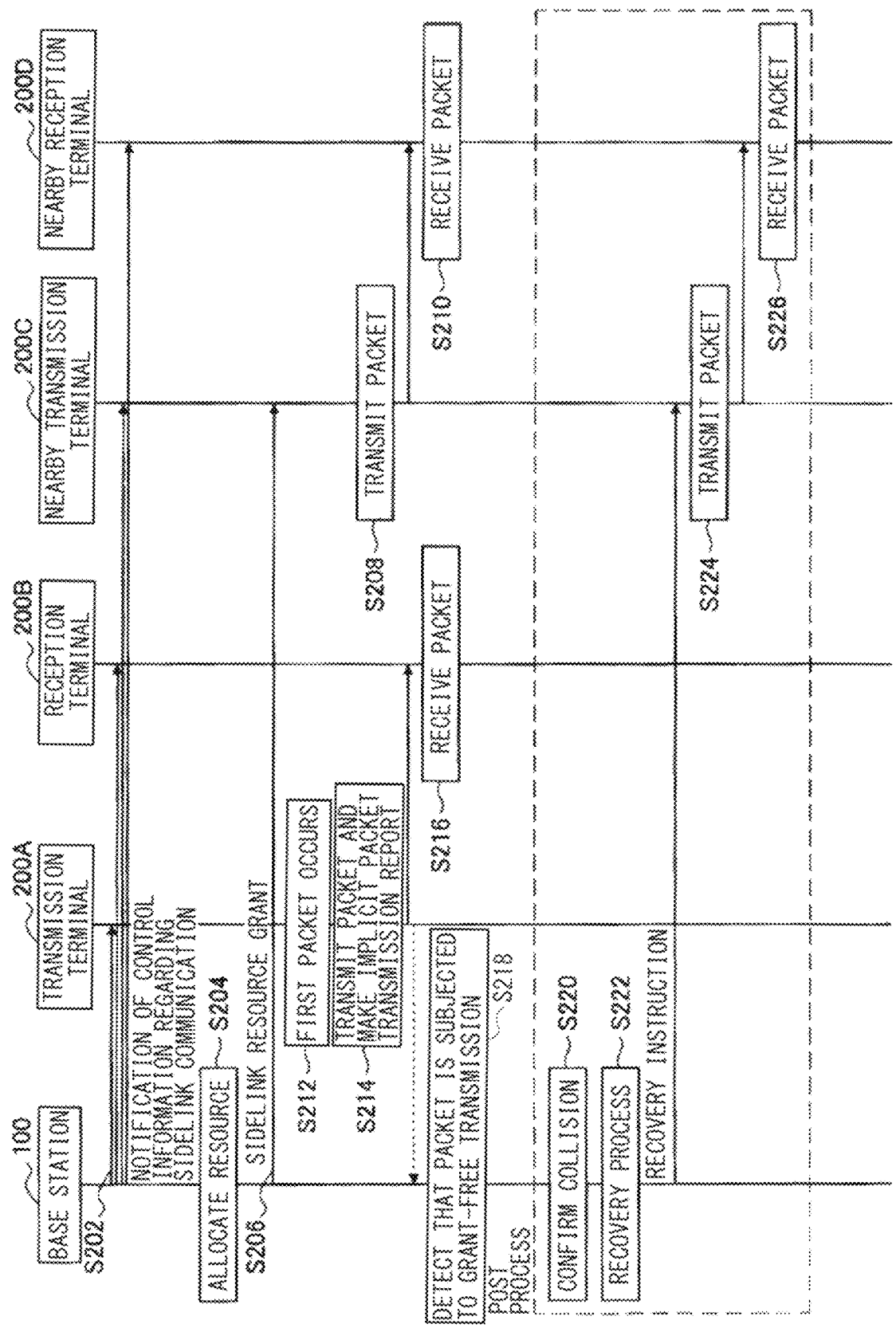
FIG. 28 is a sequence diagram illustrating an example of a flow of a recovery process based on an implicit notification of the transmission report information executed by the system according to the embodiment.
Figure 29:
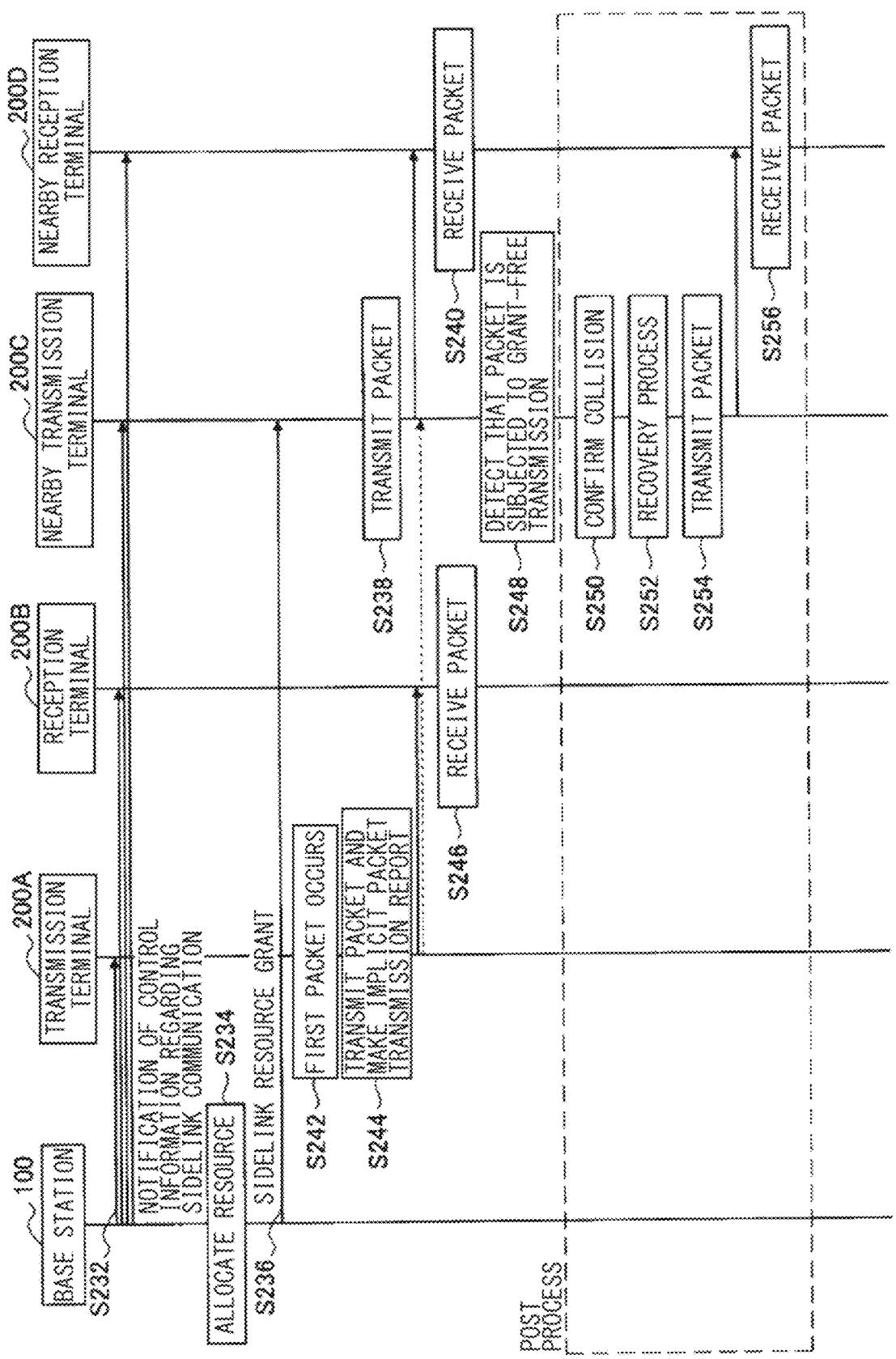
FIG. 29 is a sequence diagram illustrating an example of the flow of the recovery process based on the implicit notification of the transmission report information executed by the system according to the embodiment.
Figure 30:
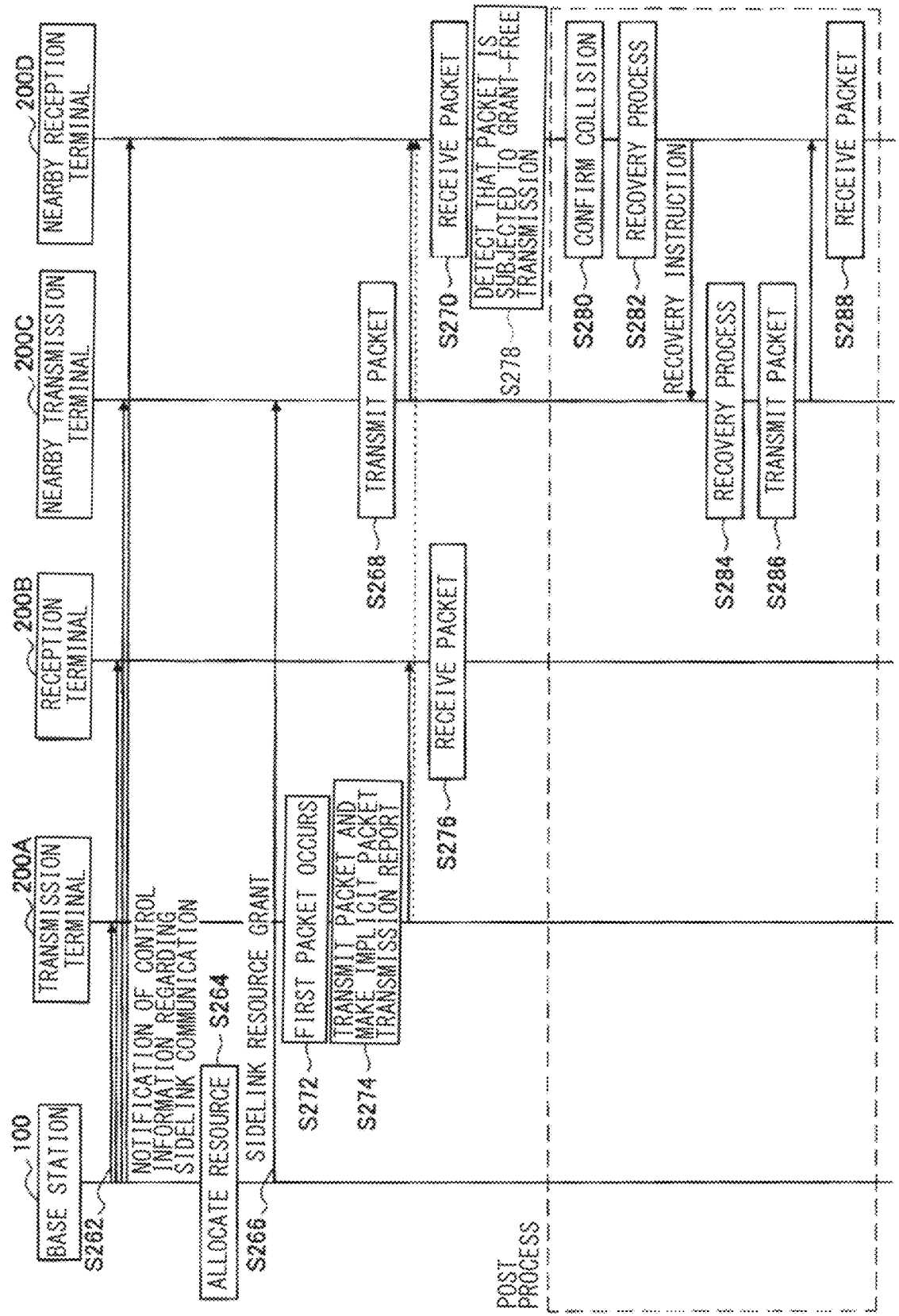
FIG. 30 is a sequence diagram illustrating an example of the flow of the recovery process based on the implicit notification of the transmission report information executed by the system according to the embodiment.

The following describes a recovery process based on an implicit notification with reference to FIGS. 28 to 30.

Example in which Base Station 100 Detects Implicit Notification

FIG. 28 is a sequence diagram illustrating an example of a flow of a recovery process based on an implicit notification of the transmission report information executed by the system 1 according to the present embodiment. This sequence involves the base station 100, the transmission terminal 200A, the reception terminal 200B, the nearby transmission terminal 200C, and the nearby reception terminal 200D.

The processes in steps S202 to S212 illustrated in FIG. 28 are similar to the processes in steps S102 to S112 illustrated in FIG. 22. After step S212, the transmission terminal 200A makes an implicit packet transmission report to implicitly transmit transmission report information while performing grant-free transmission on a first packet (step S214). The reception terminal 200B receives the first packet (step S216). Meanwhile, the base station 100 detects that the first packet is subjected to grant-free transmission on the basis of the transmission report information that has been implicitly transmitted (step S218). The processes in the following steps S220 to S226 are similar to the processes in steps S120 to S126 illustrated in FIG. 22.

It is to be noted that the base station 100 desirably receives a sidelink signal or receives a report of information indicating that a first packet is subjected to grant-free transmission from the nearby reception terminal 200D or the like to detect the transmission report information that has been implicitly transmitted.

Example in Which Nearby Transmission Terminal 200C Detects Implicit Notification FIG. 29 is a sequence diagram illustrating an example of a flow of a recovery process based on an implicit notification of the transmission report information executed by the system 1 according to the present embodiment. This sequence involves the base station 100, the transmission terminal 200A, the reception terminal 200B, the nearby transmission terminal 200C, and the nearby reception terminal 200D.

The processes in steps S232 to S246 illustrated in FIG. 29 are similar to the processes in steps S202 to S216 illustrated in FIG. 28. After step S246, the nearby transmission terminal 200C detects that the first packet is subjected to grant-free transmission on the basis of the transmission report information that has been implicitly transmitted (step S248). The nearby transmission terminal 200C then compares the resource used by the nearby transmission terminal 200C to transmit the second packet and the resource used to transmit the first packet on the basis of the transmission report information and confirms the presence or absence of the occurrence of a collision (step S250). In a case where a collision occurs, the nearby reception terminal 200D may possibly fail in receiving the second packet. This causes the nearby transmission terminal 200C to execute the recovery process (step S252). The recovery process by the nearby transmission terminal 200C includes, for example, transmitting a resource request for the retransmission of a second packet to the base station 100 and retransmitting the second packet by using the allocated resource. The nearby transmission terminal 200C retransmits the second packet by using the allocated resource again (step S254) and the nearby reception terminal 200D receives the retransmitted second packet (step S256).

Example in Which Nearby Reception Terminal 200D Detects Implicit Notification

FIG. 30 is a sequence diagram illustrating an example of a flow of a recovery process based on an implicit notification of the transmission report information executed by the system 1 according to the present embodiment. This sequence involves the base station 100, the transmission terminal 200A, the reception terminal 200B, the nearby transmission terminal 200C, and the nearby reception terminal 200D.

The processes in steps S262 to S276 illustrated in FIG. 30 are similar to the processes in steps S202 to S216 illustrated in FIG. 28. After step S276, the nearby reception terminal 200D detects that the first packet is subjected to grant-free transmission on the basis of the transmission report information that has been implicitly transmitted (step S278). The nearby reception terminal 200D then compares the resource used to receive the second packet and the resource used to transmit the first packet on the basis of the transmission report information and confirms the presence or absence of the occurrence of a collision (step S280). In a case where a collision occurs, the nearby reception terminal 200D may possibly fail in receiving the second packet. This causes the nearby reception terminal 200D to execute the recovery process (step S282). The recovery process by the nearby reception terminal 200D includes, for example, instructing the nearby transmission terminal 200C to perform a retransmission procedure. In that case, the nearby reception terminal 200D transmits a recovery instruction of the second packet to the nearby transmission terminal 200C. Upon receiving the recovery instruction, the nearby transmission terminal 200C executes the recovery process (step S284). The recovery process by the nearby transmission terminal 200C includes, for example, transmitting a resource request for the retransmission of a second packet to the base station 100 and retransmitting the second packet by using the allocated resource. The nearby transmission terminal 200C retransmits the second packet by using the allocated resource again (step S286) and the nearby reception terminal 200D receives the retransmitted second packet (step S288).

<4.2. Process in Mode 4 Resource Allocation Environment>

The following describes the recovery of a packet having a collision with a packet transmitted (i.e., subjected to grant-free transmission) with a predetermined procedure for collision prevention omitted in a Mode 4 resource allocation environment. The predetermined procedure for collision prevention in this example is sensing. To distinguish the grant-free transmission in Mode 4 from the grant-free transmission in Mode 3, the following also refers to the grant-free transmission in Mode 4 as sensingless transmission.

The transmission terminal 200A performs sensingless transmission on a first packet and reports information regarding the sensingless transmission to the other nearby terminal device 200 (e.g., nearby transmission terminal 200C). The nearby transmission terminal 200C grasps the resource used by the nearby transmission terminal 200C to transmits a second packet. This allows the nearby transmission terminal 200C to determine the presence or absence of the occurrence of a collision. The nearby transmission terminal 200C retransmits a second packet for which the occurrence of a collision is determined.

It is to be noted that the following omits the same operation as the operation in the Mode 3 resource allocation environment, but describes a difference.

<4.2.1. Sensingless Transmission and Recovery Process>

Figure 31:
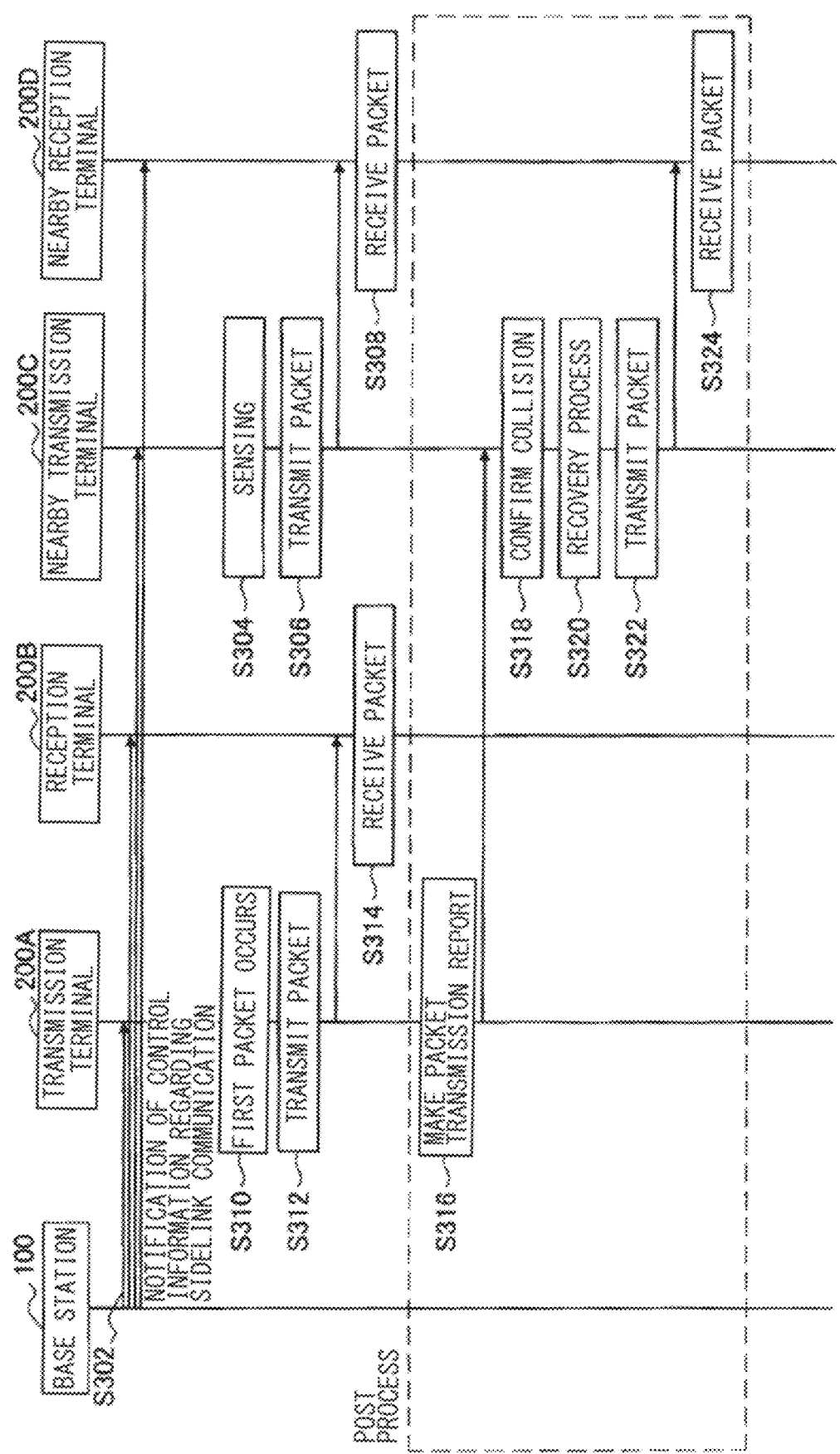
FIG. 31 is a sequence diagram illustrating an example of a flow of sensingless transmission and a recovery process executed by the system according to the embodiment.

With reference to FIG. 31, the following describes a flow of sensingless transmission and a recovery processes according to the proposed technology. FIG. 31 is a sequence diagram illustrating an example of a flow of sensingless transmission and a recovery process executed by the system 1 according to the present embodiment. This sequence involves the base station 100, the transmission terminal 200A, the reception terminal 200B, the nearby transmission terminal 200C, and the nearby reception terminal 200D.

As illustrated in FIG. 31, the base station 100 first notifies each of the terminal devices 200 (200A to 200D) under control of control information regarding sidelink communication (step S302). In a case where a second packet to be transmitted occurs, the nearby transmission terminal 200C performs predetermined sensing (step S304) and transmits the second packet by using a resource confirmed to be available (step S306). The nearby reception terminal 200D receives the second packet (step S308).

Meanwhile, in a case where a first packet (URLLC packet here) to be transmitted (step S310), the transmission terminal 200A performs sensingless transmission on the first packet (step S312). The reception terminal 200B receives the first packet (step S314).

The first packet is transmitted with the predetermined procedure (i.e., sensing) for collision prevention omitted, achieving low latency. Meanwhile, the transmission terminal 200A performs sensingless transmission and a first packet and a second packet may thus have a collision. For the recovery of failure in receiving the second packet caused by this collision, the transmission terminal 200A executes a post process.

Specifically, the transmission terminal 200A makes a packet transmission report to report to the other nearby terminal device 200 that sensingless transmission is performed on a first packet (step S316). If described in detail, the transmission terminal 200A transmits transmission report information to the other nearby terminal device 200 (e.g., nearby transmission terminal 200C). The transmission report information includes information indicating the time and the frequency of the resource used for the sensingless transmission of the first packet. After that, the nearby transmission terminal 200C then compares the resource used by the nearby transmission terminal 200C to transmit the second packet and the resource used to transmit the first packet on the basis of the received transmission report information and confirms the presence or absence of the occurrence of a collision (step S318). In a case where a collision occurs, the nearby reception terminal 200D may possibly fail in receiving the second packet. This causes the nearby transmission terminal 200C to execute the recovery process (step S320). The recovery process by the nearby transmission terminal 200C includes, for example, retransmitting the second packet. The nearby transmission terminal 200C retransmits the second packet by using the allocated resource again (step S322) and the nearby reception terminal 200D receives the retransmitted second packet (step S324).

It is to be noted that the transmission report information is directly transmitted to the nearby transmission terminal 200C in the example illustrated in FIG. 31, but the present technology is not limited to the example. For example, the transmission report information may also be transmitted to the nearby transmission terminal 200C via the base station 100. In that case, the transmission terminal 200A transmits the transmission report information on the Uu link and the nearby transmission terminal 200C receives the transmission report information on the Uu link.

<4.2.2. Operation of Each Device>

The above has described the overview of the process in the Mode 4 resource allocation environment. The following describes the operation of each node in detail.

(1) Operation of Transmission Terminal 200A

Determination in Case where First Packet Occurs

The transmission terminal 200A (e.g., transmission processing section 241) may make the following determination in a case where a first packet that is an URLLC packet occurs.

The transmission terminal 200A may determine whether or not there is an allocation resource that allows a first packet to be transmitted. In a case where it is determined that there is an allocation resource, the transmission terminal 200A transmits a first packet by using the allocation resource. In contrast, in a case where it is determined there is no allocation resource, the transmission terminal 200A executes sensingless transmission. In a case where sensing is executed in the background, the transmission terminal 200A may, however, use a result of the sensing. In addition, in a case where a latency requirement is satisfied even in a case where sensing is executed, the transmission terminal 200A may execute sensing. It is to be noted that a resource which allows an URLLC packet to be transmitted may be allocated in advance through RRC signaling from the base station 100.

Sensingless Transmission

The sensing transmission is a method of transmitting a packet without executing predetermined sensing for packet collision prevention. In other words, the sensingless transmission is a transmission method that is unable to satisfy a predetermined criterion for packet collision prevention (i.e., a collision between packets may occur).

The predetermined sensing may be sensing for a predetermined time (such as one second) as defined in 3GPP LTE V2X. Additionally, the predetermined sensing may be LBT (Listen Before Talk). LBT refers to sensing for a shorter period. LBT is sensing on the order of several ms before transmission, for example, as used in Wi-Fi. In sensingless transmission, a packet is transmitted without executing the predetermined sensing described above. It is also, however, an example of the sensingless transmission that a packet is transmitted after (specifically, weaker) sensing other than the predetermined sensing is executed. The sensing other than the predetermined sensing is, for example, sensing such as sensing for an extremely short time (e.g., several symbols or substantially zero) that fails to satisfy a predetermined criterion for packet collision prevention.

A resource pool for sensingless transmission may be allocated in advance through RRC signaling from the base station 100. Out of coverage, a resource pool for sensingless transmission may be subjected to Pre-configuration in the terminal device 200. The resource pool for sensingless transmission may be the same as a normal resource pool (i.e., for transmission accompanied by sensing) or may be limited in the time direction and/or the frequency direction.

In sensingless transmission, the transmission terminal 200A may randomly select a transmission resource by itself. In addition, the transmission terminal 200A may also select a transmission resource in accordance with a predetermined selection criterion. The predetermined selection criterion may be set, for example, by the base station 100.

Transmission of Transmission Report Information

After performing sensingless transmission on a first packet on the sidelink, the transmission terminal 200A (e.g., transmission processing section 241) transmits transmission report information including information regarding the sensingless transmission of the first packet. The transmission of the transmission report information allows the receiver side of the transmission report information to confirm the presence or absence of the occurrence of a collision between the first packet and a second packet. In a case where a collision occurs, the retransmission of the second packet is achieved. Especially in a case where the transmission terminal 200A transmits a first packet without executing the predetermined procedure (i.e., predetermined sensing) for packet collision prevention, the transmission terminal 200A transmits the transmission report information. The transmission report information is transmitted only in a case where packets may have a collision. This makes it possible to suppress signaling overheads.

The transmission terminal 200A transmits the transmission report information on the Uu link and/or the sidelink. In other words, the transmission terminal 200A transmits the transmission report information to the other terminal device 200 via the base station 100 or directly.

The transmission terminal 200A may transmit the transmission report information by using a resource having a predetermined relationship in the time direction with a resource that is used to transmit a first packet.

Contents of Transmission Report Information

The contents of the transmission report information are similar to the contents in a case of the Mode 3 resource allocation. In other words, the transmission report information includes information indicating the time and the frequency of a resource used by the transmission terminal 200A for the sensingless transmission of a first packet. In addition, the transmission report information may further include at least any of the following pieces of information.

Information indicating a resource pool used to transmit a first packet

Information indicating frequency band used to transmit a first packet

Figure 32:
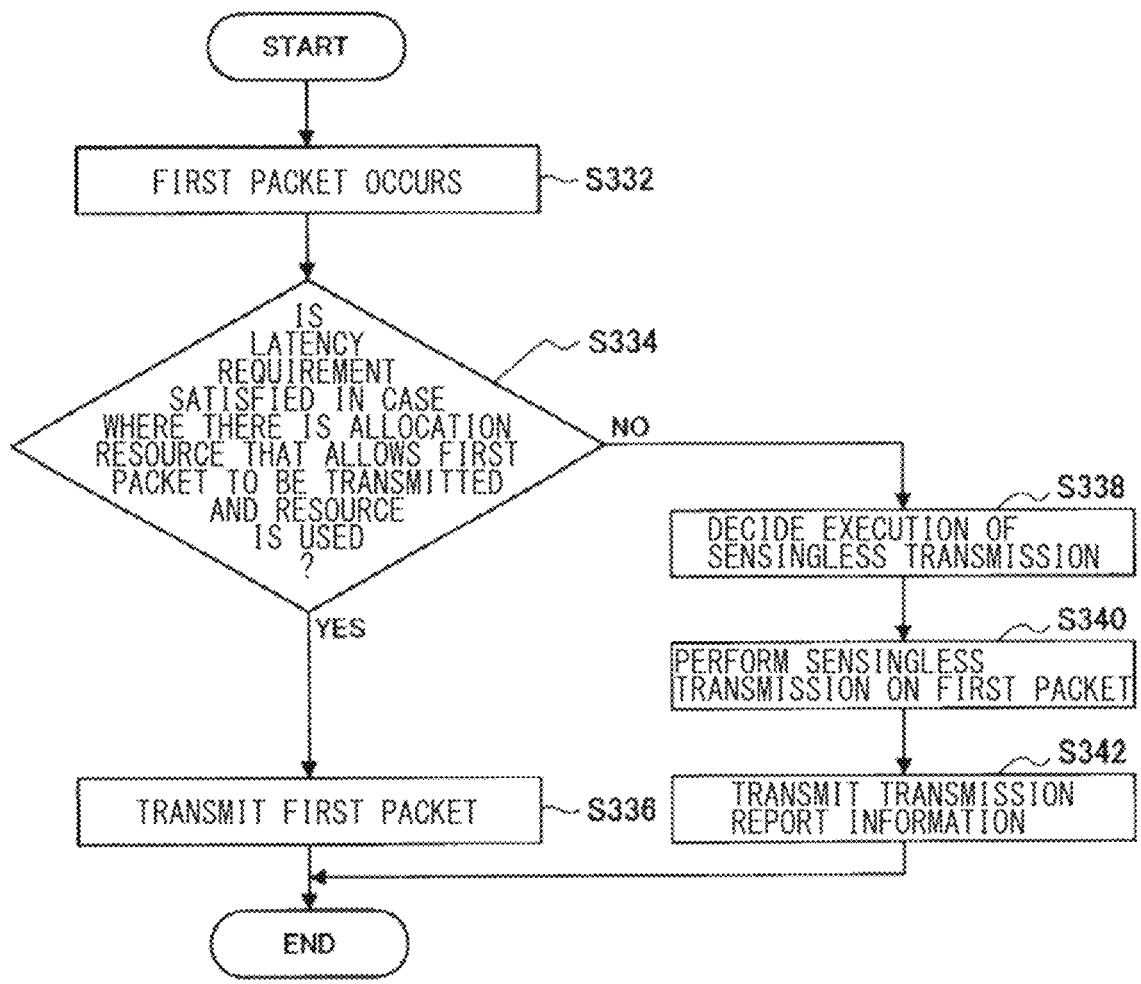
FIG. 32 is a flowchart illustrating an example of the flow of the transmission process of the first packet and the post process that are executed by the transmission terminal according to the embodiment.

Information indicating the number of times the transmission of a first packet is repeated Information indicating transmission power used to transmit a first packet Information indicating the priority of a first packet Position information regarding the transmission terminal 200A in the transmission of a first packet MCS information in the transmission of a first packet Transmission mode information in the transmission of a first packet QCL (Quasi-Colocation) information in the transmission of a first packet Flow of Processes The following describes an example of a flow of processes by the transmission terminal 200A with reference to FIG. 32. FIG. 32 is a flowchart illustrating an example of a flow of a transmission process of a first packet and a post process that are executed by the transmission terminal 200A according to the present embodiment.

As illustrated in FIG. 32, a first packet (e.g., URLLC packet) to be transmitted first occurs in the transmission terminal 200A (step S332). The transmission terminal 200A then determines whether a latency requirement is satisfied in a case where there is an allocation resource that allows the first packet to be transmitted and the resource is used (step S334). In a case where step S334 is YES, the transmission terminal 200A transmits the first packet by using the allocation resource (step S336). In a case where step S334 is NO, the transmission terminal 200A makes a decision to execute sensingless transmission (step S338) and performs sensingless transmission on the first packet (step S340). The transmission terminal 200A then transmits transmission report information including information regarding the sensingless transmission of the first packet (step S342).

(2) Operation of Nearby Transmission Terminal 200C

The nearby transmission terminal 200C (e.g., transmission processing section 241) transmits a second packet on the sidelink on the basis of control by the base station 100. If described in detail, the nearby transmission terminal 200C transmits a second packet by using a resource allocated by the base station 100.

However, the nearby transmission terminal 200C sometimes receives transmission report information including information regarding sensingless transmission by the transmission terminal 200A. In that case, after transmitting a second packet on the sidelink, the nearby transmission terminal 200C controls the retransmission of the second packet on the basis of the transmission report information.

If described in detail, the nearby transmission terminal 200C first determines the presence or absence of the occurrence of a collision between the first packet and the second packet on the basis of the transmission report information. Specifically, the nearby transmission terminal 200C confirms whether or not a resource having a predetermined relationship with a resource used to transmit the first packet and indicated by the transmission report information is used to transmit the second packet. The resource having a predetermined relationship here is, for example, a resource that is the same resource as or a resource overlapping at least in part with the resource used to transmit the first packet. The nearby transmission terminal 200C determines that a collision occurs in a case where a resource having a predetermined relationship with the resource used to transmit the first packet is used to transmit the second packet. Otherwise, the nearby transmission terminal 200C determines that no collision occurs. In a case where it is determined that the first packet and the second packet have a collision, the nearby transmission terminal 200C then executes the recovery process. This allows the recovery process to be executed only in a case where packets have a collision.

In a case where it is determined on the basis of the transmission report information that a first packet and a second packet have a collision, the nearby transmission terminal 200C retransmits the second packet as the recovery process. For example, the nearby transmission terminal 200C retransmits the second packet by using a resource confirmed to be available by performing predetermined sensing. The predetermined sensing may be executed by the nearby transmission terminal 200C instead. In that case, the transmission report information includes information indicating the time and the frequency of a resource for retransmission confirmed to be available. The transmission parameter for retransmission may be set in advance by the base station 100 or an instruction about the transmission parameter for retransmission may be issued by the transmission terminal 200A. The transmission parameter for retransmission may include, for example, transmission power, MCS, the number of times transmission is repeated, and the like.

In a case where it is determined that the first packet and the second packet have a collision, the nearby transmission terminal 200C may control retransmission further on the basis of whether or not a latency requirement for the second packet is satisfied in a case where the second packet is retransmitted. For example, in a case where the latency requirement for a second packet is satisfied even in a case where the second packet is retransmitted, the nearby transmission terminal 200C performs retransmission. In a case where the latency requirement is not satisfied, the nearby transmission terminal 200C does not perform retransmission. This makes it possible to suppress decreasing resource efficiency because retransmission is performed only in a case where a collision between packets occurs and a latency requirement is satisfied even in a case where retransmission is performed.

Flow of Processes

Figure 33:
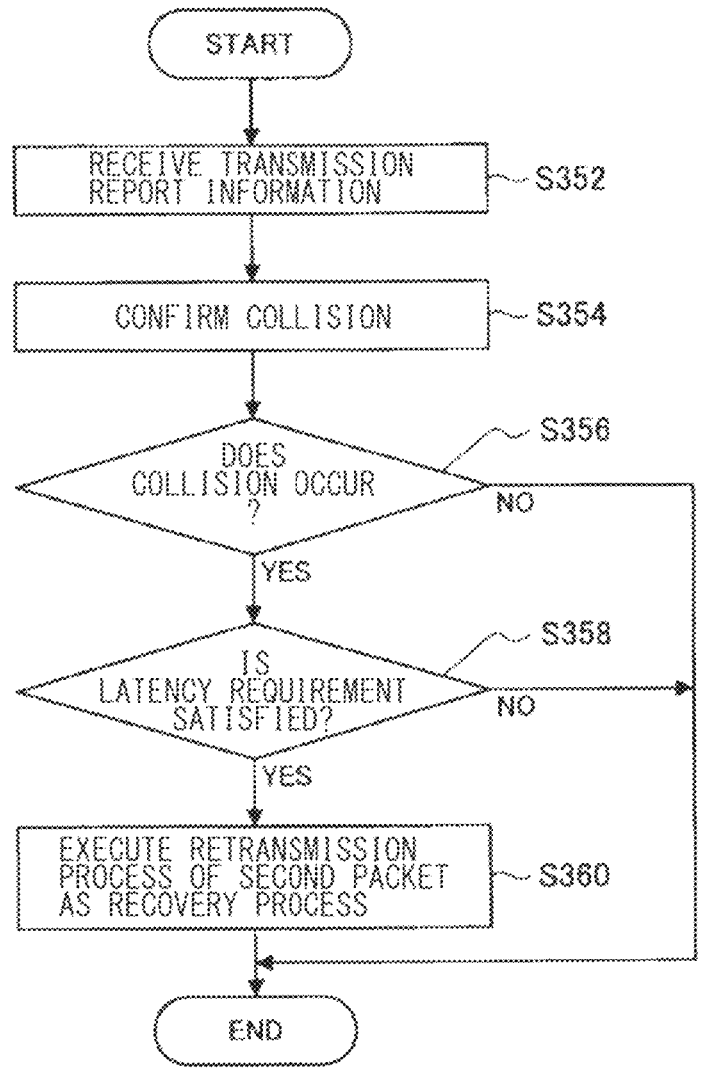
FIG. 33 is a flowchart illustrating an example of a flow of a recovery process executed by a nearby transmission terminal according to the embodiment.

The following describes an example of a flow of processes by the nearby transmission terminal 200C with reference to FIG. 33. FIG. 33 is a flowchart illustrating an example of a flow of a recovery process executed by the nearby transmission terminal 200C according to the present embodiment.

As illustrated in FIG. 33, the nearby transmission terminal 200C first receives transmission report information from the transmission terminal 200A that has performed grant-free transmission on a first packet (step S352). Next, the nearby transmission terminal 200C confirms whether or not a resource having a predetermined relationship with a resource used to transmit the first packet and indicated by the transmission report information is used to transmit the second packet, thereby confirming the presence or absence of the occurrence of a collision (step S354). In a case where it is determined that a collision occurs (step S356/YES), the nearby transmission terminal 200C determines whether or not a latency requirement for the second packet is satisfied in a case where the second packet is retransmitted (step S358). In a case where it is determined that the latency requirement for the second packet is satisfied even in a case where the second packet is retransmitted (step S358/YES), the nearby transmission terminal 200C executes a process of retransmitting the second packet as the recovery process (step S360). In contrast, in a case where it is determined that no collision occurs (step S356/NO) or in a case where it is determined that the latency requirement for the second packet is not satisfied in a case where the second packet is retransmitted (step S358/NO), the nearby transmission terminal 200C does not execute the recovery process.

(3) Supplemental Information

An implicit notification of the transmission report information may be issued as in the Mode 3 resource allocation.

5. PRACTICAL APPLICATION EXAMPLES

The technology according to the present disclosure is applicable to a variety of products.

For example, the base station 100 may be achieved as any type of eNB (evolved Node B) such as macro eNB or small eNB. The small eNB may be eNB such as pico eNB, micro eNB, or home (femto) eNB that covers a cell smaller than a macro cell. Instead, the base station 100 may also be achieved as another type of base station such as NodeB or BTS (Base Transceiver Station). The base station 100 may include a main body (also referred to as base station device) that controls wireless communication and one or more RRHs (Remote Radio Heads) disposed in places different from the place of the main body. In addition, various types of terminals described below may each operate as the base station 100 by executing a base station function temporarily or semi-permanently.

In addition, for example, the terminal device 200 may be achieved as a mobile terminal such as a smartphone, tablet PC (Personal Computer), notebook PC, a portable game terminal, a portable/dongle mobile router, or a digital camera or an onboard terminal such as a car navigation apparatus. In addition, the terminal device 200 may be achieved as a terminal that performs M2M (Machine To Machine) communication (also referred to as MTC (Machine Type Communication) terminal). Further, the terminal device 200 may be a wireless communication module mounted on each of these terminals (e.g., integrated circuit module including one die).

<5.1. Practical Application Example Regarding Base Station>

First Practical Application Example

Figure 34:
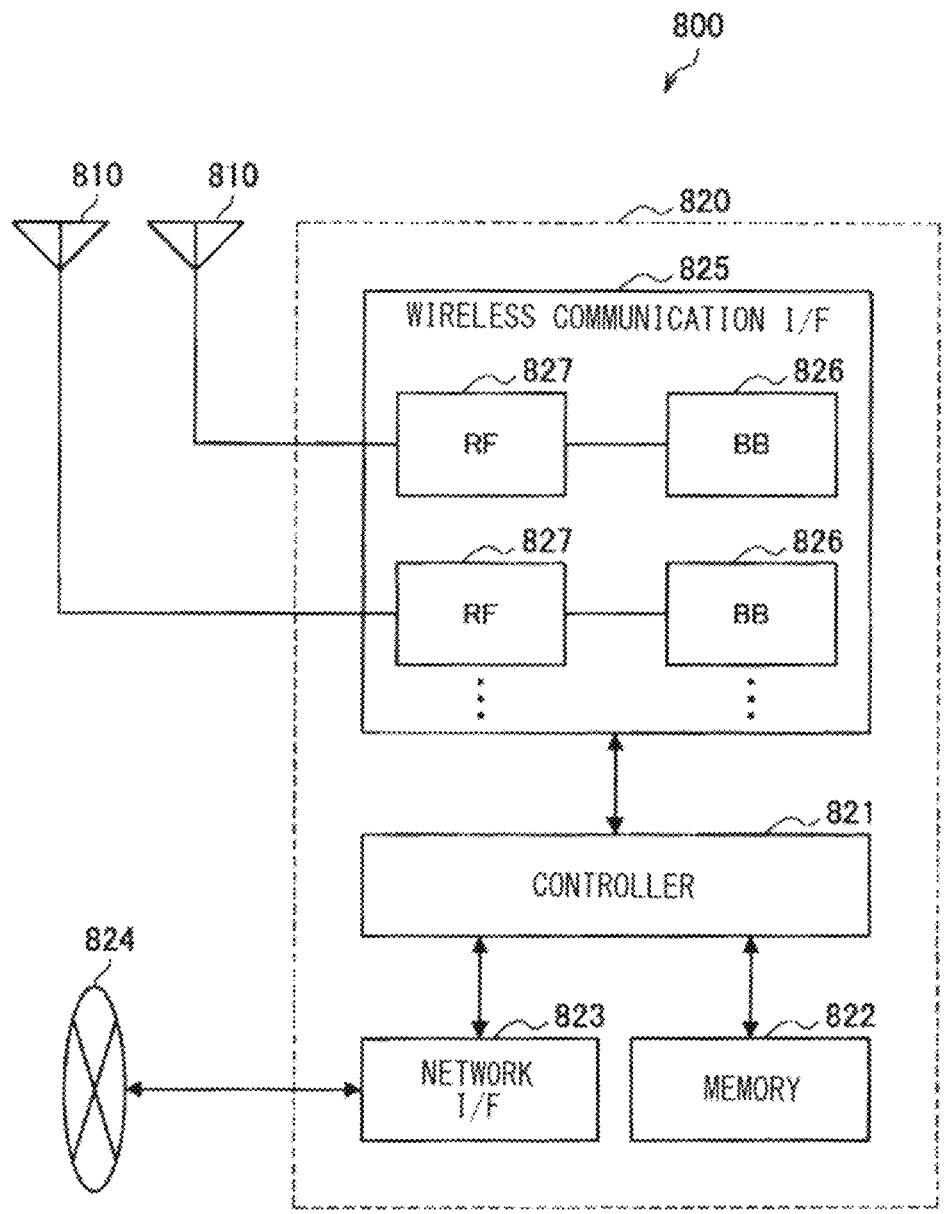
FIG. 34 is a block diagram illustrating a first example of a schematic configuration of eNB.

FIG. 34 is a block diagram illustrating a first example of a schematic configuration of eNB to which the technology according to the present disclosure may be applied. eNB 800 includes one or more antennas 810 and a base station device 820. Each of the antennas 810 and the base station device 820 may be coupled to each other via an RF cable.

Each of the antennas 810 includes a single antenna element or a plurality of antenna elements (e.g., a plurality of antenna elements included in a MIMO antenna). Each of the antennas 810 is used for the base station device 820 to transmit and receive wireless signals. The eNB 800 may include the plurality of antennas 810 as illustrated in FIG. 34. For example, the plurality of respective antennas 810 may support a plurality of frequency bands used by the eNB 800. It is to be noted that FIG. 34 illustrates the example in which the eNB 800 includes the plurality of antennas 810, but the eNB 800 may also include the single antenna 810.

The base station device 820 includes a controller 821, a memory 822, a network interface 823, and a wireless communication interface 825.

The controller 821 may be, for example, CPU or DSP. The controller 821 operates a variety of functions for a higher layer of the base station device 820. For example, the controller 821 generates a data packet from data in a signal processed by the wireless communication interface 825 and transfers the generated packet via the network interface 823. The controller 821 may generate a bundled packet by bundling pieces of data from a plurality of base band processors and transfer the generated bundled packet. In addition, the controller 821 may also have a logical function of executing control such as radio resource control (Radio Resource Control), radio bearer control (Radio Bearer Control), mobility management (Mobility Management), admission control (Admission Control), or scheduling (Scheduling). In addition, the control may be executed in cooperation with nearby eNB or a core network node. The memory 822 includes RAM and ROM and stores a program executed by the controller 821 and various kinds of control data (e.g., terminal list, transmission power data, scheduling data, and the like).

The network interface 823 is a communication interface for coupling the base station device 820 to a core network 824. The controller 821 may communicate with a core network node or another eNB via the network interface 823. In that case, the eNB 800 and the core network node or the other eNB may be coupled to each other through a logical interface (e.g., Si interface or X2 interface). The network interface 823 may be a wired communication interface or a wireless communication interface for wireless backhaul. In a case where the network interface 823 is a wireless communication interface, the network interface 823 may use a higher frequency band for wireless communication than a frequency band used by the wireless communication interface 825.

The wireless communication interface 825 supports any cellular communication scheme such as LTE (Long Term Evolution) or LTE-Advanced. The wireless communication interface 825 provides wireless coupling to a terminal positioned within the cell of the eNB 800 via the antenna 810. The wireless communication interface 825 may typically include a base band (BB) processor 826, an RF circuit 827, and the like. The BB processor 826 may perform, for example, encoding/decoding, modulation/demodulation, multiplexing/demultiplexing, and the like. The BB processor 826 executes the various kinds of signal processing for each of layers (e.g., L1, MAC (Medium Access Control), RLC (Radio Link Control), and PDCP (Packet Data Convergence Protocol)). The BB processor 826 may have a portion or all of the logical functions described above in place of the controller 821. The BB processor 826 may be a module including a memory having a communication control program stored therein, a processor to execute the program, and a related circuit. The function of the BB processor 826 may be modifiable by updating the program described above. In addition, the module described above may be a card or blade to be inserted into a slot of the base station device 820 or a chip mounted on the card or blade described above. Meanwhile, the RF circuit 827 may include a mixer, a filter, an amplifier, and the like. The RF circuit 827 transmits and receives wireless signals via the antenna 810.

The wireless communication interface 825 may include the plurality of BB processors 826 as illustrated in FIG. 34. For example, the plurality of respective BB processors 826 may support a plurality of frequency bands used by the eNB 800. In addition, the wireless communication interface 825 may include the plurality of RF circuits 827 as illustrated in FIG. 34. For example, the plurality of respective RF circuits 827 may correspond to a plurality of antenna elements. It is to be noted that FIG. 34 illustrates the example in which the wireless communication interface 825 includes the plurality of BB processors 826 and the plurality of RF circuits 827, but the wireless communication interface 825 may also include the single BB processor 826 or the single RF circuit 827.

In the eNB 800 illustrated in FIG. 34, one or more components (communication control section 151) included in the control unit 150 described with reference to FIG. 19 may also be implemented in the wireless communication interface 825. Alternatively, at least a portion of these components may be implemented in the controller 821. As an example, the eNB 800 may be mounted with a module including a portion (e.g., BB processor 826) or all of the components of the wireless communication interface 825 and/or the controller 821 and the one or more components described above may be implemented in the module. In this case, the module described above may store a program for causing a processor to function as the one or more components described above (i.e., a program for causing a processor to execute the operations of the one or more components described above) and execute the program. As another example, a program for causing a processor to function as the one or more components described above may be installed in the eNB 800 and the wireless communication interface 825 (e.g., BB processor 826) and/or the controller 821 may execute the program. As described above, the eNB 800, the base station device 820, or the module described above may be provided as a device including the one or more components described above and the program for causing a processor to function as the one or more components described above may be provided. In addition, there may be provided a readable recording medium having the above-described program recorded thereon.

In addition, in the eNB 800 illustrated in FIG. 34, the wireless communication unit 120 described with reference to FIG. 19 may be implemented in the wireless communication interface 825 (e.g., RF circuit 827). In addition, the antenna unit 110 may be implemented in the antenna 810. In addition, the network communication unit 130 may be implemented in the controller 821 and/or the network interface 823. In addition, the storage unit 140 may be implemented in the memory 822.

Second Practical Application Example

Figure 35:
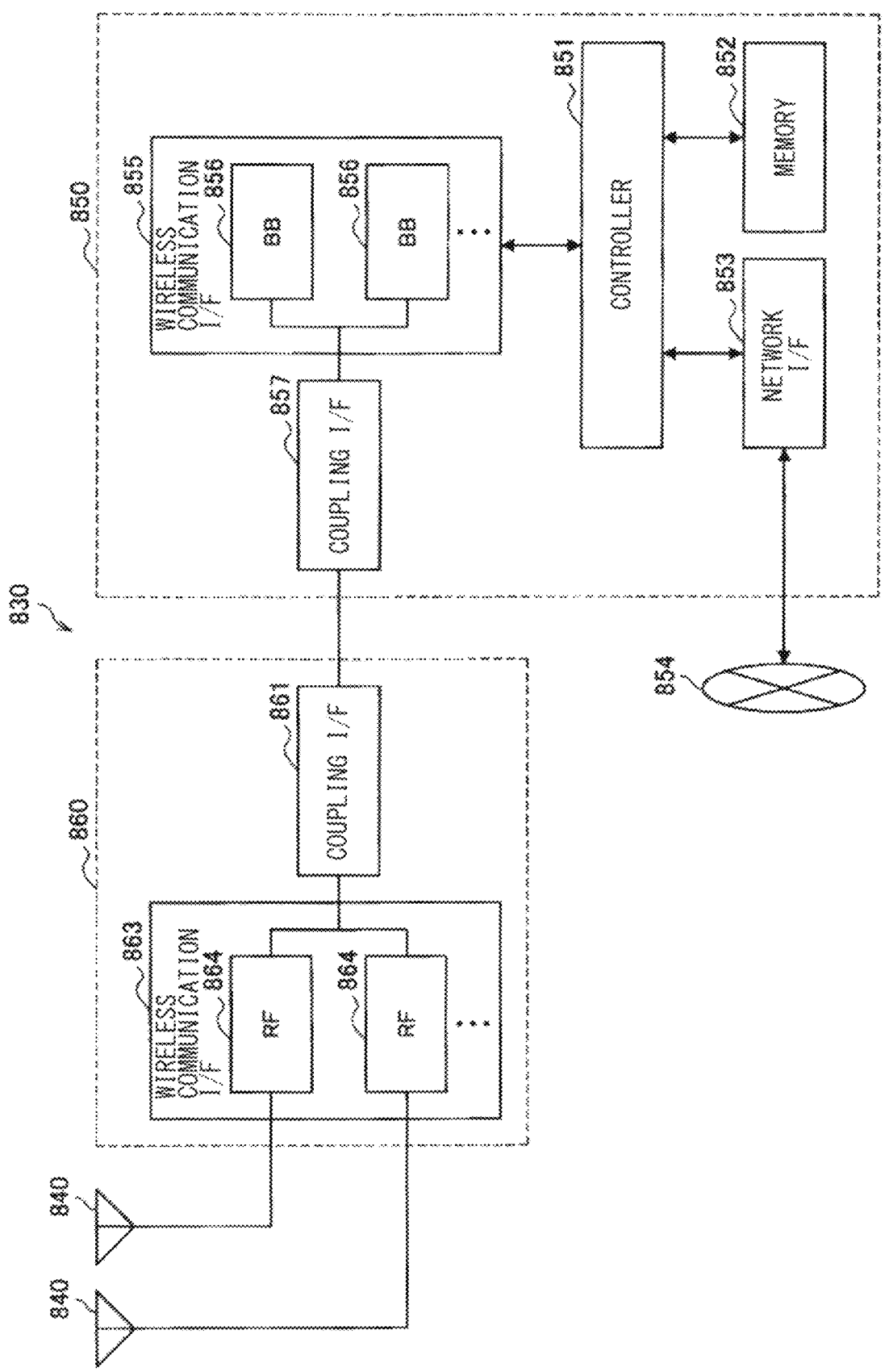
FIG. 35 is a block diagram illustrating a second example of the schematic configuration of the eNB.

FIG. 35 is a block diagram illustrating a second example of a schematic configuration of eNB to which the technology according to the present disclosure may be applied. eNB 830 includes one or more antennas 840, a base station device 850, and RRH 860. Each of the antennas 840 and the RRH 860 may be coupled to each other via an RF cable. In addition, the base station device 850 and the RRH 860 may be coupled to each other through a high-speed line such as an optical fiber cable.

Each of the antennas 840 includes a single antenna element or a plurality of antenna elements (e.g., a plurality of antenna elements included in a MIMO antenna). Each of the antennas 840 is used for the RRH 860 to transmit and receive wireless signals. The eNB 830 may include the plurality of antennas 840 as illustrated in FIG. 35. For example, the plurality of respective antennas 840 may support a plurality of frequency bands used by the eNB 830. It is to be noted that FIG. 35 illustrates the example in which the eNB 830 includes the plurality of antennas 840, but the eNB 830 may also include the single antenna 840.

The base station device 850 includes a controller 851, a memory 852, a network interface 853, a wireless communication interface 855, and a coupling interface 857. The controller 851, the memory 852, and the network interface 853 are similar to the controller 821, the memory 822, and the network interface 823 described with reference to FIG. 34.

The wireless communication interface 855 supports any cellular communication scheme such as LTE or LTE-Advanced and provides wireless coupling to a terminal positioned within a sector corresponding to the RRH 860 via the RRH 860 and the antenna 840. The wireless communication interface 855 may typically include a BB processor 856 and the like. The BB processor 856 is similar to the BB processor 826 described with reference to FIG. 34 except that the BB processor 856 is coupled to the RF circuit 864 of the RRH 860 via the coupling interface 857. The wireless communication interface 855 may include the plurality of BB processors 856 as illustrated in FIG. 35. For example, the plurality of respective BB processors 856 may support a plurality of frequency bands used by the eNB 830. It is to be noted that FIG. 35 illustrates the example in which the wireless communication interface 855 includes the plurality of BB processors 856, but the wireless communication interface 855 may also include the single BB processor 856.

The coupling interface 857 is an interface for coupling the base station device 850 (wireless communication interface 855) to the RRH 860. The coupling interface 857 may be a communication module for communication on the high-speed line described above. The communication module couples the base station device 850 (wireless communication interface 855) and the RRH 860.

In addition, the RRH 860 includes a coupling interface 861 and a wireless communication interface 863.

The coupling interface 861 is an interface for coupling the RRH 860 (wireless communication interface 863) to the base station device 850. The coupling interface 861 may be a communication module for communication on the high-speed line described above.

The wireless communication interface 863 transmits and receives wireless signals via the antenna 840. The wireless communication interface 863 may typically include the RF circuit 864 and the like. The RF circuit 864 may include a mixer, a filter, an amplifier, and the like. The RF circuit 864 transmits and receives wireless signals via the antenna 840. The wireless communication interface 863 may include the plurality of RF circuits 864 as illustrated in FIG. 35. For example, the plurality of respective RF circuits 864 may correspond to a plurality of antenna elements. It is to be noted that FIG. 35 illustrates the example in which the wireless communication interface 863 includes the plurality of RF circuits 864, but the wireless communication interface 863 may also include the single RF circuit 864.

In the eNB 830 illustrated in FIG. 35, one or more components (communication control section 151) included in the control unit 150 described with reference to FIG. 19 may also be implemented in the wireless communication interface 855 and/or the wireless communication interface 863. Alternatively, at least a portion of these components may be implemented in the controller 851. As an example, the eNB 830 may be mounted with a module including a portion (e.g., BB processor 856) or all of the components of the wireless communication interface 855 and/or the controller 851 and the one or more components described above may be implemented in the module. In this case, the module described above may store a program for causing a processor to function as the one or more components described above (i.e., a program for causing a processor to execute the operations of the one or more components described above) and execute the program. As another example, a program for causing a processor to function as the one or more components described above may be installed in the eNB 830 and the wireless communication interface 855 (e.g., BB processor 856) and/or the controller 851 may execute the program. As described above, the eNB 830, the base station device 850, or the module described above may be provided as a device including the one or more components described above and the program for causing a processor to function as the one or more components described above may be provided. In addition, there may be provided a readable recording medium having the above-described program recorded thereon.

In addition, in the eNB 830 illustrated in FIG. 35, the wireless communication unit 120 described, for example, with reference to FIG. Y may be implemented in the wireless communication interface 863 (e.g., RF circuit 864). In addition, the antenna unit 110 may be implemented in the antenna 840. In addition, the network communication unit 130 may be implemented in the controller 851 and/or the network interface 853. In addition, the storage unit 140 may be implemented in the memory 852.

<5.2. Practical Application Example Regarding Terminal Device>

First Practical Application Example

Figure 36:
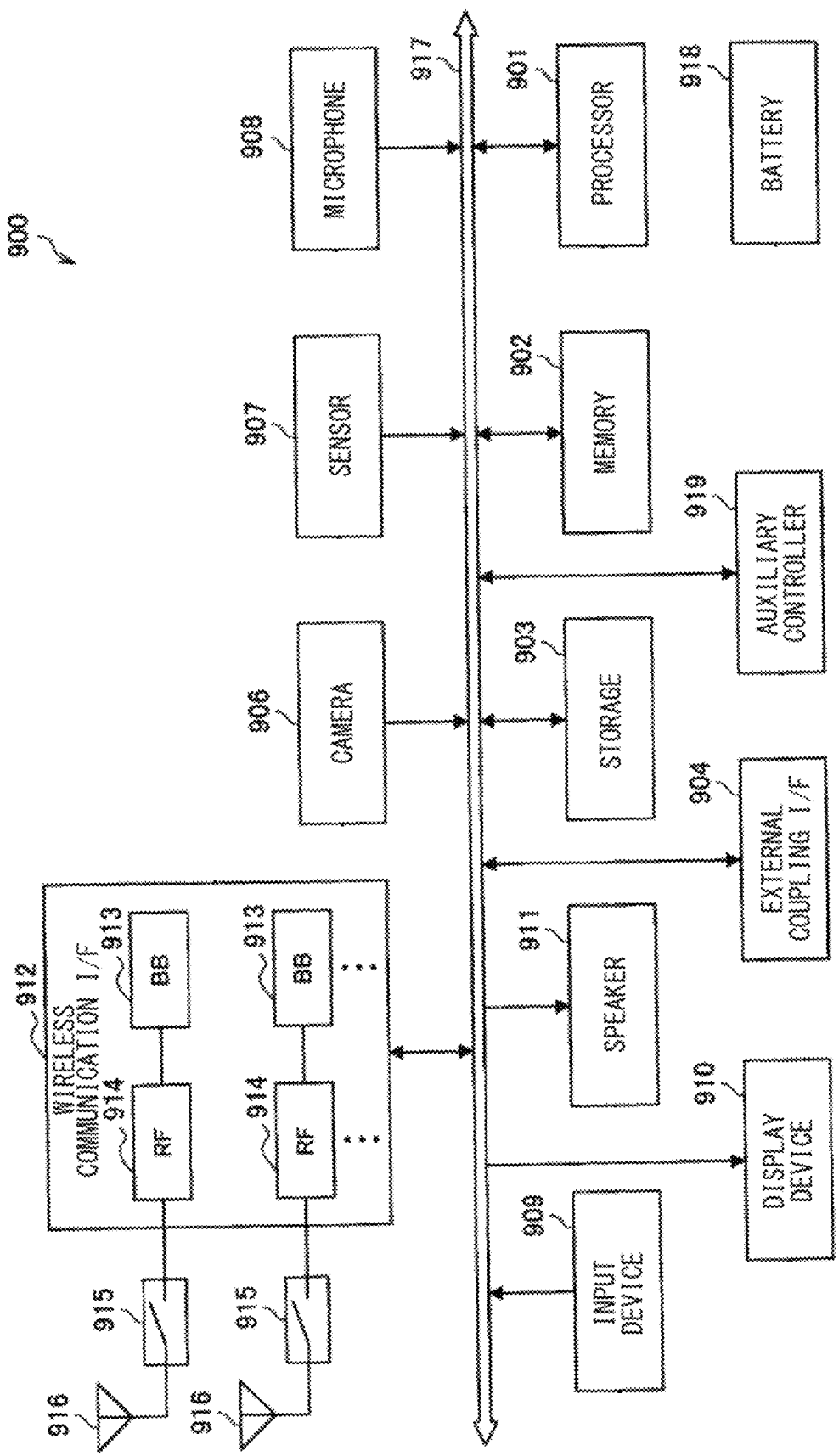
FIG. 36 is a block diagram illustrating an example of a schematic configuration of a smartphone.

FIG. 36 is a block diagram illustrating an example of a schematic configuration of a smartphone 900 to which the technology according to the present disclosure may be applied. The smartphone 900 includes a processor 901, a memory 902, a storage 903, an external coupling interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, CPU or SoC (System on Chip). The processor 901 controls the functions of an application layer and another layer of the smartphone 900. The memory 902 includes RAM and ROM and stores a program that is executed by the processor 901 and data. The storage 903 may include a storage medium such as a semiconductor memory or a hard disk. The external coupling interface 904 is an interface for coupling an externally attached device such as a memory card or a USB (Universal Serial Bus) device to the smartphone 900.

The camera 906 includes, for example, an imager such as CCD (Charge Coupled Device) or CMOS (Complementary Metal Oxide Semiconductor). The camera 906 generates a captured image. The sensor 907 may include a sensor group including, for example, a positioning sensor, a gyro sensor, a geomagnetic sensor, an acceleration sensor, and the like. The microphone 908 converts a sound that is inputted to the smartphone 900 to a sound signal. The input device 909 includes, for example, a touch sensor that detects touch onto the screen of the display device 910, a keypad, a keyboard, a button, a switch, or the like. The input device 909 receives an operation or an information input from a user. The display device 910 includes a screen such as a liquid crystal display (LCD) or an organic light-emitting diode (OLED) display. The display device 910 displays an output image of the smartphone 900. The speaker 911 converts a sound signal that is outputted from the smartphone 900 to a sound.

The wireless communication interface 912 supports any cellular communication scheme such as LTE or LTE-Advanced and executes wireless communication. The wireless communication interface 912 may typically include a BB processor 913, an RF circuit 914, and the like. The BB processor 913 may perform, for example, encoding/decoding, modulation/demodulation, multiplexing/demultiplexing, and the like. The BB processor 913 executes various kinds of signal processing for wireless communication. Meanwhile, the RF circuit 914 may include a mixer, a filter, an amplifier, and the like. The RF circuit 914 transmits and receives wireless signals via the antenna 916. The wireless communication interface 912 may also be a one-chip module that has the BB processor 913 and the RF circuit 914 integrated thereon. The wireless communication interface 912 may include the plurality of BB processors 913 and the plurality of RF circuits 914 as illustrated in FIG. 36. It is to be noted that FIG. 36 illustrates the example in which the wireless communication interface 912 includes the plurality of BB processors 913 and the plurality of RF circuits 914, but the wireless communication interface 912 may also include the single BB processor 913 or the single RF circuit 914.

Further, in addition to a cellular communication scheme, the wireless communication interface 912 may support another type of wireless communication scheme such as a short-distance wireless communication scheme, a near field communication scheme, or a wireless LAN (Local Area Network) scheme. In that case, the wireless communication interface 912 may include the BB processor 913 and the RF circuit 914 for the respective wireless communication schemes.

Each of the antenna switches 915 switches the coupling destination of the antenna 916 between the plurality of circuits (e.g., circuits for different wireless communication schemes) included in the wireless communication interface 912.

Each of the antennas 916 includes a single antenna element or a plurality of antenna elements (e.g., a plurality of antenna elements included in a MIMO antenna). Each of the antennas 916 is used for the wireless communication interface 912 to transmit and receive wireless signals. The smartphone 900 may include the plurality of antennas 916 as illustrated in FIG. 36. It is to be noted that FIG. 36 illustrates the example in which the smartphone 900 includes the plurality of antennas 916, but the smartphone 900 may include the single antenna 916.

Further, the smartphone 900 may include the antenna 916 for each wireless communication scheme. In that case, the antenna switches 915 may be omitted from the configuration of the smartphone 900.

The bus 917 couples the processor 901, the memory 902, the storage 903, the external coupling interface 904, the camera 906, the sensor 907, the microphone 908, the input device 909, the display device 910, the speaker 911, the wireless communication interface 912, and the auxiliary controller 919 to each other. The battery 918 supplies power to each block of the smartphone 900 illustrated in FIG. 36 via a power supply line that is partially illustrated in the diagram as a dashed line. The auxiliary controller 919 operates, for example, a minimally necessary function of the smartphone 900 in a sleep mode.

In the smartphone 900 illustrated in FIG. 36, one or more components (the transmission processing section 241 and/or the reception processing section 243) included in the control unit 240 described with reference to FIG. 20 may be implemented in the wireless communication interface 912. Alternatively, at least a portion of these components may be implemented in the processor 901 or the auxiliary controller 919. As an example, the smartphone 900 may be mounted with a module including a portion (e.g., BB processor 913) or all of the components of the wireless communication interface 912, the processor 901, and/or the auxiliary controller 919 and the one or more components described above may be implemented in the module. In this case, the module described above may store a program for causing a processor to function as the one or more components described above (i.e., a program for causing a processor to execute the operations of the one or more components described above) and execute the program. As another example, a program for causing a processor to function as the one or more components described above may be installed in the smartphone 900 and the wireless communication interface 912 (e.g., BB processor 913), the processor 901, and/or the auxiliary controller 919 may execute the program. As described above, the smartphone 900 or the module described above may be provided as a device including the one or more components described above and the program for causing a processor to function as the one or more components described above may be provided. In addition, there may be provided a readable recording medium having the above-described program recorded thereon.

In addition, in the smartphone 900 illustrated in FIG. 36, the wireless communication unit 220 described, for example, with reference to FIG. 20 may be implemented in the wireless communication interface 912 (e.g., RF circuit 914). In addition, the antenna unit 210 may be implemented in the antenna 916. In addition, the storage unit 230 may be implemented in the memory 902.

Second Practical Application Example

Figure 37:
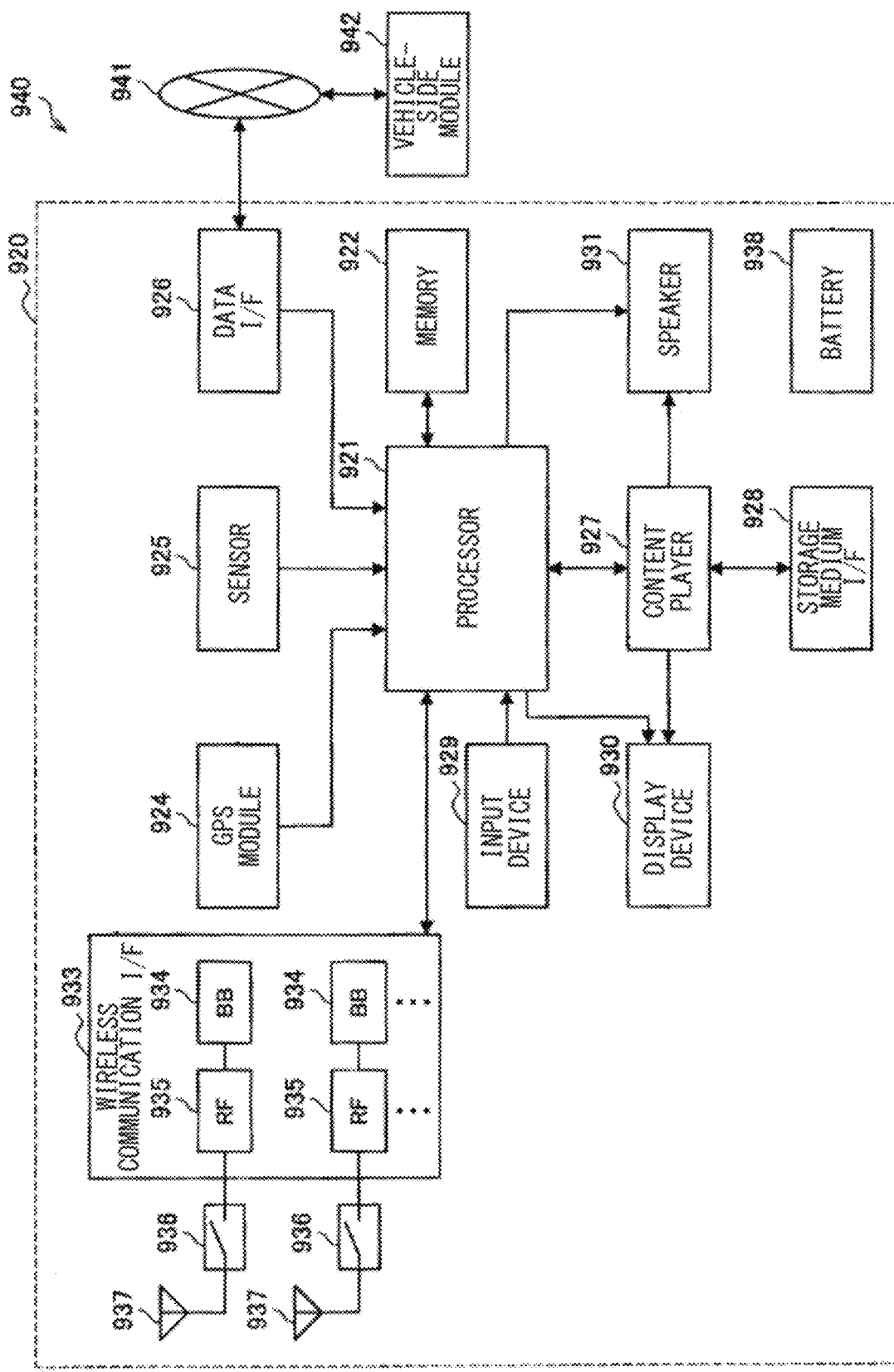
FIG. 37 is a block diagram illustrating an example of a schematic configuration of a car navigation apparatus.

FIG. 37 is a block diagram illustrating an example of a schematic configuration of a car navigation apparatus 920 to which the technology according to the present disclosure may be applied. The car navigation apparatus 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, CPU or SoC. The processor 921 controls the navigation function and the other functions of the car navigation apparatus 920. The memory 922 includes RAM and ROM and stores a program that is executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor, and the like. The data interface 926 is, for example, coupled to an in-vehicle network 941 via a terminal that is not illustrated and acquires data such as vehicle speed data generated on the vehicle side.

The content player 927 reproduces content stored in a storage medium (e.g., CD or DVD) to be inserted to the storage medium interface 928. The input device 929 includes, for example, a touch sensor that detects touch onto the screen of the display device 930, a button, a switch, or the like. The input device 929 receives an operation or an information input from a user. The display device 930 includes a screen such as LCD or an OLED display and displays an image of the navigation function or content to be reproduced. The speaker 931 outputs a sound of the navigation function or content to be reproduced.

The wireless communication interface 933 supports any cellular communication scheme such as LTE or LTE-Advanced and executes wireless communication. The wireless communication interface 933 may typically include a BB processor 934, an RF circuit 935, and the like. The BB processor 934 may perform, for example, encoding/decoding, modulation/demodulation, multiplexing/demultiplexing, and the like. The BB processor 934 executes various kinds of signal processing for wireless communication. Meanwhile, the RF circuit 935 may include a mixer, a filter, an amplifier, and the like. The RF circuit 935 transmits and receives wireless signals via the antenna 937. The wireless communication interface 933 may also be a one-chip module that has the BB processor 934 and the RF circuit 935 integrated thereon. The wireless communication interface 933 may include the plurality of BB processors 934 and the plurality of RF circuits 935 as illustrated in FIG. 37. It is to be noted that FIG. 37 illustrates the example in which the wireless communication interface 933 includes the plurality of BB processors 934 and the plurality of RF circuits 935, but the wireless communication interface 933 may also include the single BB processor 934 or the single RF circuit 935.

Further, in addition to a cellular communication scheme, the wireless communication interface 933 may support another type of wireless communication scheme such as a short-distance wireless communication scheme, a near field communication scheme, or a wireless LAN scheme. In that case, the wireless communication interface 933 may include the BB processor 934 and the RF circuit 935 for the respective wireless communication schemes.

Each of the antenna switches 936 switches the coupling destination of the antenna 937 between the plurality of circuits (e.g., circuits for different wireless communication schemes) included in the wireless communication interface 933.

Each of the antennas 937 includes a single antenna element or a plurality of antenna elements (e.g., a plurality of antenna elements included in a MIMO antenna). Each of the antennas 937 is used for the wireless communication interface 933 to transmit and receive wireless signals. The car navigation apparatus 920 may include the plurality of antennas 937 as illustrated in FIG. 37. It is to be noted that FIG. 37 illustrates the example in which the car navigation apparatus 920 includes the plurality of antennas 937, but the car navigation apparatus 920 may also include the single antenna 937.

Further, the car navigation apparatus 920 may include the antenna 937 for each wireless communication scheme. In that case, the antenna switches 936 may be omitted from the configuration of the car navigation apparatus 920.

The battery 938 supplies power to each block of the car navigation apparatus 920 illustrated in FIG. 37 via a power supply line that is partially illustrated in the diagram as a dashed line. In addition, the battery 938 accumulates power supplied from the vehicle side.

In the car navigation apparatus 920 illustrated in FIG. 37, one or more components (the transmission processing section 241 and/or the reception processing section 243) included in the control unit 240 described with reference to FIG. 20 may be implemented in the wireless communication interface 933. Alternatively, at least a portion of these components may be implemented in the processor 921. As an example, the car navigation apparatus 920 may be mounted with a module including a portion (e.g., BB processor 934) or all of the components of the wireless communication interface 933 and/or the processor 921 and the one or more components described above may be implemented in the module. In this case, the module described above may store a program for causing a processor to function as the one or more components described above (i.e., a program for causing a processor to execute the operations of the one or more components described above) and execute the program. As another example, a program for causing a processor to function as the one or more components described above may be installed in the car navigation apparatus 920 and the wireless communication interface 933 (e.g., BB processor 934) and/or the processor 921 may execute the program. As described above, the car navigation apparatus 920 or the module described above may be provided as a device including the one or more components described above and the program for causing a processor to function as the one or more components described above may be provided. In addition, there may be provided a readable recording medium having the above-described program recorded thereon.

In addition, in the car navigation apparatus 920 illustrated in FIG. 37, the wireless communication unit 220 described, for example, with reference to FIG. 20 may be implemented in the wireless communication interface 933 (e.g., RF circuit 935). In addition, the antenna unit 210 may be implemented in the antenna 937. In addition, the storage unit 230 may be implemented in the memory 922.

In addition, the technology according to the present disclosure may also be achieved as an in-vehicle system (or vehicle) 940 including one or more blocks of the car navigation apparatus 920 described above, the in-vehicle network 941, and a vehicle-side module 942. The vehicle-side module 942 generates vehicle-side data such as vehicle speed, engine speed, or trouble information and outputs the generated data to the in-vehicle network 941.

6. CONCLUSION

The above has described the embodiment of the present disclosure in detail with reference to FIGS. 1 to 37. As described above, after transmitting a first packet on the sidelink, the transmission terminal 200A according to the present embodiment transmits transmission report information including information indicating the time and the frequency of the resource used to transmit the first packet. For example, in a case where the transmission terminal 200A performs grant-free transmission or sensingless transmission on a first packet on the sidelink, the transmission terminal 200A transmits the transmission report information to the base station 100 or the other nearby terminal device 200. This allows the receiver side of the transmission report information to confirm whether or not second packets transmitted on the sidelink in addition to the first packet include a packet having a collision with the first packet and trigger the recovery process for the second packet having a collision.

In the Mode 3 resource allocation environment, the base station 100 controls the retransmission of a second packet by the nearby transmission terminal 200C that has transmitted the second packet on the sidelink on the basis of transmission report information including information indicating the time and the frequency of the resource used to transmit a first packet by the transmission terminal 200A on the sidelink. For example, the base station 100 determines the presence or absence of the occurrence of a collision between a first packet and a second packet on the basis of the transmission report information. In a case where it is determined that a collision occurs, the base station 100 instructs the nearby transmission terminal 200C to retransmit the second packet. This achieves the recovery of the second packet having a collision with the first packet.

In the Mode 4 resource allocation environment, after transmitting a second packet on the sidelink, the nearby transmission terminal 200C controls the retransmission of the second packet on the basis of transmission report information including information indicating the time and the frequency of the resource used to transmit a first packet by the transmission terminal 200A on the sidelink. For example, the nearby transmission terminal 200C determines the presence or absence of the occurrence of a collision between a first packet and a second packet on the basis of the transmission report information. In a case where it is determined that a collision occurs, the nearby transmission terminal 200C retransmits the second packet. This achieves the recovery of the second packet having a collision with the first packet.

The preferred embodiment of the present disclosure has/have been described above in detail with reference to the accompanying drawings, but the technical scope of the present disclosure is not limited to the embodiment. A person skilled in the art may find various alterations and modifications within the scope of the appended claims, and it should be understood that they will naturally come under the technical scope of the present disclosure.

For example, in the embodiment described above, description has been given by assuming that the sidelink is defined in NR as with LTE. The present technology is not, however, limited to the example. For example, even in a case where the sidelink is not defined in NR, but the downlink/uplink is simply defined, the present technology is similarly applicable. In that case, the present technology is applied in grant-free transmission on the downlink/uplink to report the transmission report information and the recovery process is performed. For example, after performing grant-free transmission on the uplink, the terminal device transmits transmission report information regarding the grant-free transmission on the uplink. The transmission report information may include information similar to that of the transmission report information in a case of the sidelink described in the embodiment described above. Meanwhile, after receiving the transmission report information, the base station executes the recovery process such as transmitting a recovery instruction. The recovery instruction may include information similar to that of the recovery instruction in a case of the sidelink described in the embodiment described above.

In addition, it has been described in the embodiment described above that the collision detection and the recovery process are performed in a case where a packet is subjected to grant-free transmission, but the present technology is not limited to the example. Even in a case where a packet is subjected to grant-based transmission, the collision detection and the recovery process may be performed.

In addition, the present technology may have a variety of application destinations. For example, the application destination of the present technology is not limited to the V2X communication, but the present technology may be applied to a variety of extended examples of the sidelink communication described in <1.2. Extended Example of Sidelink Communication>. The present technology is similarly applicable in a case where an FDM-type resource pool is allocated or in a case where a TDM-type resource pool is allocated. The present technology is also applicable to multicarrier communication in which sidelink communication is performed by using a plurality of carriers. The base station 100 may be configured as a non-terrestrial station such as a satellite or a drone. In addition, the base station 100 may be configured as RSU or representative UE (master UE) that functions as a representative of a plurality of UEs. The present technology may be applied to sidelink communication in relay communication such as IAB (Integrated Access and Backhaul link). The application destination of the present technology is not limited to the URLLC packet, but the present technology may be applied to the transmission of a packet in any use case such as eMBB or mMTC.

In addition, the processes described by using the flowcharts and the sequence diagrams in this specification do not necessarily have to be executed in the illustrated order. Some of the processing steps may be executed in parallel. In addition, an additional processing step may be adopted, and some of the processing steps may be omitted.

In addition, the effects described herein are merely illustrative and exemplary, but not limitative. In other words, the technology according to the present disclosure may exert other effects that are apparent to those skilled in the art from the description herein in addition to the effects described above or in place of the effects described above.

It is to be noted that the following configurations also fall within the technical scope of the present disclosure.

(1)
A terminal device including
a control unit that transmits transmission report information after transmitting a first packet on a sidelink, the transmission report information including information indicating time and a frequency of a resource used to transmit the first packet.

(2)
The terminal device according to (1), in which, in a case where the first packet is transmitted without executing a predetermined procedure for packet collision prevention, the control unit transmits the transmission report information.

(3)
The terminal device according to (2), in which the predetermined procedure includes receiving allocation of a resource for transmission of the first packet.

(4)
The terminal device according to (2) or (3), in which the predetermined procedure includes executing predetermined sensing for packet collision prevention.

(5)
The terminal device according to any one of (1) to (4), in which the control unit transmits the transmission report information by using a resource having a predetermined relationship in a time direction with a resource that is used to transmit the first packet.

(6)
The terminal device according to any one of (1) to (5), in which the control unit transmits the transmission report information on an Uu link and/or a sidelink.

(7)
The terminal device according to any one of (1) to (6), in which the transmission report information further includes at least any of information indicating a resource pool used to transmit the first packet, information indicating a frequency band used to transmit the first packet, information indicating a number of times transmission of the first packet is repeated, information indicating transmission power used to transmit the first packet, information indicating priority of the first packet, position information regarding the terminal device in the transmission of the first packet, MCS (Modulation and Coding Scheme) information in the transmission of the first packet, transmission mode information in the transmission of the first packet, and QCL (Quasi-Colocation) information in the transmission of the first packet.

(8)
The terminal device according to any one of (1) to (7), in which the first packet includes a packet that is transmitted in a use case of URLLC (Ultra reliable and low latency communications).

(9)
A terminal device including
a control unit that controls retransmission of a second packet on the basis of transmission report information after transmitting the second packet on a sidelink, the transmission report information including information indicating time and a frequency of a resource used to transmit a first packet by another terminal device on a sidelink.

(10)
The terminal device according to (9), in which, in a case where it is determined on the basis of the transmission report information that the first packet and the second packet have a collision, the control unit retransmits the second packet.

(11)
The terminal device according to (10), in which the control unit controls retransmission of the second packet on the basis of whether or not a latency requirement for the second packet is satisfied in a case where the second packet is retransmitted.

(12)
A base station including
a communication control section that controls retransmission of a second packet by a second terminal device on the basis of transmission report information including information indicating time and a frequency of a resource used to transmit a first packet by a first terminal device on a sidelink, the second terminal device having transmitted the second packet on a sidelink.

(13)
The base station according to (12), in which, in a case where it is determined on the basis of the transmission report information that the first packet and the second packet have a collision, the communication control section transmits information to the second terminal device, the information being for issuing an instruction to retransmit the second packet.

(14)
The base station according to (13), in which the information for issuing the instruction to retransmit the second packet includes information indicating a resource allocated for retransmission of the second packet.

(15)
A method that is executed by a processor, the method including
transmitting transmission report information after transmitting a first packet on a sidelink, the transmission report information including information indicating time and a frequency of a resource used to transmit the first packet.

(16)
A method that is executed by a processor, the method including
controlling retransmission of a second packet on the basis of transmission report information after transmitting the second packet on a sidelink, the transmission report information including information indicating time and a frequency of a resource used to transmit a first packet by another terminal device on a sidelink.

(17)
A method that is executed by a processor, the method including
controlling retransmission of a second packet by a second terminal device on the basis of transmission report information including information indicating time and a frequency of a resource used to transmit a first packet by a first terminal device on a sidelink, the second terminal device having transmitted the second packet on a sidelink.

(18)
A recording medium having a program recorded thereon, the program causing a computer to function as
a control unit that transmits transmission report information after transmitting a first packet on a sidelink, the transmission report information including information indicating time and a frequency of a resource used to transmit the first packet.

(19)
A recording medium having a program recorded thereon, the program causing a computer to function as a control unit that controls retransmission of a second packet on the basis of transmission report information after transmitting the second packet on a sidelink, the transmission report information including information indicating time and a frequency of a resource used to transmit a first packet by another terminal device on a sidelink.

(20)

A recording medium having a program recorded thereon, the program causing a computer to function as a communication control section that controls retransmission of a second packet by a second terminal device on the basis of transmission report information including information indicating time and a frequency of a resource used to transmit a first packet by a first terminal device on a sidelink, the second terminal device having transmitted the second packet on a sidelink.

REFERENCE SIGNS LIST 1 system
11 cell
20 core network
30 PDN
100 base station
110 antenna unit
120 wireless communication unit
130 network communication unit
140 storage unit
150 control unit
151 communication control section
200 terminal device
200A transmission terminal
200B reception terminal
200C nearby transmission terminal
200D nearby reception terminal
210 antenna unit
220 wireless communication unit
230 storage unit
240 control unit
241 transmission processing section
243 reception processing section

The invention claimed is:

1. A terminal device comprising:
circuitry configured to
transmit transmission report information after transmitting a first data packet on a sidelink, the transmission report information including information expressly indicating a time and a frequency of a resource used to transmit the first data packet,
wherein, in a case where the first data packet is transmitted without executing a predetermined procedure for packet collision prevention, the circuitry transmits the transmission report information.

2. The terminal device according to claim 1, wherein the predetermined procedure includes receiving allocation of a resource for transmission of the first data packet.

3. The terminal device according to claim 1, wherein the predetermined procedure includes executing predetermined sensing for packet collision prevention.

4. The terminal device according to claim 1, wherein the circuitry transmits the transmission report information by using a resource having a predetermined relationship in a time direction with a resource that is used to transmit the first data packet.

5. The terminal device according to claim 1, wherein the circuitry transmits the transmission report information on an Uu link and/or a sidelink.

6. The terminal device according to claim 1, wherein the transmission report information further includes at least any of information indicating a resource pool used to transmit the first data packet, information indicating a frequency band used to transmit the first data packet, information indicating a number of times transmission of the first packet is repeated, information indicating transmission power used to transmit the first data packet, information indicating priority of the first data packet, position information regarding the terminal device in the transmission of the first data packet, MCS (Modulation and Coding Scheme) information in the transmission of the first data packet, transmission mode information in the transmission of the first data packet, and QCL (Quasi-Colocation) information in the transmission of the first data packet.

7. The terminal device according to claim 1, wherein the first data packet includes a packet that is transmitted in a use case of ultra reliable and low latency communications (URLLC).

8. A terminal device comprising:
circuitry configured to
control transmission of a second data packet on a sidelink;
control receipt of transmission report information after transmitting the second data packet on the sidelink; and
control retransmission of the second data packet on a basis of the transmission report information received after transmitting the second data packet on the sidelink, the transmission report information including information expressly indicating a time and a frequency of a resource used to transmit a first data packet by another terminal device on the sidelink,
wherein the transmission report information is received, in a case where the first data packet is received without executing a predetermined procedure for packet collision prevention.

9. The terminal device according to claim 8, wherein, in a case where it is determined on the basis of the transmission report information that the first data packet and the second data packet have a collision, the circuitry retransmits the second data packet.

10. The terminal device according to claim 9, wherein the circuitry controls retransmission of the second data packet on a basis of whether or not a latency requirement for the second data packet is satisfied in a case where the second data packet is retransmitted.

11. A base station comprising:
circuitry configured to
control receipt of transmission report information after transmission of a second data packet on a sidelink by a second terminal device; and
control retransmission of the second data packet by the second terminal device on a basis of the transmission report information, the transmission report information including information expressly indicating a time and a frequency of a resource used to transmit a first data packet by a first terminal device on the sidelink,
wherein the transmission report information is received, in a case where the first data packet is received without executing a predetermined procedure for packet collision prevention.

12. The base station according to claim 11, wherein, in a case where it is determined on the basis of the transmission report information that the first data packet and the second data packet have a collision, the circuitry transmits information to the second terminal device, the information being for issuing an instruction to retransmit the second data packet.

13. The base station according to claim 12, wherein the information for issuing the instruction to retransmit the second data packet includes information indicating a resource allocated for retransmission of the second data packet.

14. A method that is executed by a processor, the method comprising:
    transmitting transmission report information after transmitting a first data packet on a sidelink, the transmission report information including information expressly indicating time and a frequency of a resource used to transmit the first data packet,
    wherein, in a case where the first data packet is transmitted without executing a predetermined procedure for packet collision prevention, the transmission report information is transmitted.

15. A method that is executed by a processor, the method comprising:
    controlling transmission of a second data packet on a sidelink;
    controlling receipt of transmission report information after transmitting the second data packet on the sidelink; and
    controlling retransmission of the second data packet on a basis of the transmission report information after transmitting the second data packet on the sidelink, the transmission report information including information expressly indicating a time and a frequency of a resource used to transmit a first data packet by another terminal device on the sidelink,
    wherein the transmission report information is received, in a case where the first data packet is received without executing a predetermined procedure for packet collision prevention.

16. A method that is executed by a processor, the method comprising:
    controlling receipt of transmission report information after transmission of a second data packet on a sidelink by a second terminal device; and
    controlling retransmission of the second data packet by the second terminal device on a basis of the transmission report information, the transmission report information including information expressly indicating a time and a frequency of a resource used to transmit a first data packet by a first terminal device on the sidelink,
    wherein the transmission report information is received, in a case where the first data packet is received without executing a predetermined procedure for packet collision prevention.

17. A non-transitory computer-readable medium encoded with computer-readable instructions that, when executed by processing circuitry, cause the processing circuitry to perform a method comprising:
    transmitting transmission report information after transmitting a first data packet on a sidelink, the transmission report information including information expressly indicating a time and a frequency of a resource used to transmit the first data packet,
    wherein, in a case where the first data packet is transmitted without executing a predetermined procedure for packet collision prevention, the transmission report information is transmitted.

18. A non-transitory computer-readable medium encoded with computer-readable instructions that, when executed by processing circuitry, cause the processing circuitry to perform a method comprising:
    controlling transmission of a second data packet on a sidelink;
    controlling receipt of transmission report information after transmitting the second data packet on the sidelink; and
    controlling retransmission of the second data packet on a basis of the transmission report information after transmitting the second data packet on the sidelink, the transmission report information including information expressly indicating a time and a frequency of a resource used to transmit a first data packet by another terminal device on the sidelink,
    wherein the transmission report information is received, in a case where the first data packet is received without executing a predetermined procedure for packet collision prevention.

19. A non-transitory computer-readable medium encoded with computer-readable instructions that, when executed by processing circuitry, cause the processing circuitry to perform a method comprising:
    controlling receipt of transmission report information after transmission of a second data packet on a sidelink by a second terminal device; and
    controlling retransmission of the second data packet by the second terminal device on a basis of the transmission report information including information expressly indicating a time and a frequency of a resource used to transmit a first data packet by a first terminal device on the sidelink,
    wherein the transmission report information is received, in a case where the first data packet is received without executing a predetermined procedure for packet collision prevention.

* * * * *